United States Patent
Duncker et al.

(10) Patent No.: US 8,520,000 B2
(45) Date of Patent: Aug. 27, 2013

(54) CREATION, SHARING AND EMBEDDING OF INTERACTIVE CHARTS

(75) Inventors: Seymour Duncker, Heidelberg (DE); Tyron Montgomery, Munich (DE)

(73) Assignee: iCharts, Inc., Sunnyvale, CA (US)

( * ) Notice: Subject to any disclaimer, the term of this patent is extended or adjusted under 35 U.S.C. 154(b) by 209 days.

(21) Appl. No.: 12/372,696

(22) Filed: Feb. 17, 2009

(65) Prior Publication Data

US 2010/0005411 A1    Jan. 7, 2010

Related U.S. Application Data

(63) Continuation-in-part of application No. 12/205,802, filed on Sep. 5, 2008, now Pat. No. 8,271,892.

(60) Provisional application No. 61/077,728, filed on Jul. 2, 2008.

(51) Int. Cl.
*G06F 3/00*    (2006.01)

(52) U.S. Cl.
USPC ........... 345/440; 715/765; 715/769; 715/215; 715/203; 715/751; 345/418; 717/106; 717/107

(58) Field of Classification Search
USPC .......................................... 715/753; 345/440
See application file for complete search history.

(56) References Cited

U.S. PATENT DOCUMENTS

| | | | |
|---|---|---|---|
| 5,859,641 A | 1/1999 | Cave | |
| 5,917,499 A * | 6/1999 | Jancke et al. | 345/440 |
| 6,304,272 B1 | 10/2001 | Schanel et al. | |
| 6,757,573 B1 | 6/2004 | Ledoux et al. | |
| 7,080,070 B1 | 7/2006 | Gavarini | |
| 7,113,190 B2 * | 9/2006 | Heaton | 345/440 |
| 7,398,281 B2 | 7/2008 | Atchison et al. | |
| 7,409,634 B2 | 8/2008 | Davis et al. | |
| 7,667,582 B1 * | 2/2010 | Waldorf | 340/440 |
| 7,737,979 B2 * | 6/2010 | Robertson et al. | 345/473 |
| 7,840,937 B1 * | 11/2010 | Chiluvuri | 717/106 |
| 7,961,188 B2 * | 6/2011 | Tolle et al. | 345/440 |
| 8,271,892 B2 * | 9/2012 | Duncker et al. | 715/765 |
| 2002/0063733 A1 * | 5/2002 | Franke et al. | 345/739 |
| 2002/0156806 A1 | 10/2002 | Cox et al. | |
| 2002/0169975 A1 | 11/2002 | Good | |
| 2004/0119713 A1 * | 6/2004 | Meyringer | 345/440 |
| 2004/0164983 A1 * | 8/2004 | Khozai | 345/440 |
| 2004/0264697 A1 | 12/2004 | Gavrilescu et al. | |
| 2004/0265632 A1 | 12/2004 | Okinaka et al. | |
| 2005/0149538 A1 * | 7/2005 | Singh et al. | 707/100 |

(Continued)

OTHER PUBLICATIONS

ChartFx 7.0 Feature, <http://www.softwarefx.com>, downloaded from wayback machine <http://web.archive.org> archived on Jan. 10, 2008.*

(Continued)

*Primary Examiner* — William Bashore
*Assistant Examiner* — Reza Nabi
(74) *Attorney, Agent, or Firm* — Bingham McCutchen LLP

(57) ABSTRACT

Systems and methods for generating and sharing interactive charts are described. The interactive charts are generated in an online portal that allows users to customize the interactive features of the chart. An online portal may also be provided to allow users to automatically embed interactive chart(s) in another website without reprogramming the code of the website each time the interactive chart(s) are changed or new interactive chart(s) are added.

4 Claims, 54 Drawing Sheets

(56) References Cited

U.S. PATENT DOCUMENTS

| | | | |
|---|---|---|---|
| 2005/0232055 A1 | 10/2005 | Couckuyt et al. | |
| 2006/0136819 A1* | 6/2006 | Tolle et al. | 715/523 |
| 2007/0126736 A1* | 6/2007 | Tolle et al. | 345/440 |
| 2007/0203917 A1* | 8/2007 | Du et al. | 707/10 |
| 2007/0203945 A1* | 8/2007 | Louw | 707/104.1 |
| 2007/0245238 A1* | 10/2007 | Fugitt et al. | 715/700 |
| 2008/0109740 A1* | 5/2008 | Prinsen et al. | 715/764 |
| 2008/0134059 A1 | 6/2008 | Kumar et al. | |
| 2008/0192056 A1* | 8/2008 | Robertson et al. | 345/440 |
| 2008/0195930 A1* | 8/2008 | Tolle | 715/227 |
| 2008/0316304 A1 | 12/2008 | Claus et al. | |
| 2009/0018961 A1* | 1/2009 | Seven et al. | 705/50 |
| 2009/0024405 A1* | 1/2009 | Brandes et al. | 705/1 |
| 2009/0079833 A1* | 3/2009 | Abraham et al. | 348/169 |
| 2009/0113091 A1* | 4/2009 | Miller et al. | 710/64 |
| 2009/0119399 A1* | 5/2009 | Hussain et al. | 709/224 |
| 2009/0265632 A1 | 10/2009 | Russ et al. | |
| 2010/0058250 A1* | 3/2010 | Stannard et al. | 715/856 |
| 2010/0095235 A1* | 4/2010 | Bennett et al. | 715/781 |
| 2010/0192166 A1* | 7/2010 | Kumar et al. | 719/328 |
| 2010/0214299 A1* | 8/2010 | Robertson et al. | 345/440 |
| 2010/0251128 A1* | 9/2010 | Cordasco | 715/736 |
| 2010/0277481 A1* | 11/2010 | Cao et al. | 345/440 |
| 2010/0283606 A1* | 11/2010 | Tsypin et al. | 340/540 |
| 2010/0318611 A1* | 12/2010 | Curtin et al. | 709/206 |
| 2010/0332465 A1* | 12/2010 | Janssens et al. | 707/722 |
| 2011/0016131 A1* | 1/2011 | Fairchild et al. | 707/740 |
| 2011/0035692 A1* | 2/2011 | Sandone et al. | 715/769 |
| 2011/0041087 A1* | 2/2011 | Leveille et al. | 715/765 |
| 2012/0144303 A1* | 6/2012 | Cricks et al. | 715/719 |

OTHER PUBLICATIONS

ChartFx 7.0 Feature, <http://www.softwarefx.com>, downloaded from wayback machine <http://web.archive.org> archived on Jan 10, 2008, 6 pp.*

"Adobe Flex," from Wikipedia, http://en.wikipedia.org/wiki/Adobe_Flex.

"Flash Charting Software List," from Wikipedia, http://en.wikipedia.org/wiki/Flash_charting_software_list.

"Microsoft Silverlight," from Wikipedia, http://en.wikipedia.org/wiki/Microsoft_Silverlight.

Non-Final Office Action dated Mar. 30, 2011 of U.S. Appl. No. 12/205,802.

Office Action for U.S. Appl. No. 12/205,802, dated Sep. 12, 2011, 12 pages.

Notice of Allowance for U.S. Appl. No. 12/205,802, dated Jul. 11, 2012, 5 pages.

Non-final Office Action for U.S. Appl. No. 12/205,802, dated Jan. 27, 2012, 10 pages.

* cited by examiner

CREATION, SHARING AND EMBEDDING OF INTERACTIVE CHARTS

CROSS-REFERENCE TO RELATED APPLICATIONS

The present application is a continuation-in-part application of U.S. patent application Ser. No. 12/205,802, filed Sep. 5, 2008 and entitled "CREATION, SHARING AND EMBEDDING OF INTERACTIVE CHARTS," which claims priority to U.S. provisional application Ser. No. 61/077,728, filed on Jul. 2, 2008, the entireties of which are hereby incorporated by reference.

BACKGROUND

1. Field

The subject invention relates to interactive charts and, in particular, to the creation, sharing and embedding of interactive charts.

2. Related Art

Microsoft Excel is typically used to enter data into spreadsheets and sometimes make charts or graphs from that data. Users typically enter the data into a spreadsheet in columns and rows. Users can then highlight the data that they want to use to make a chart and then select a chart type. Excel then generates the chart, which can be copied and pasted into other documents (e.g., Microsoft Word documents, web pages, portable document format files (PDFs), etc.). These charts, however, are not interactive.

Google offers an online service that allows users to create interactive charts using an interactive chart widget. Users enter data in an online spreadsheet having a look and feel similar to the Excel spreadsheet. Users can then highlight the data they want to use to make a chart and select a chart type. The widget generates the interactive chart. The interactive features include a zoom feature and a mouse over pop-up window of data. These interactive charts can be embedded in online pages; however, the data in these charts is not secure because the widget fetches data when the screen is refreshed. Any HTML programmer can easily intercept the data stream from the Goggle spreadsheet. In addition, when the charts are copied into other documents (e.g., Microsoft Word documents, PDFs, etc.), the charts are no longer interactive. In addition, other users cannot access the data associated with the interactive chart or copy the interactive chart for their own use.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

According to an aspect of the invention, a method is provided that includes sending a request from a first server to a second server to retrieve a flash file of an interactive chart, receiving the flash file of the interactive chart from the second server at the first server, and displaying the interactive chart at a website hosted by the second server.

The request may be sent via a chart box embedded in the website. The interactive chart may be displayed in the chart box embedded in the website.

The request may be to retrieve a plurality of flash files, each flash file corresponding to an interactive chart, and the method may further include receiving the plurality of flash files and displaying the plurality of interactive charts.

The request may be sent each time the website is accessed. The request may be sent each time the website is refreshed.

According to another aspect of the invention, a method is provided that includes providing a tool on a first website for embedding at least one interactive chart in a chart box, the chart box embedded on a second website, the first website hosted by a first server that stores a plurality of interactive charts, the at least one interactive chart embedded in the chart box being one of the plurality of interactive charts stored on the first server; and allowing a user to select at least one of the plurality of interactive charts to be embedded in the chart box, wherein the at least one of the plurality of interactive charts is automatically displayed in the chart box on the second website when the user selects the at least one of the plurality of interactive charts.

The user may select the at least one of the plurality of interactive charts by dragging and dropping the at least one of the plurality of interactive charts into a chart box folder of the tool.

The chart box may be a flash widget.

The method may also include allowing a user to select a plurality of the plurality of interactive charts for display in the chart box on the second website.

The method may also include allowing a user to select a plurality of interactive charts to be embedded in a plurality of chart boxes on the first website.

The interactive chart may be automatically displayed using a data feed from the first website to the second website.

According to a further aspect of the invention, a method is provided that includes allowing a user to drag and drop at least one of a plurality of interactive charts displayed in a user interface into a chart box folder of the user interface, and transmitting the at least one of the plurality of interactive charts from a first website to a chart box embedded in a second website in response to the user dropping the at least one of the plurality of interactive charts into the chart box folder.

The chart box may be a flash widget.

The method may also include allowing a user to drag and drop a plurality of the plurality of interactive charts into the chart box.

Dragging and dropping the at least one interactive chart may embed the at least one interactive chart in the second website.

According to another aspect of the invention, a computer system is provided that includes memory configured to store a plurality of interactive charts, and a processor coupled to the memory, the processor configured to allow a user to drag and drop at least one of the plurality of interactive charts into a chart box pane of a user interface accessed at a first website hosted by a first server and transmit the at least one of the plurality of interactive charts from the first server to a second server for display of the at least one of the plurality of interactive charts on a second website hosted by the second server.

The chart box may be a flash widget.

The processor may further allow the user to drag and drop a plurality of the plurality of interactive charts into the chart box.

The processor may further embed the at least one interactive chart in the second website.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1:
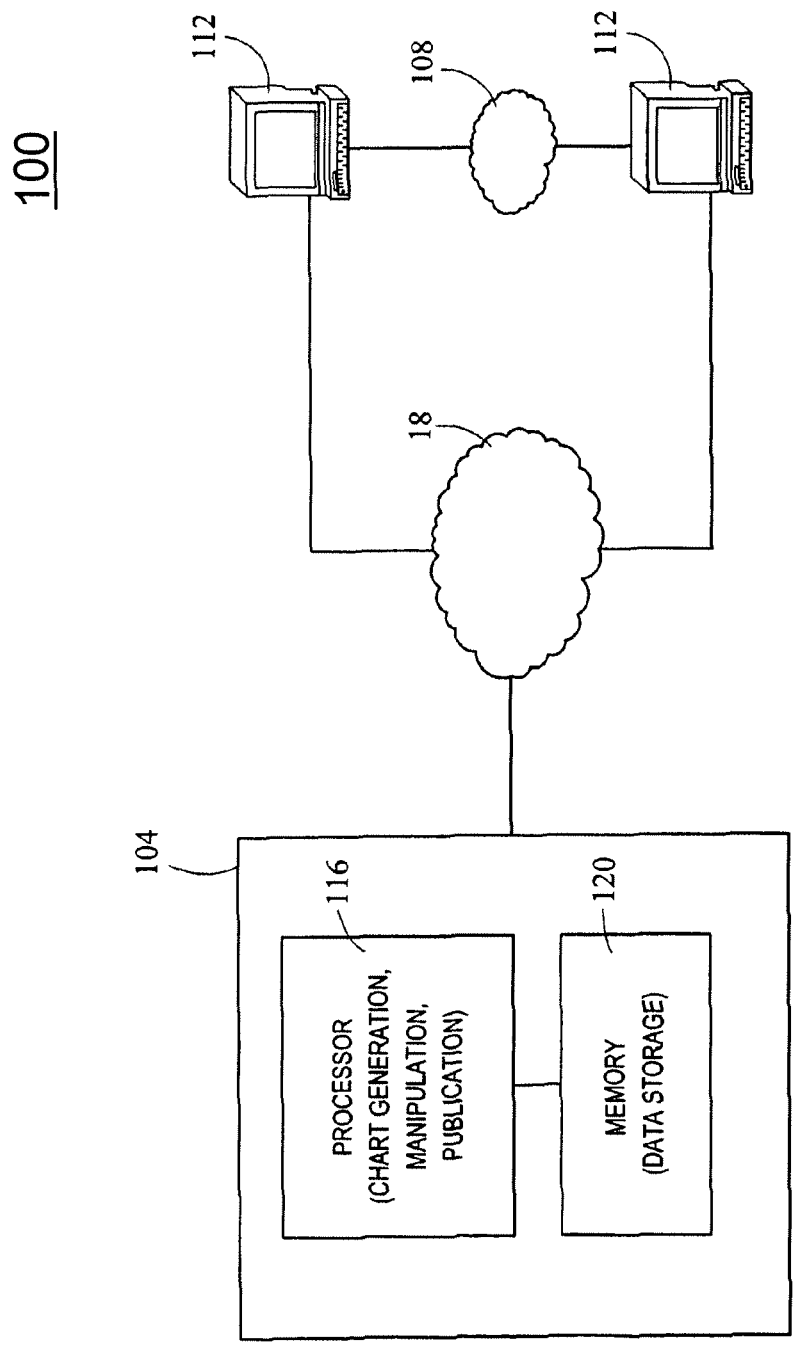
FIG. 1 is a block diagram of a interactive chart system in accordance with one embodiment of the invention.

Embodiments of the invention relate to an on-line service for creating, sharing and embedding interactive charts. In one embodiment, an online portal is provided that allows users to enter or upload data. The online portal or user interface allows users to drag and drop the data from a data pane to a charting pane, automatically creating the interactive chart. Exemplary interactive features include a zoom feature, a data mouse-over pop-up window, a data hide/share feature, an audio and/or video feature, an animation feature, a drill-down feature, a data gliding feature, etc., all of which are optionally selectable or deselectable by the user. The user can then publish the interactive chart online or download and embed the chart into an electronic document, such as, for example, a PDF, .ppt, etc. file, where the chart retains its interactivity. In one embodiment, the interactive charts that are embedded online are searchable by search engines. The interactive charts and/or the data associated with the interactive charts can also be purchased in an online store environment. Once the charts have been purchased or otherwise shared with another user, the other user can customize the chart to have the interactive features, the data, the look and feel, and the like that suits their needs. The interactive charts can also be embedded in other websites without the need to reprogram the other websites each time an interactive chart is embedded in those websites using a chart box tool.

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read only memories (CD-ROMs), and magnetic-optical disks, read-only memories (ROMs), random access memories (RAMs), Erasable Programmable Read-Only Memories (EPROMs), Electrically Erasable Programmable Read-Only Memories (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), An embodiment of the invention will now be described in detail with reference to FIG. 1. FIG. 1 illustrates an exemplary system 100 for generating the interactive charts, purchasing the interactive charts, sharing the interactive charts, and the like. The system 100 includes a server 104, a network 108 and computers 112.

The server 104 is configured to receive requests from computers 112, process the requests and provide responses to the requests to the computers 112. The server 104 may include one or more server computers networked to one another. An exemplary server is the Apache server. The server 104 includes a processor 116 to execute instructions, which is connected to memory 120 that stores data. The processor 116 executes instructions and accesses data in the memory 120 to, for example, generate the interactive charts, modify the interactive charts, allow users to purchase the interactive charts, share the interactive charts, and the like. It will be appreciated that the server 104 may be implemented with any type of hardware and software, and that the server 104 may have a different configuration than shown in FIG. 1. In addition, it will be appreciated that the server 104 may include several server computers connected together.

The network 108 may be any type of communications channel, a local area network (LAN), a wide area network (WAN), such as the Internet, direct computer connections, and the like. The connection may be accomplished in a wireless manner using radio frequency, infrared, or other technologies, using any type of communication hardware and protocols, through other communication mediums, such as electric cable, fire optic cable, and/or through other technologies.

The computers 112 access the server 104 through the network 108. The computers 112 may also communicate with one another over the network 108. The computer 112 may be a server, a personal computer, a portable computer, a hand held device, a wireless device, and the like. The computer may be a single device at a single location or multiple devices at a single or multiple locations that are connected together using an appropriate communication protocol over any communication medium.

In one embodiment, the server 104 generates an interactive chart based on input received from one of the computers 112 and shares the interactive chart with users located at one of the computers 112 over the network 108. For example, the server 104 may include a website that is accessible by the computer 112 through a web browser located at the computer 112 over the network 108. The website provides the interactive chart generated by the user at computer 112, or the website provides an interactive chart generated by another user. Alternatively, the server 104 may embed the interactive chart in an electronic document (e.g., ppt, pdf, doc, etc. file) and transmit the electronic document having the interactive chart to the user over the network 108 to the computer 112 through the web browser located at the computer 112. In one embodiment, the user can download the interactive chart to the computer 112 from the server 104 over the network 108. The user can then embed the interactive chart in an electronic document (e.g., ppt, pdf, doc, etc. file).

In another embodiment, the server 104 allows users at one of the computers 112 to purchase interactive charts over the network 108. For example, the server 104 may include a website that provides purchasable charts at a computer 112 over the network 108. The user communicates a request to purchase an interactive chart from the computer 112 to the server 104 over the network 108. The server 104 then provides the user access to the interactive chart through the website or by transmitting a copy of the interactive chart to the user at the computer 112 over the network 108.

Figure 2:
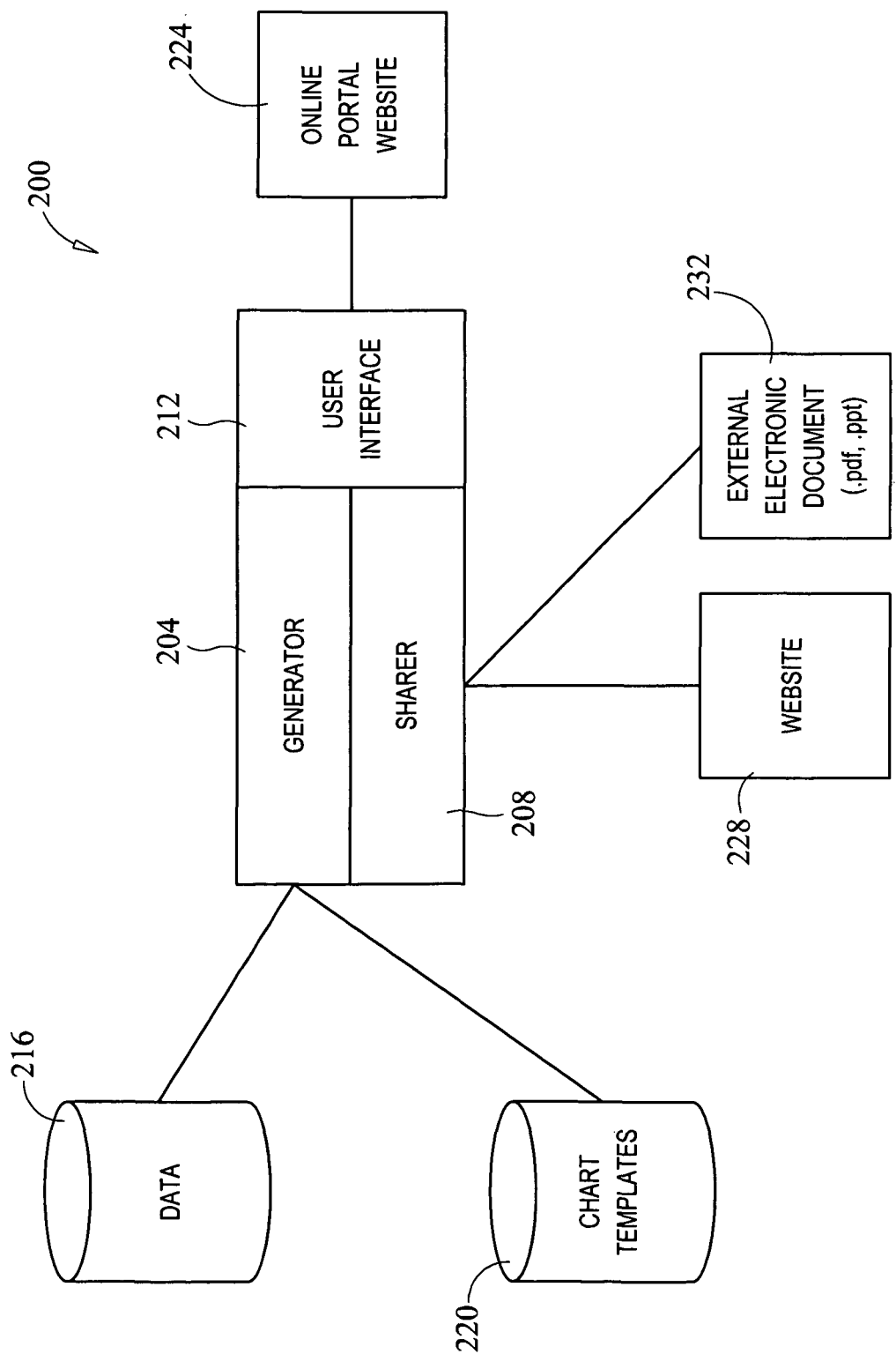
FIG. 2 is a block diagram of an illustrative interactive chart generation and sharing system.

FIG. 2 illustrates an interactive chart online portal 200 for generating and sharing interactive charts according to embodiments of the invention. The interactive chart online portal 200 may be located at the server 100 (see FIG. 1). The interactive chart online portal 200 may be implemented in any type of hardware and software. In one embodiment, interactive chart online portal 200 is created using a flex engine (e.g. Adobe's flash flex development platform).

The interactive chart online portal 200 includes an interactive chart generator 204, an interactive chart sharer 208, a user interface 212, a data store 216 and a chart template data store 220. It will be appreciated that the interactive chart online portal 200 may include fewer or additional components and may have a different arrangement than illustrated in FIG. 2. The interactive chart generator 204 and the interactive chart sharer 208 are functionally connected to the user interface 212.

The user interface 212 is accessed through a website 224 which provides an online portal to the interactive chart generator 204 and the interactive chart sharer 208. It will be appreciated that in alternative embodiments one online portal may provide access to the interactive chart generator 204 while another online portal provides access to the interactive chart sharer 208. Users upload or enter data at the website 224 through the user interface 212 which stores the data in the data store 216. The interactive chart generator 204 uses the data and chart templates stored in the chart template data store 220 to generate the interactive charts.

The interactive chart sharer 208 is also accessed through the website 224 and the user interface 212. The generated interactive chart can be published on an external webpage 228 as an interactive chart or a static chart. The generated interactive chart can also be embedded in an external document 232 as an interactive chart or a static chart. Exemplary external documents 232 include PPT (e.g., power point) documents, PDF (e.g., Adobe) documents, DOC (e.g., Word) documents and the like. It will be appreciated that the interactive chart can be embedded in open source versions of the external documents 232 (e.g., Writer, Impress, etc.) or in other external document types. The generated interactive chart can also be shared by allowing users to purchase the interactive charts (by providing users with a copy of the interactive chart and/or the data associated with the interactive chart).

FIGS. 3-7 illustrate an exemplary interactive chart 300 according to embodiments of the invention. In one embodiment, the interactive chart 300 is a flash file that contains code that a) renders the chart, b) obtains input from the user as per his desired action on this chart (i.e., interactivity), and c) rerenders the chart using the input as parameters. The chart data is stored within the flash file. The data is typically unencrypted but can also be encrypted. The flash file can also fetch data, whether the data is encrypted or not, from an external web-site, proactively.

Online charts are created and stored online as flash files in the web portal. If a chart is embedded into a web-site, a retrieve code is embedded into that sites' HTML code that fetches the flash file from the server when the web page of that site is requested by a user. A lot of web-sites today offer widgets where the embed code can be pasted into the code, avoiding any particular knowledge of coding or HTML. If a chart is updated with new data, the flash file gets recreated and stored. The next time the web page where an interactive charts has been embedded (that is where the embed code that fetches the chart has been implemented) is refreshed, the updated chart is displayed. In one embodiment, the page may be refreshed automatically for a semi-live stream of data or the data may stored separate from the flash file, the separate data file fetched dynamically for real time feeds.

The interactive charts that are downloaded are self-contained flash files that can exist independent of the web portal. The user only requires Adobe Reader (containing Adobe flash player) to execute the code in the flash file. Any electronic document that can play flash can show the interactive charts.

It will be appreciated that although the interactive chart 300 has been described as a flash chart other files having similar features may be used. An exemplary program that is configured to create such a file is Microsoft's Silverlight.

Although the interactive chart 300 shown in FIGS. 3-7 is a line graph, it will be appreciated that the interactive chart 300 may be other chart types. Exemplary chart types include column, bar, combination, bubble, stacked, line, area, pie, doughnut, scatter, candlestick, waterfall, logarithmic, spline, radar, kagi, spark, gantt, funnel, pyramid, gauge, and the like.

Figure 3:
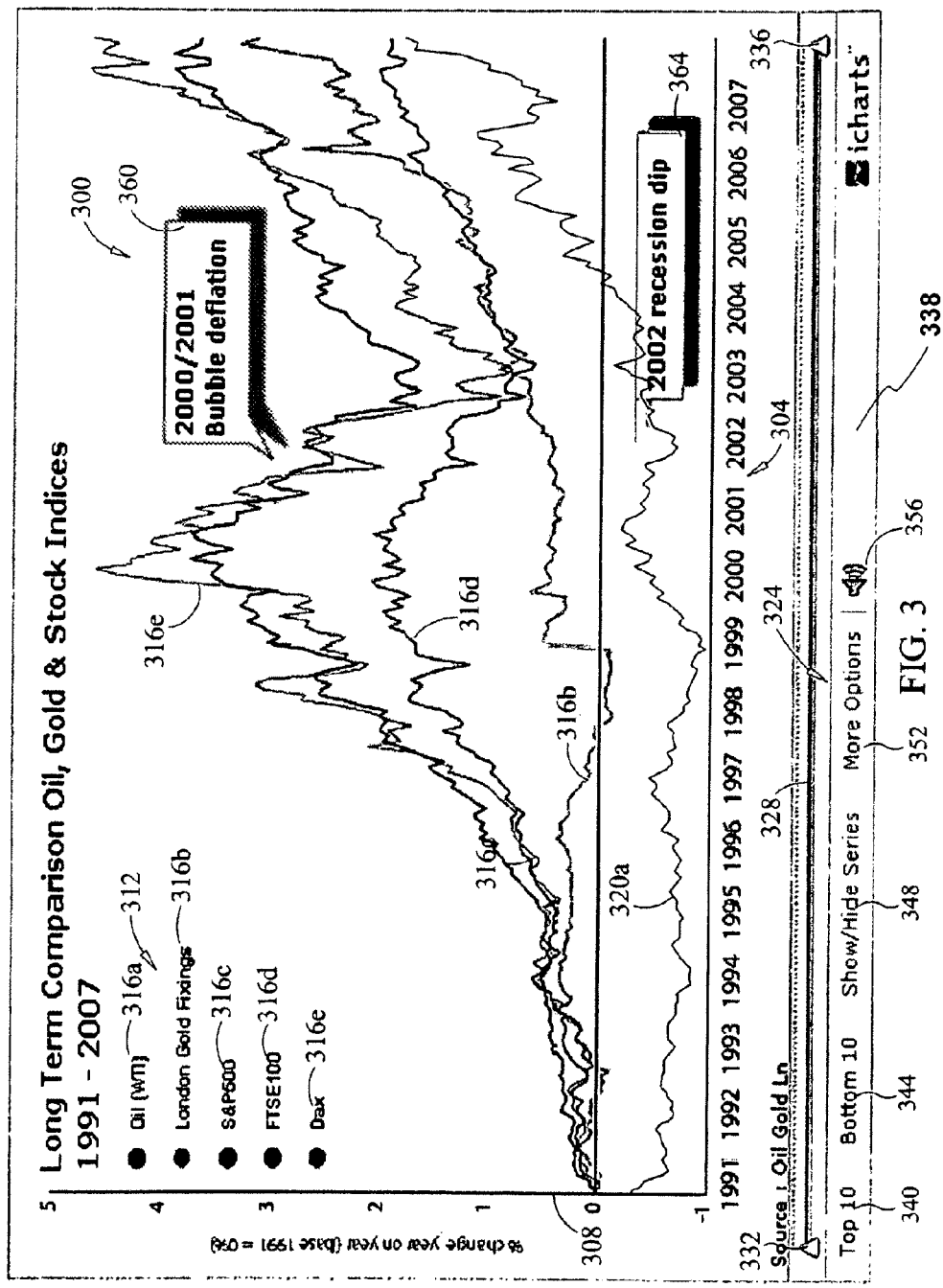
FIG. 3 is a schematic view of an interactive chart in accordance with one embodiment of the invention.

As shown in FIG. 3, the interactive chart 300 includes an x-axis 304, a y-axis 308, a legend 312 having five data series 316a-e, five chart lines 320a-e, and a scale 324. The five chart lines 320a-e correspond with the five data series 316a-e shown in the legend 312. The scale 324 includes a line 328, a first end marker 332 and a second end marker 336. The interactive chart 300 also includes a function bar 338. The function bar 338 is configured to control the interactive chart by providing interactive commands at the function bar 338. The illustrated function bar 338 includes the following selectable tabs: top 10 340, bottom 10 344, show/hide series 348, more options 352 and audio playback 356. Comments 360, 364 are also shown on the chart 300.

As described above, the interactive chart 300 is an interactive chart. That is, the chart 300 has interactive features that allow a user to interact with the chart to, for example, modify or change their view of the chart, learn more about the chart data, and the like. Exemplary interactive features include a zoom feature, a data mouse-over pop-up window, a data hide/share feature, an audio playback feature, a drill down feature, a data gliding feature and the like. Another exemplary interactive feature includes a "Copy-to-my-account" feature which allows a user to copy the chart to an account at an interactive chart, generation and sharing web portal anywhere the user sees the chart online. When the user clicks the "Copy-to-my-account" button, the user is taken to the web portal. The user can then access his account (or create an account) to receive a copy of the chart. The "Copy-to-my-account" feature, therefore, enables chart proliferation outside the web portal (at least initiation of chart proliferation). As will be described in further detail hereinafter, once the chart is in the user's account, the user can modify and/or reformat the chart based on the user's needs.

Figure 4:
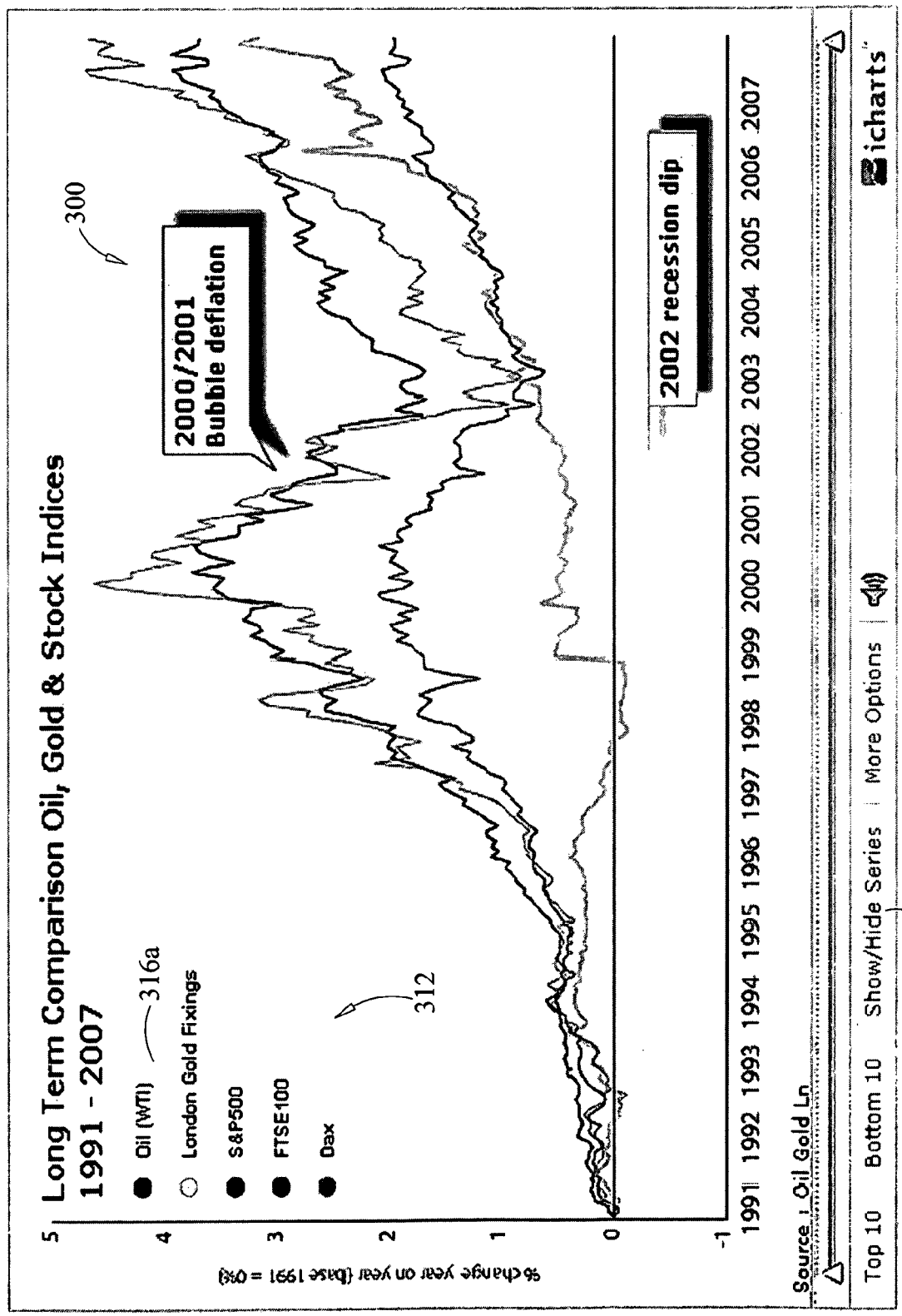
FIG. 4 is a schematic view of the interactive chart of FIG. 3 in accordance with one embodiment of the invention.

In one example of an interactive feature, FIG. 4 illustrates the data hide/share feature. In FIG. 4, the chart line 320a is not shown in the interactive chart (i.e., the chart line 320 is hidden). Users hide the data series (e.g., chart line 320a) by right clicking the data source 316a in the legend 312 and selecting the hide data source from a popup window that appears when the data source 316a is right clicked. Users can also hide the data series by selecting the show/hide series tab 348 and selecting the data series associated with the data source 316a/chart line 320a from a popup window that appears when the show/hide series tab 348 is selected. The user can also show the data series again by right clicking the data source 316a in the legend 312 or selecting the show/hide series tab 348 again and selecting to show the data series from a popup window that appears.

Figure 5:
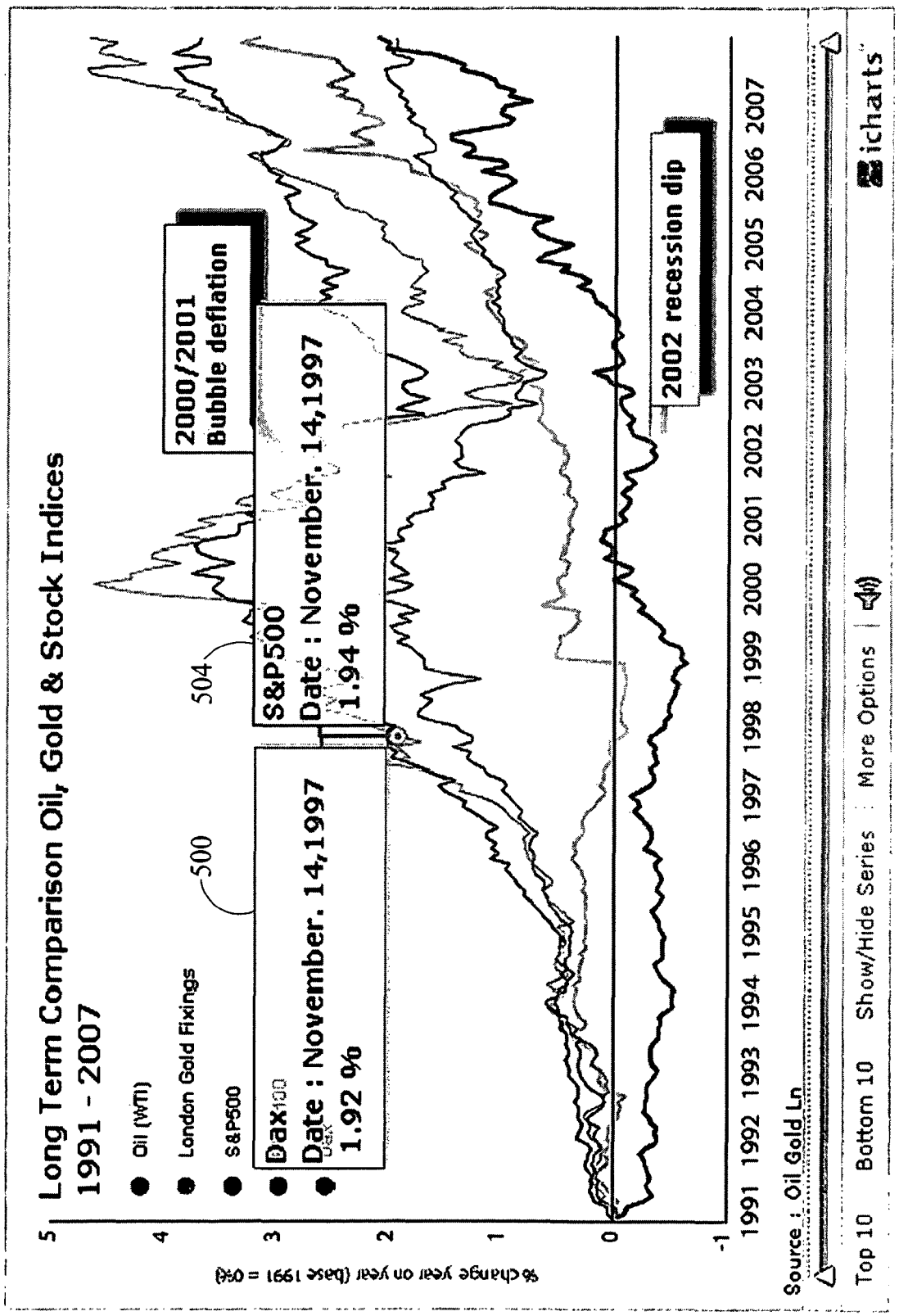
FIG. 5 is a schematic view of the interactive chart of FIG. 3 in accordance with one embodiment of the invention.

In another example, FIG. 5 illustrates the data mouse-over pop-up window interactive feature. In FIG. 5, data points 500 and 504 are highlighted by mousing over or mouse clicking the data points. The user can move the pointer over the chart lines 320a-e to show different data points in the chart 300.

Figure 6:
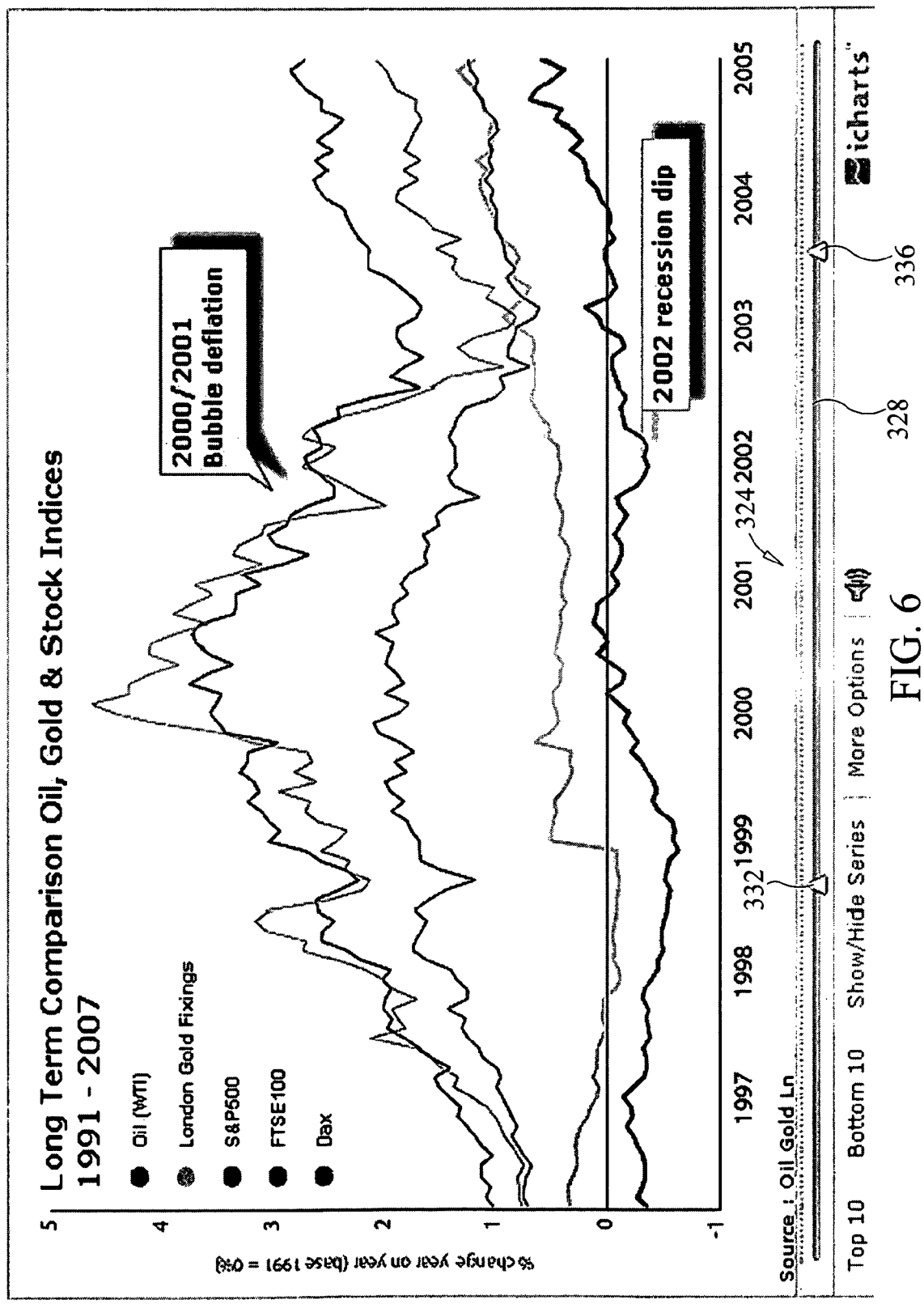
FIG. 6 is a schematic view of the interactive chart of FIG. 3 in accordance with one embodiment of the invention.

FIG. 6 illustrates the zoom interactive feature. In FIG. 6, the first end marker 332 and second end marker 336 have been adjusted on the line 328 to change the data shown in the chart 300. The user can move the end markers 332, 336 to any points on the line 328 to zoom and scroll different portions of the chart 300.

Figure 7:
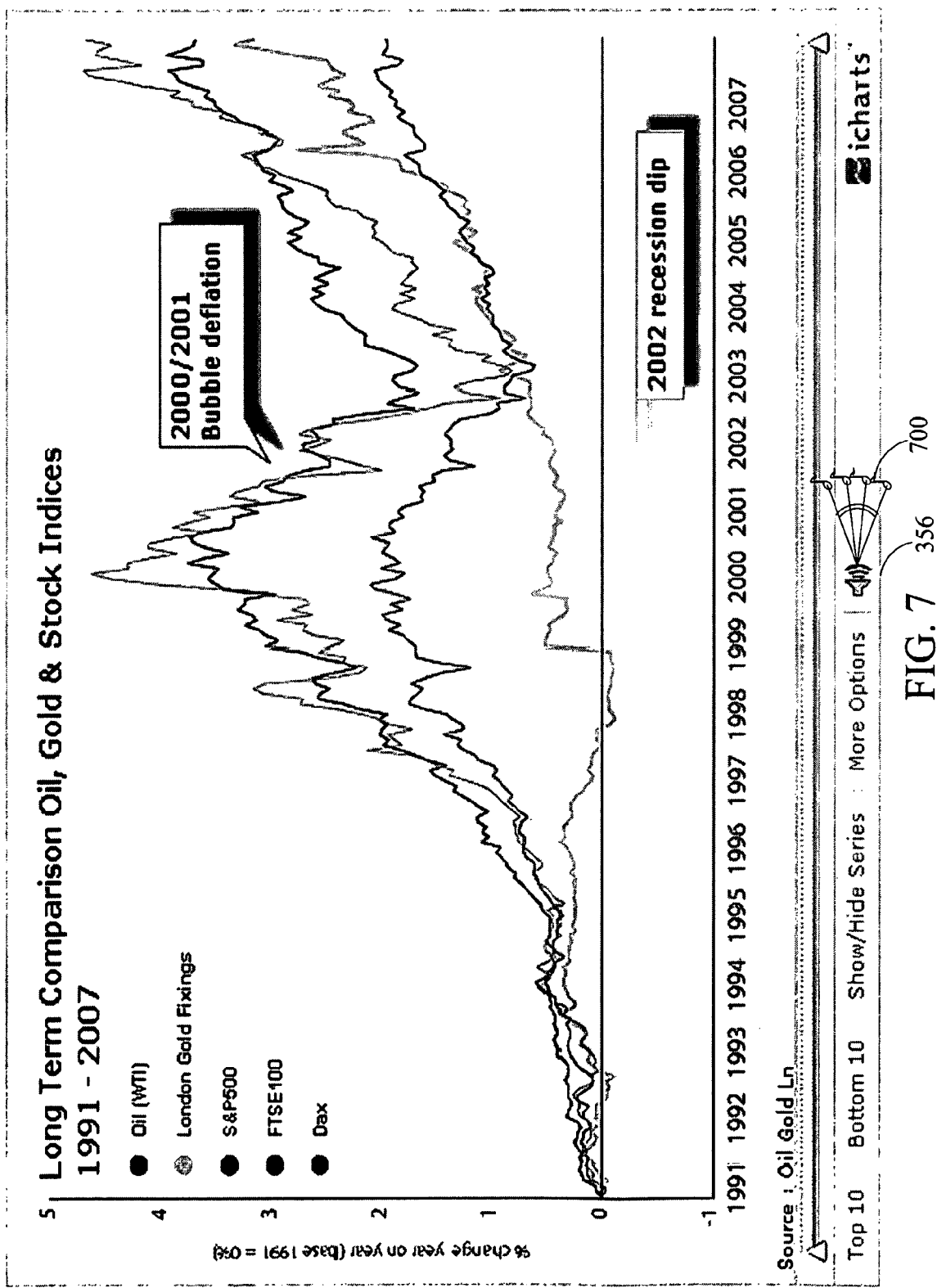
FIG. 7 is a schematic view of the interactive chart of FIG. 3 in accordance with one embodiment of the invention.

FIG. 7 illustrates the audio playback interactive feature in further detail. When a user selects the audio playback button 356, an audio file 700 is played. The audio file 700 may provide an explanation of the interactive chart 300, highlight key data points (e.g., data points 500, 504), discuss the sources of data or provide other information about the interactive chart 300. It will be appreciated that instead of an audio playback interactive feature or in addition to the audio playback interactive feature, a video playback interactive feature may be provided. A video playback button (not shown) may be provided instead of or in addition to the playback button 356. When the video playback button is selected, a video file (not shown) is played.

Figure 8:
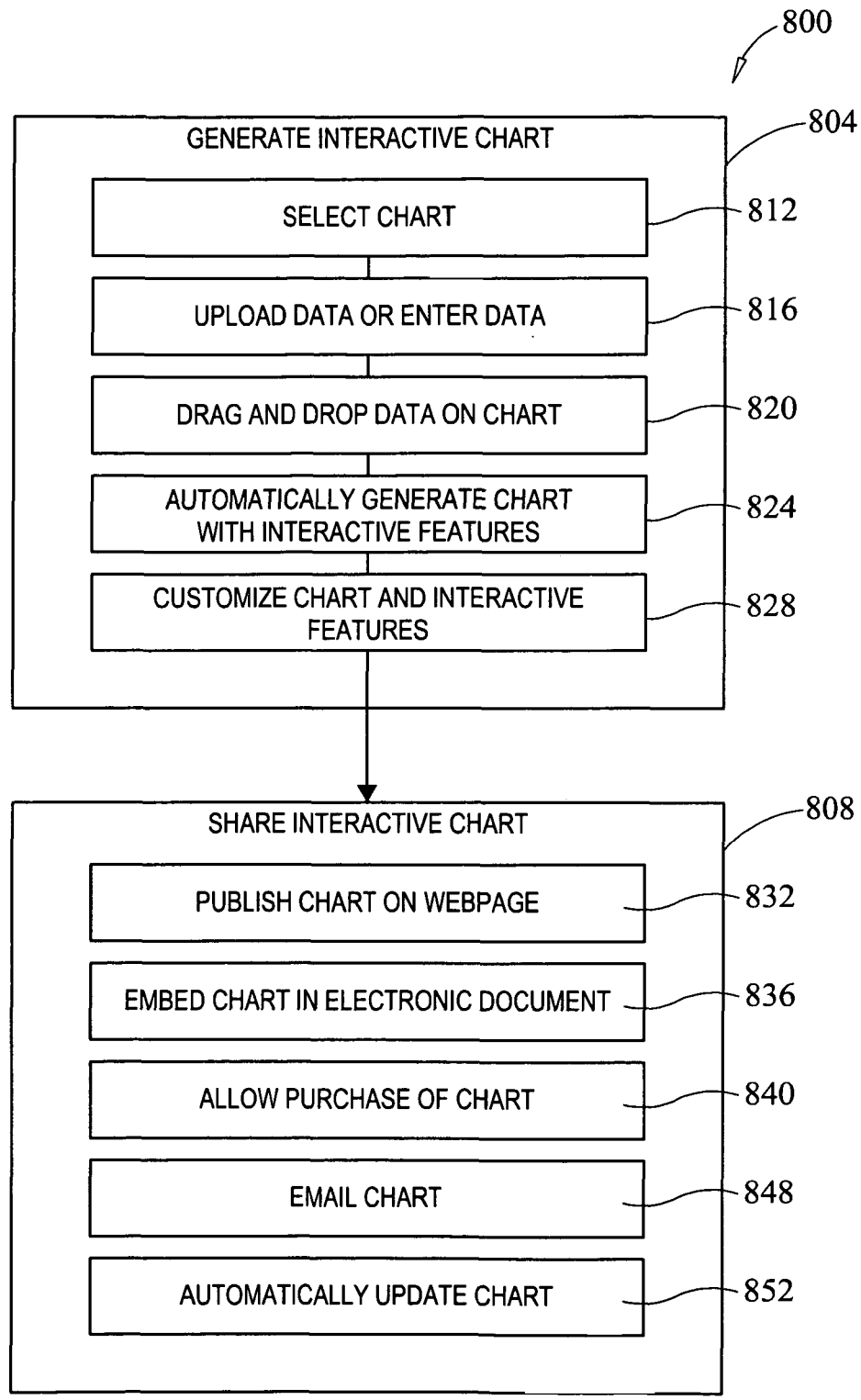
FIG. 8 is a flow diagram of a process of creating, sharing and embedding an interactive chart in accordance with one embodiment of the invention.

FIG. 8 is a flow diagram of a process of generating and sharing interactive charts 800 according to embodiments of the invention. It will be appreciated that the process 800 described below is merely exemplary and may include a fewer or greater number of steps, and that the order of at least some of the steps may vary from that described below.

As shown in FIG. 8, the process 800 begins by generating an interactive chart (block 804) and continues by sharing the interactive chart (block 808).

Generating the interactive chart 804 may include selecting a chart (block 812), uploading data or entering data (block 816), dragging and dropping data on the chart (block 820), automatically generating the chart with interactive features (block 824) and customizing the interactive features (block 828).

Sharing the interactive chart 808 may include publishing the chart in a web page (block 832), embedding the chart in an electronic document (block 836), downloading the chart as an interactive self-contained object that can be embedded elsewhere, publishing the chart to the public section of the web portal, allowing the chart to be purchased (block 840), and/or emailing the chart (block 848). The chart may also be automatically updated (block 852).

FIGS. 9-39 are exemplary screen shots of the user interface 212 for interactive chart generation and sharing. It will be appreciated that the screen shots are merely exemplary and that the user interface 212 and online portal may have a different look and feel than shown in FIGS. 9-39 and that the user interface 212 and online portal may include fewer screens or more screens than shown in FIGS. 9-39. In addition, it will be appreciated that the online portal may have different features or combinations of features than those described herein.

The user interface 212 may be accessed using an Internet browser 908 such as Internet Explorer, Opera, Safari, Firefox, etc. The Internet browser 908 includes an address box 912, a "Go" button 916, forward and backward buttons 920, 924 and a pointer 928 that allow the user to interact with the Internet browser 908. Users access the user interface 212 by, for example, entering a web address associated with the online portal and user interface 212 in the address box 912 and pressing the "Enter" key on the keyboard or pressing the "Go" button 916. Users can navigate through the website by selecting links on the web pages with the pointer 928 and/or pressing keys on they keyboard and/or pressing the forward and backward buttons 920, 924, as known in the art.

Figure 9:
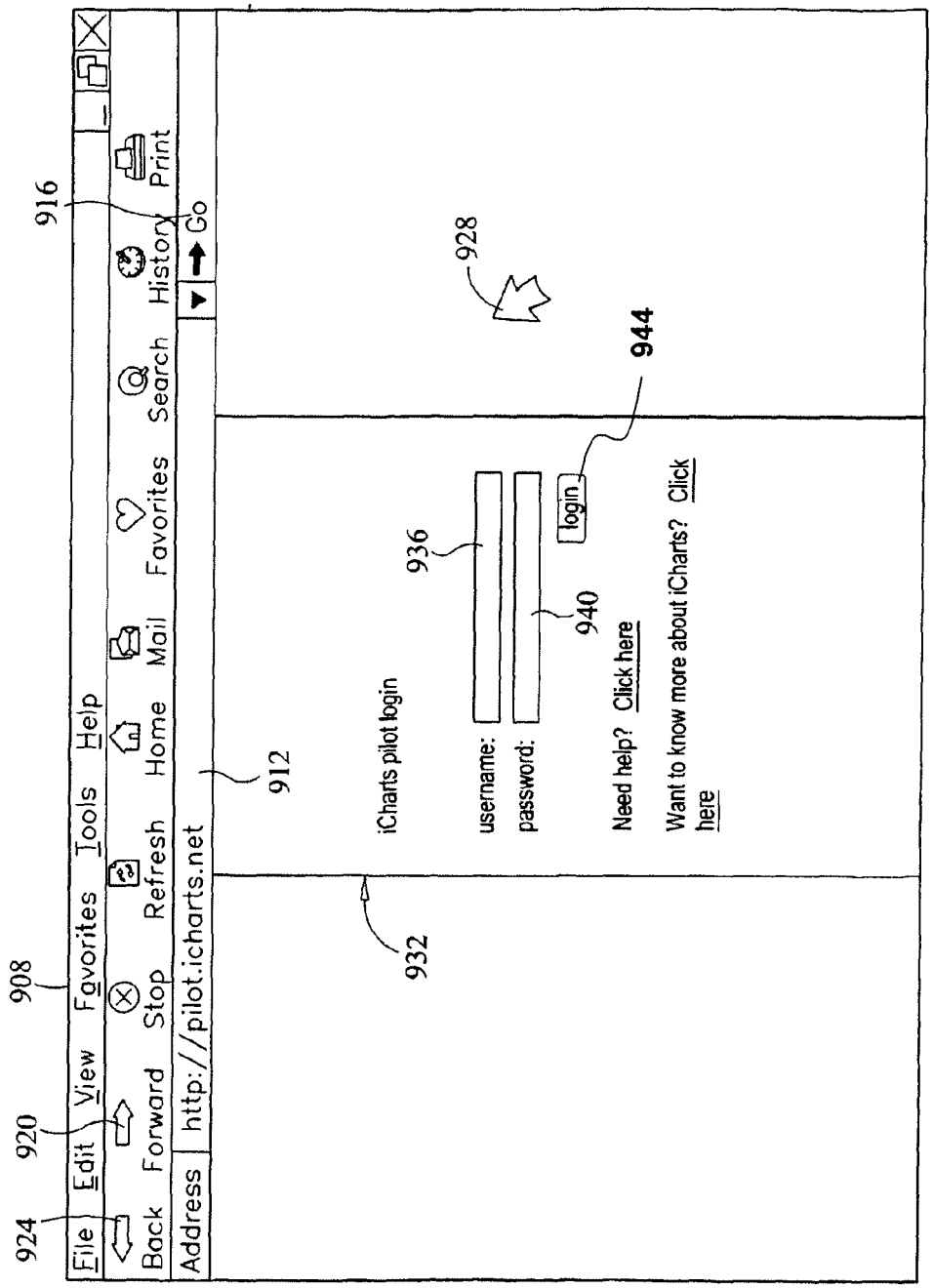
FIG. 9 is a schematic view of a user interface for creating, sharing and embedding an interactive chart in accordance with one embodiment of the invention.

FIG. 9 illustrates an exemplary login screen 932 for the online portal. The login screen 932 includes a name region 936, a password region 940 and a login button 944. A user enters their name in the name region 936 and password in the password region 940 and presents the "enter" key on the keyboard or selects the login button 944 to access the online portal. The online portal then verifies the login information provided by the user and grants the user additional access to the online portal if the verification is successful.

Figure 10:
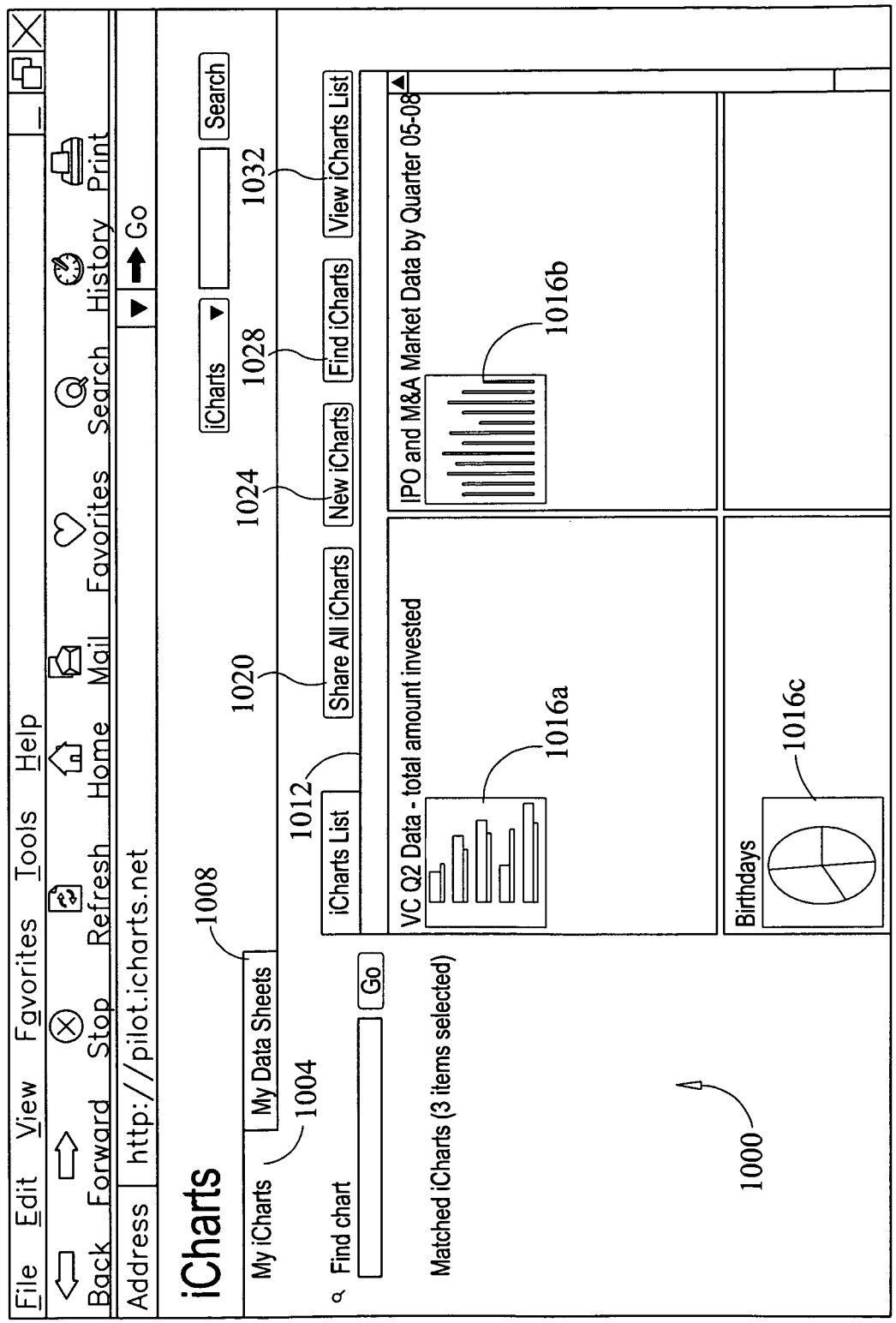
FIG. 10 is a schematic view of a user interface for creating, sharing and embedding an interactive chart in accordance with one embodiment of the invention.

FIG. 10 illustrates a screen shot of a main page 1000 of the online portal. As shown in FIG. 10, the main page 1000 includes a "My icharts" tab 1004 and a "My Data Sheets" tab 1008. The "My icharts" tab 1004 is selected in FIG. 10 and includes an icharts list 1012, which includes three charts 1016a-c. The "My icharts" tab 1004 also includes a Share All icharts button 1020, a new ichart button 1024, a find ichart button 1028 and a view icharts list button 1032.

Figure 11:
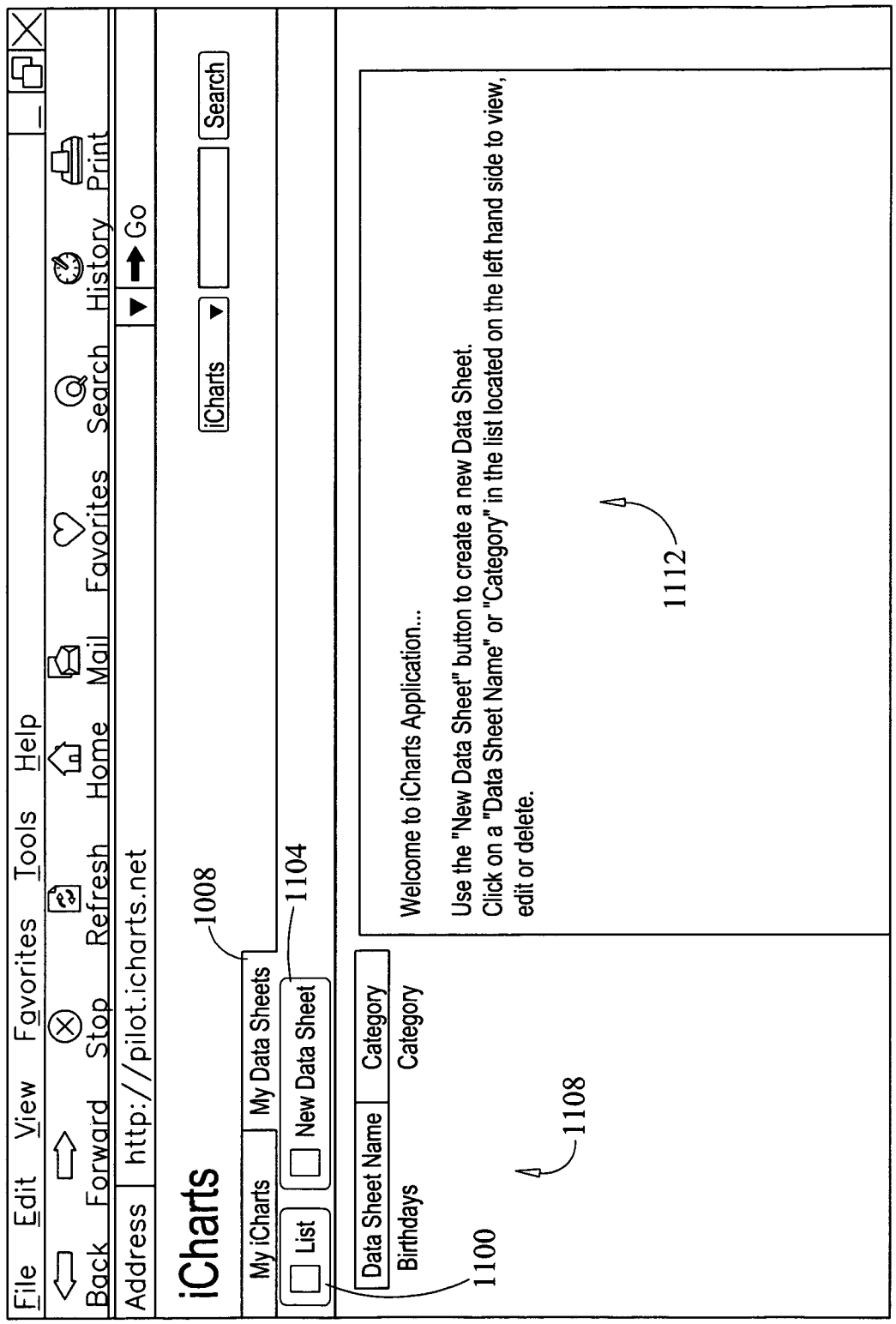
FIG. 11 is a schematic view of a user interface for creating, sharing and embedding an interactive chart in accordance with one embodiment of the invention.

FIG. 11 illustrates a screen shot of the My Data Sheets tab 1008. The My Data Sheets tab 1008 includes a list button 1100 and a new data sheet button 1104. The My Data Sheets tab 1008 includes a data sheet pane 1108 that includes a list of data sheet sheets created, owned or otherwise accessible by the user. The My Data Sheets tab 1008 also includes a introduction pane 1112 which includes instructions for creating a new data sheet or modifying an existing data sheet.

Figure 12:
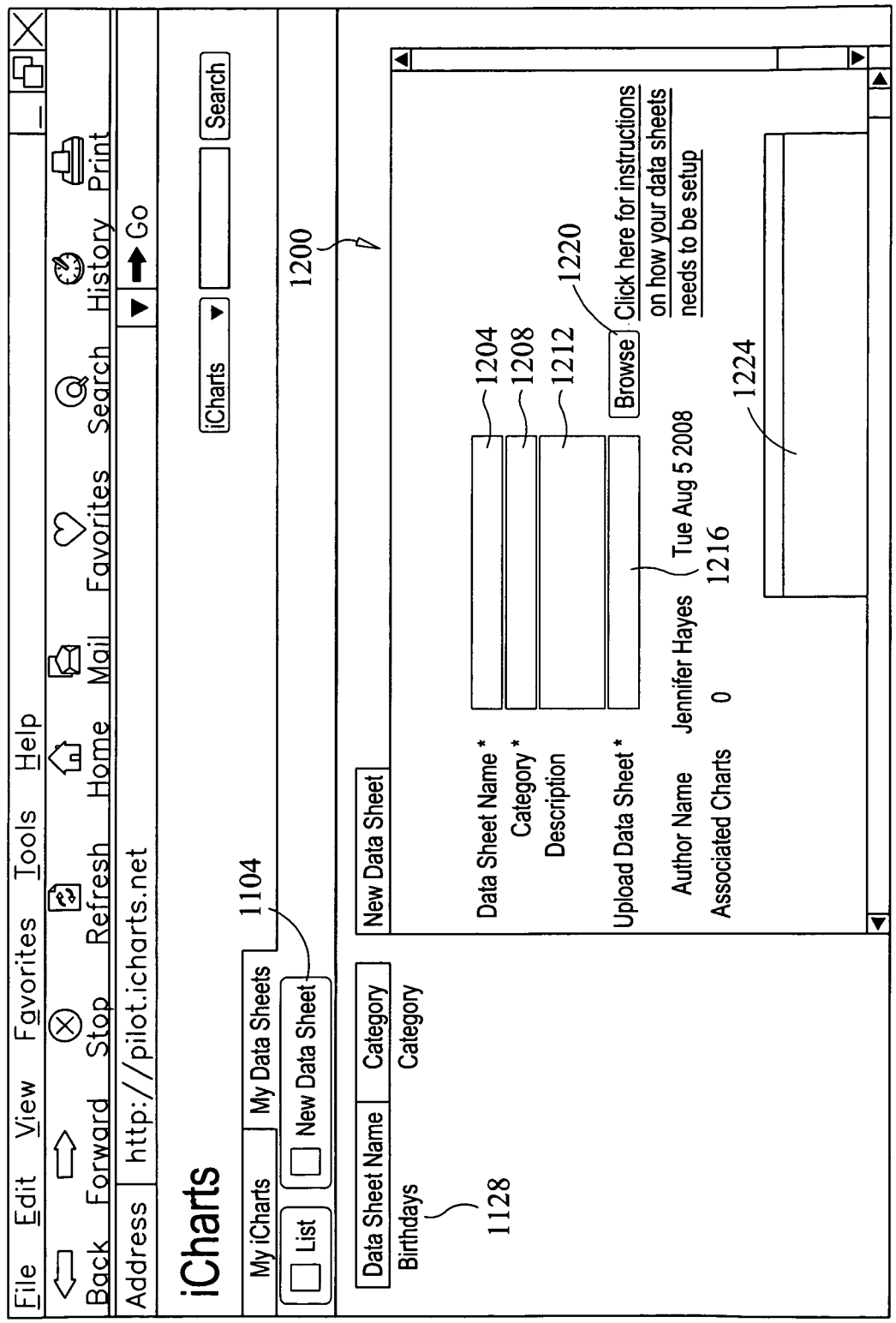
FIG. 12 is a schematic view of a user interface for creating, sharing and embedding an interactive chart in accordance with one embodiment of the invention.
Figure 13:
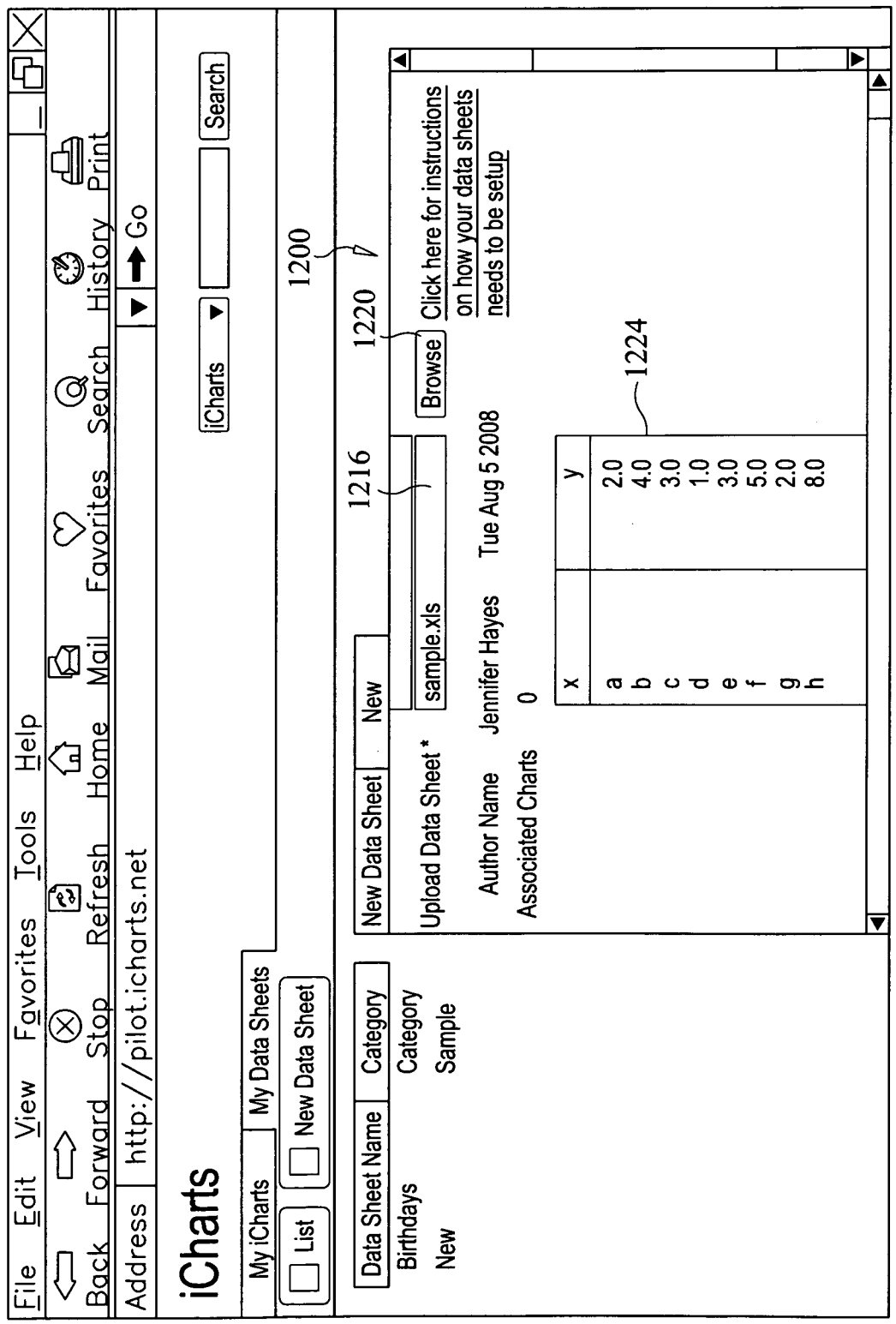
FIG. 13 is a schematic view of a user interface for creating, sharing and embedding an interactive chart in accordance with one embodiment of the invention.

FIG. 12 illustrates the online portal when the new data sheet button 1104 is selected. In FIG. 12, introduction pane 1112 is replaced with a new data sheet pane 1200. The new data sheet pane 1200 includes a data sheet name region 1204, a category region 1208, a description region 1212, an upload data sheet region 1216, a browse button 1220, and an information region 1224. Users can upload a data file from, for example, an Excel spread sheet using the upload data sheet region 1216 and the browse button 1216. The uploaded data is then shown in the information region 1224 as shown in FIG. 13. Alternatively, users can enter data by manually entering the data directly in the information region 1224, as shown in FIG. 13.

Figure 14:
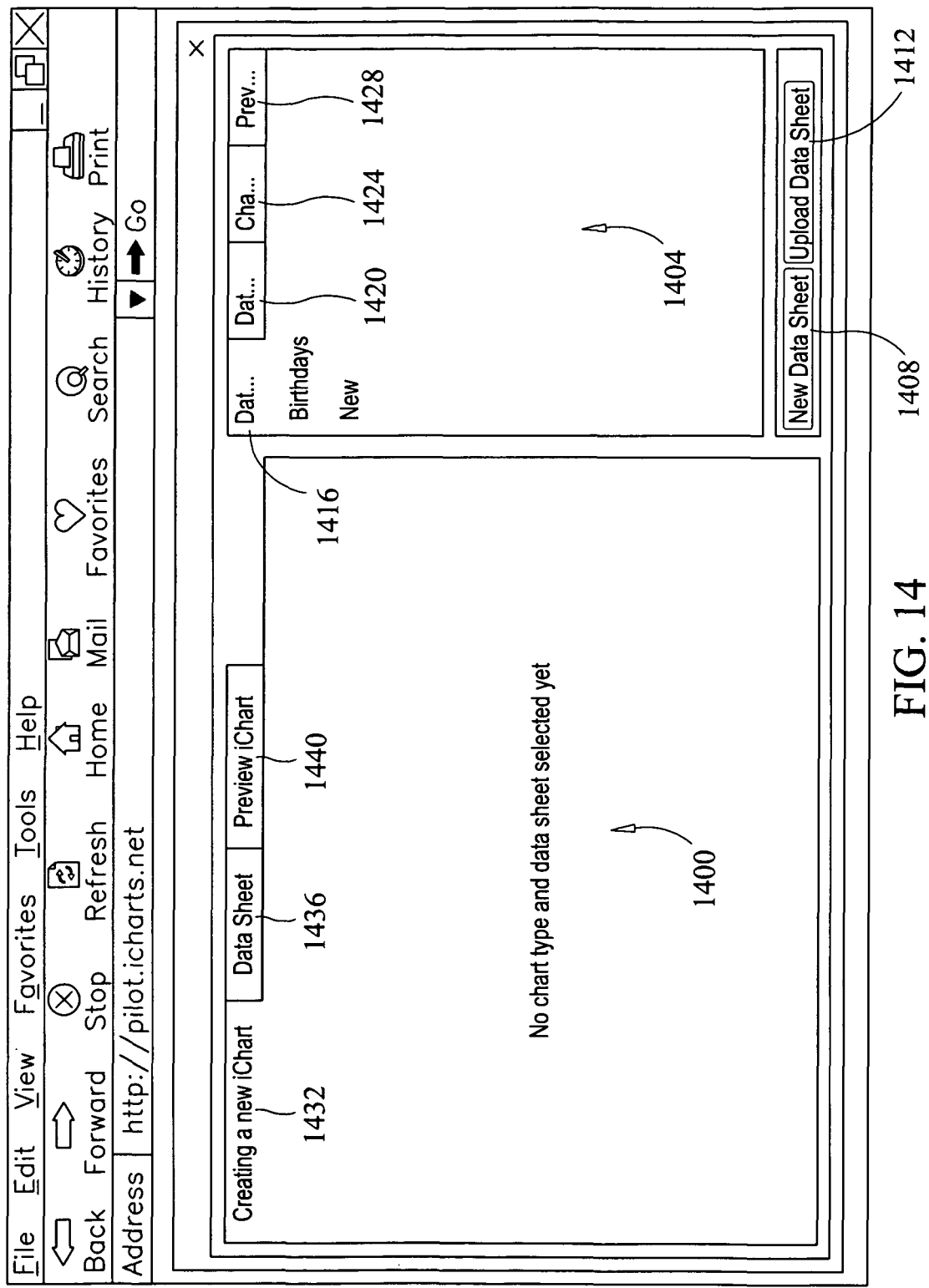
FIG. 14 is a schematic view of a user interface for creating, sharing and embedding an interactive chart in accordance with one embodiment of the invention.

FIG. 14 illustrates the online portal when the my icharts tab 1004 is selected. As shown in FIG. 14, when a user creates a new ichart, the online portal includes a charting pane 1400 and a data pane 1404. The charting pane 1400 is used to create and preview the chart, and the data pane 1404 provides a list of data sheets. The data pane 1404 also includes buttons 1408 and 1412 which allow the user to create a new data sheet or upload a data sheet, respectively, as described above. The data pane 1404 also includes selectable tabs: data list 1416, data detail 1420, chart type 1424 and preview 1428. The charting pane 1400 also includes the following selectable tabs: create a new ichart 1423, data sheet 1436 and preview ichart 1440.

Figure 15:
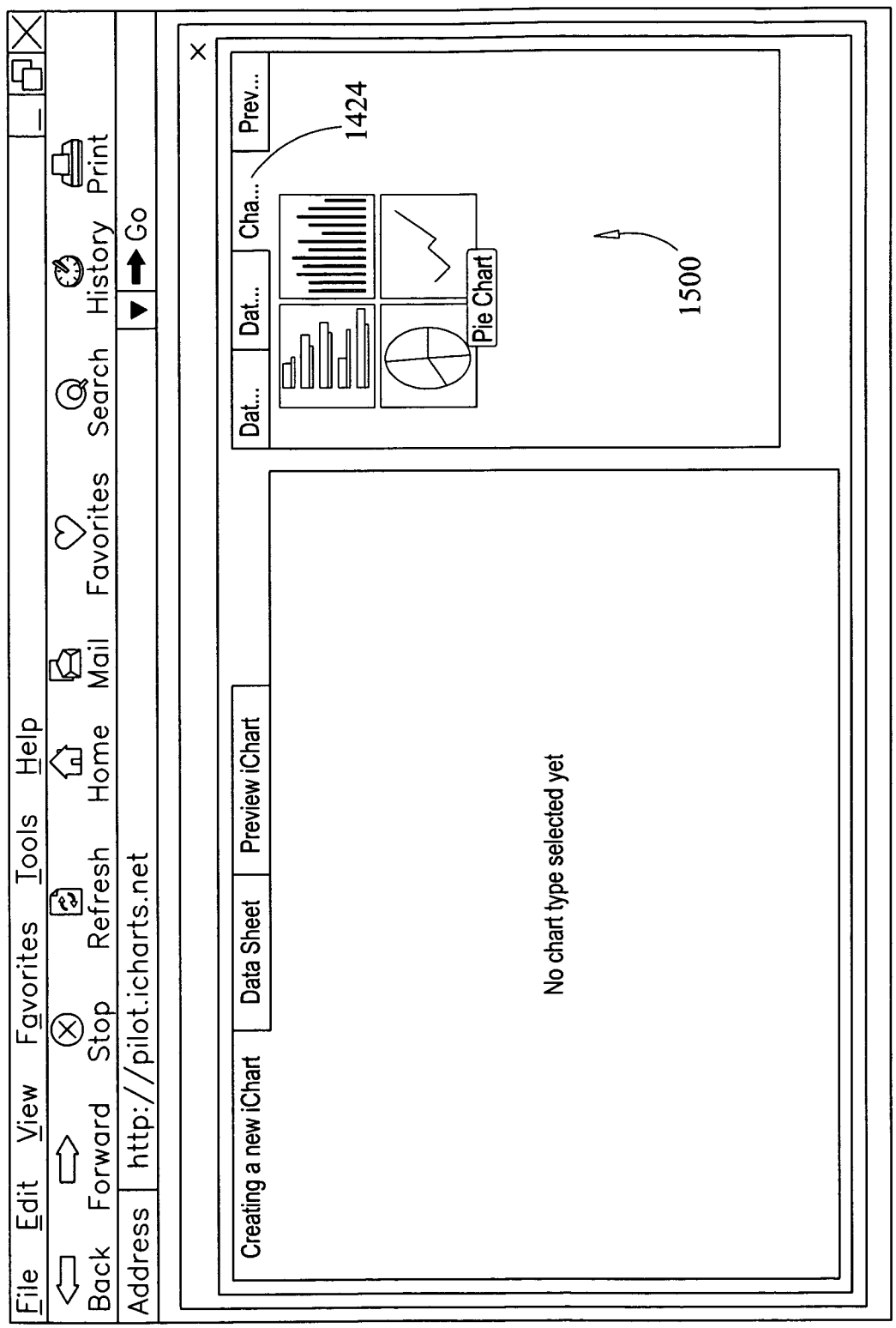
FIG. 15 is a schematic view of a user interface for creating, sharing and embedding an interactive chart in accordance with one embodiment of the invention.

When a user clicks on the charting pane 1400, several chart types 1500 are displayed in the chart type tab 1424 of the data pane 1404, as shown in FIG. 15. Exemplary chart types 1500 include column charts, bar charts, line graphs and pie charts, as shown in FIG. 15. Other exemplary chart types 1500 not shown in FIG. 15 include, for example, combination, bubble, stacked, area, doughnut, scatter, candlestick, waterfall, logarithmic, spline, radar, kagi, spark, gantt, funnel, pyramid, gauge, and the like.

Figure 16:
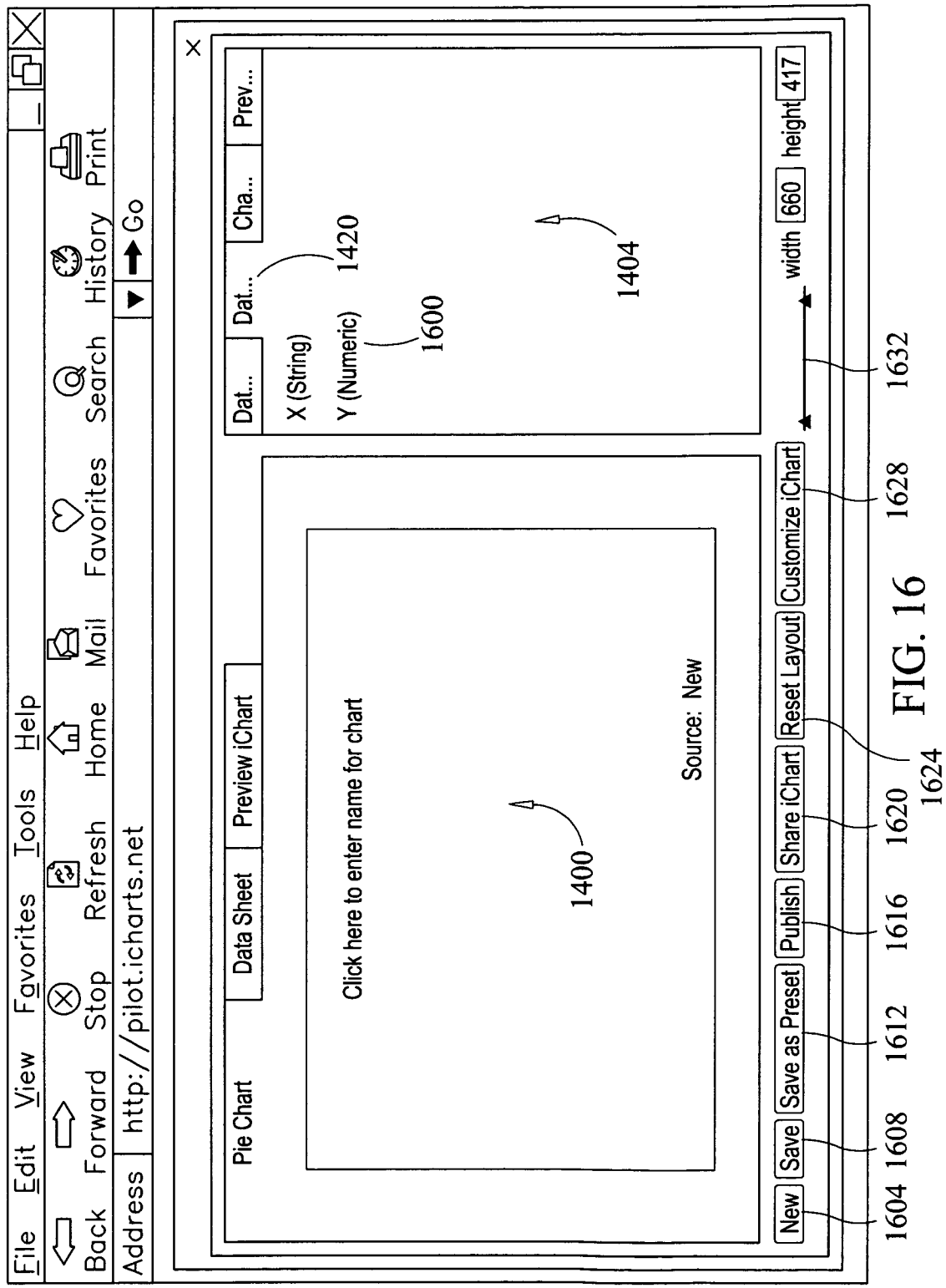
FIG. 16 is a schematic view of a user interface for creating, sharing and embedding an interactive chart in accordance with one embodiment of the invention.

When a user selects a chart type 1500, a blank charting area is shown in the charting pane 1400, as shown in FIG. 16. The user then selects data from the data pane 1404 in the detailed data tab 1420 by clicking on the data with the mouse. The user continues to click on the data and drags and drops the data from the data pane 1404 and onto the chart pane 1400 by moving the pointer 928 from the data pane 1404 to the chart pane 1400 and releasing the mouse button (i.e., the user drag and drops data from the data pane 1404 to the chart pane 1400). In particular, the user drags and drops data onto the x-axis for x-axis data, and drags and drops data onto the y-axis for y-axis data.

As shown in FIG. 16, when the chart type 1500 is selected, the online portal includes selectable buttons: new 1604, save 1608, save as preset 1612, publish 1616, share ichart 1620, reset layout 1624, and customize ichart 1628. The online portal also includes a scale 1632.

Figure 17:
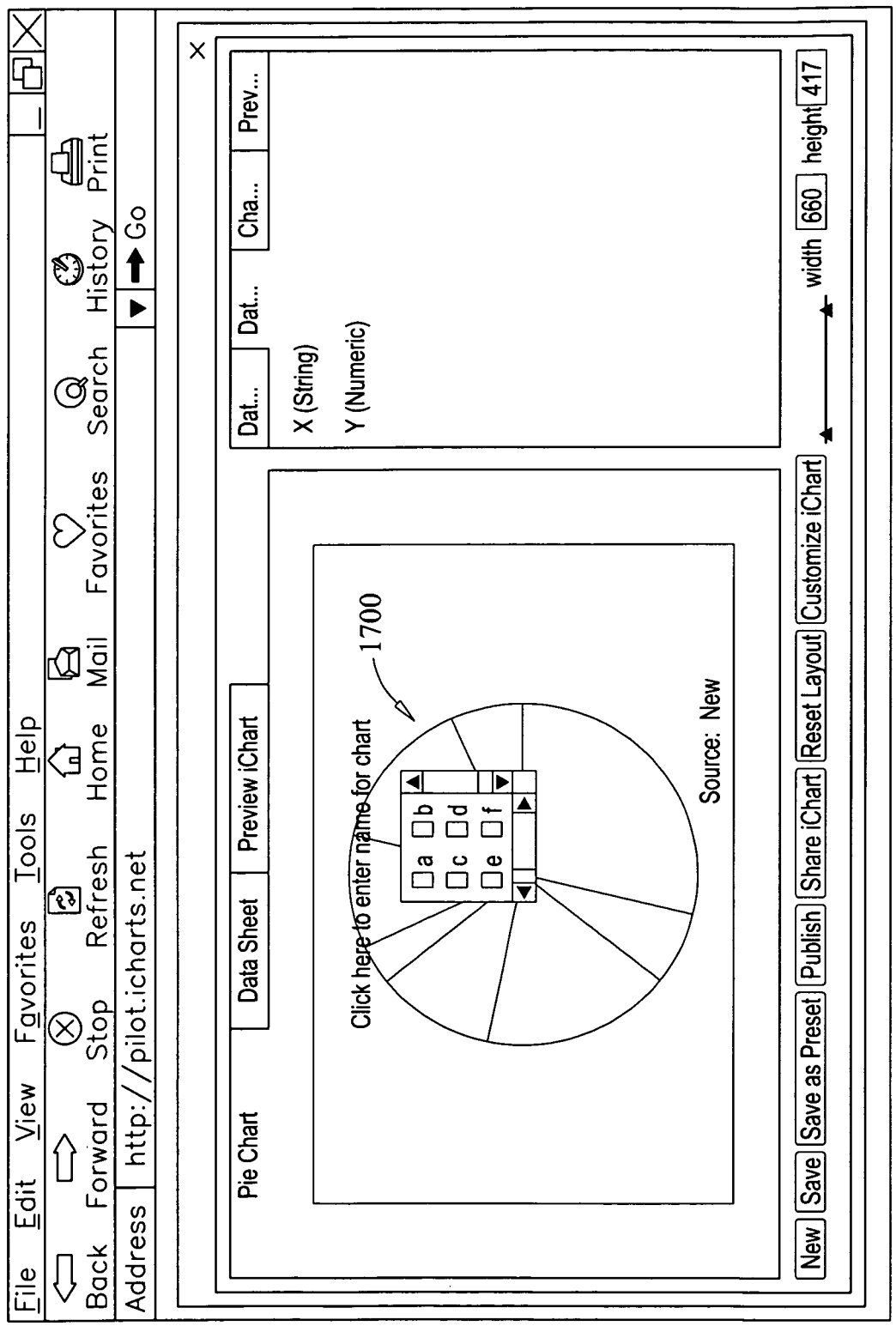
FIG. 17 is a schematic view of a user interface for creating, sharing and embedding an interactive chart in accordance with one embodiment of the invention.

When the user drags and drops the data on the chart pane 1400, an interactive chart 1700 is automatically generated as shown in FIG. 17. The interactive chart has interactive features as described above with reference to FIGS. 3-7. The audio playback interactive feature can be added by recording an audio file using the online portal or uploading an audio file to the online portal. The audio playback interactive feature can be added before the chart is automatically generated or after the chart is automatically generated. Similarly, the video playback interactive feature can be added by recording a video file using the online portal or uploading a video file to the online portal. The video playback interactive feature can also be added before the chart is automatically generated or after the chart is automatically generated.

Figure 18:
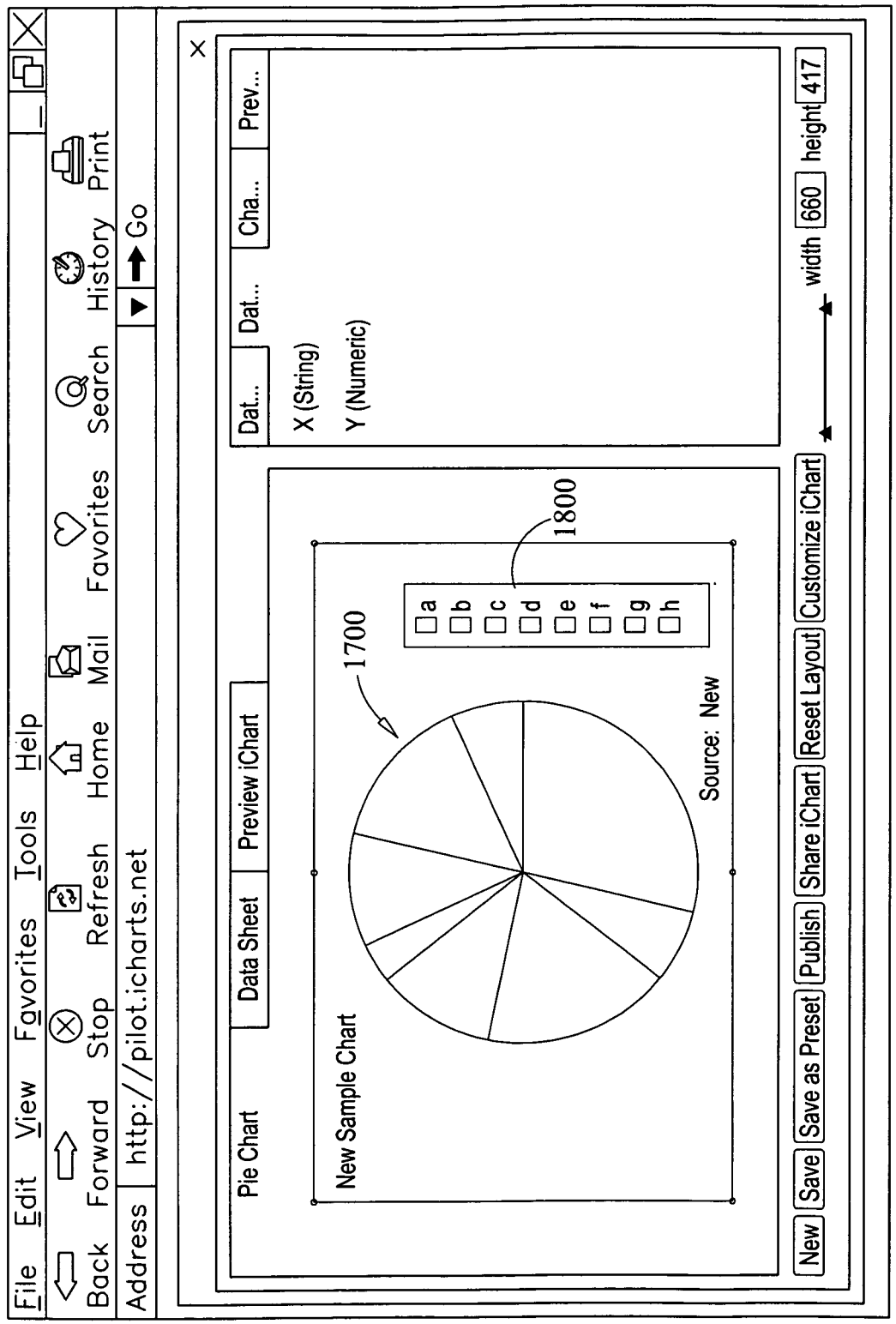
FIG. 18 is a schematic view of a user interface for creating, sharing and embedding an interactive chart in accordance with one embodiment of the invention.
Figure 19:
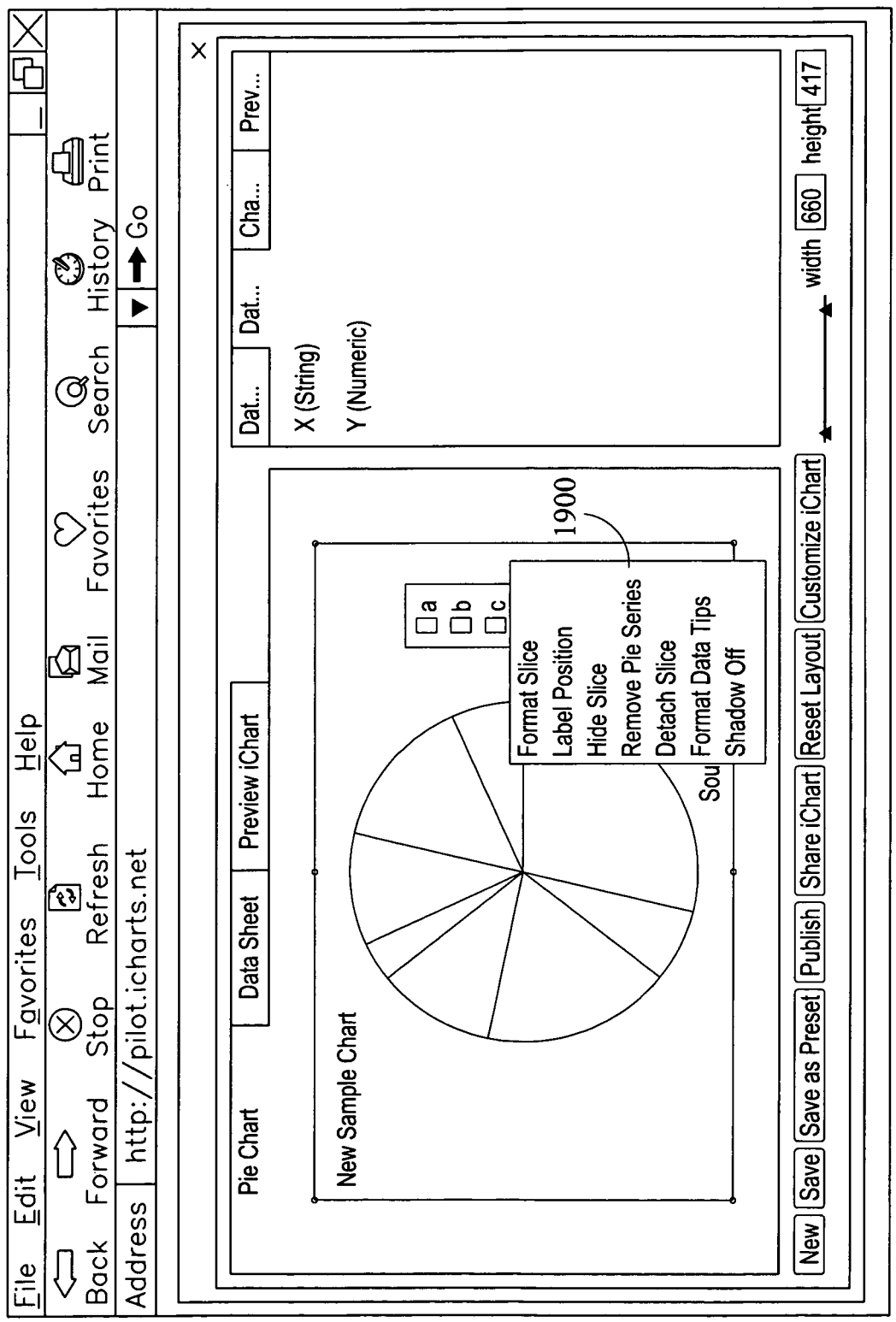
FIG. 19 is a schematic view of a user interface for creating, sharing and embedding an interactive chart in accordance with one embodiment of the invention.
Figure 20:
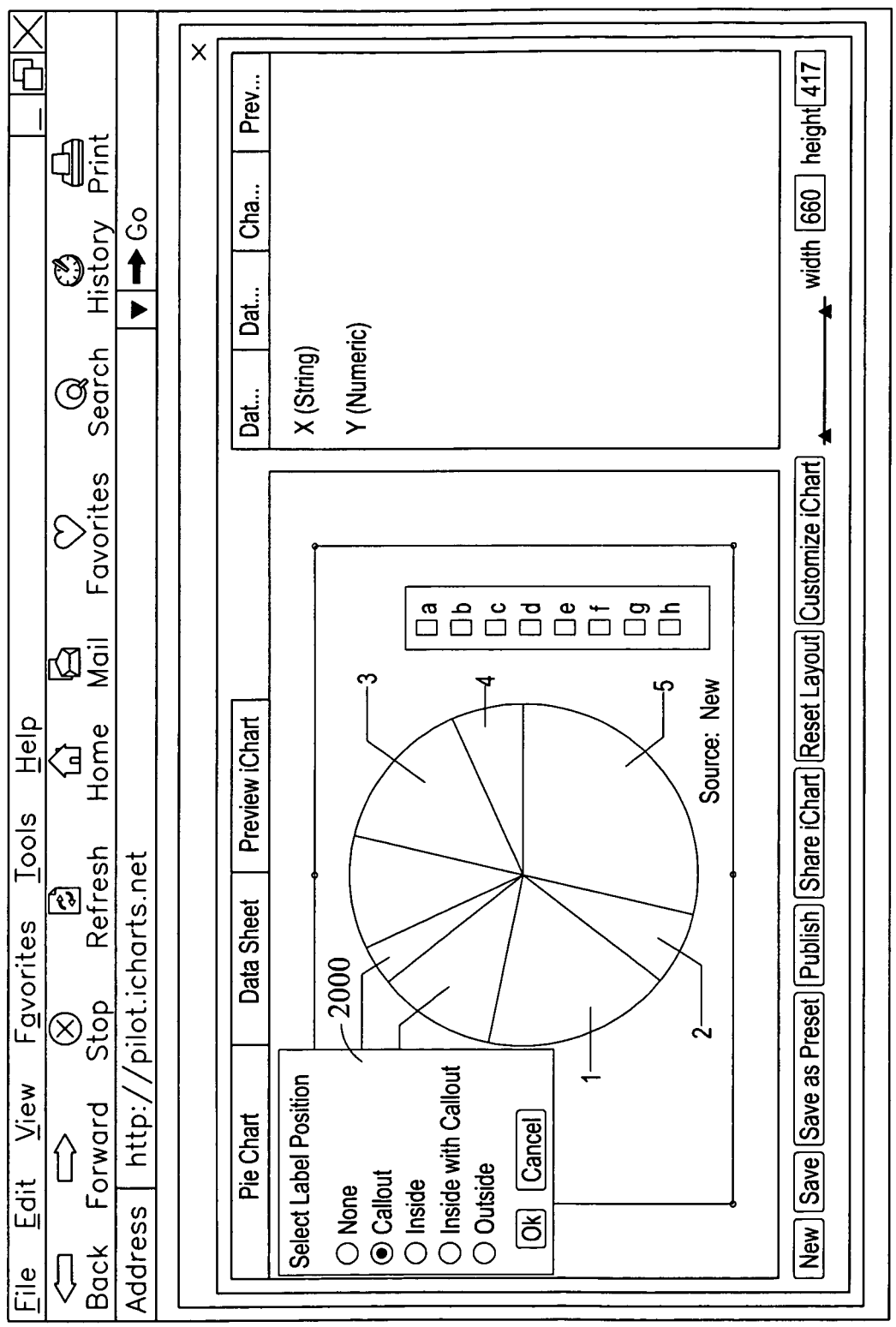
FIG. 20 is a schematic view of a user interface for creating, sharing and embedding an interactive chart in accordance with one embodiment of the invention.
Figure 21:
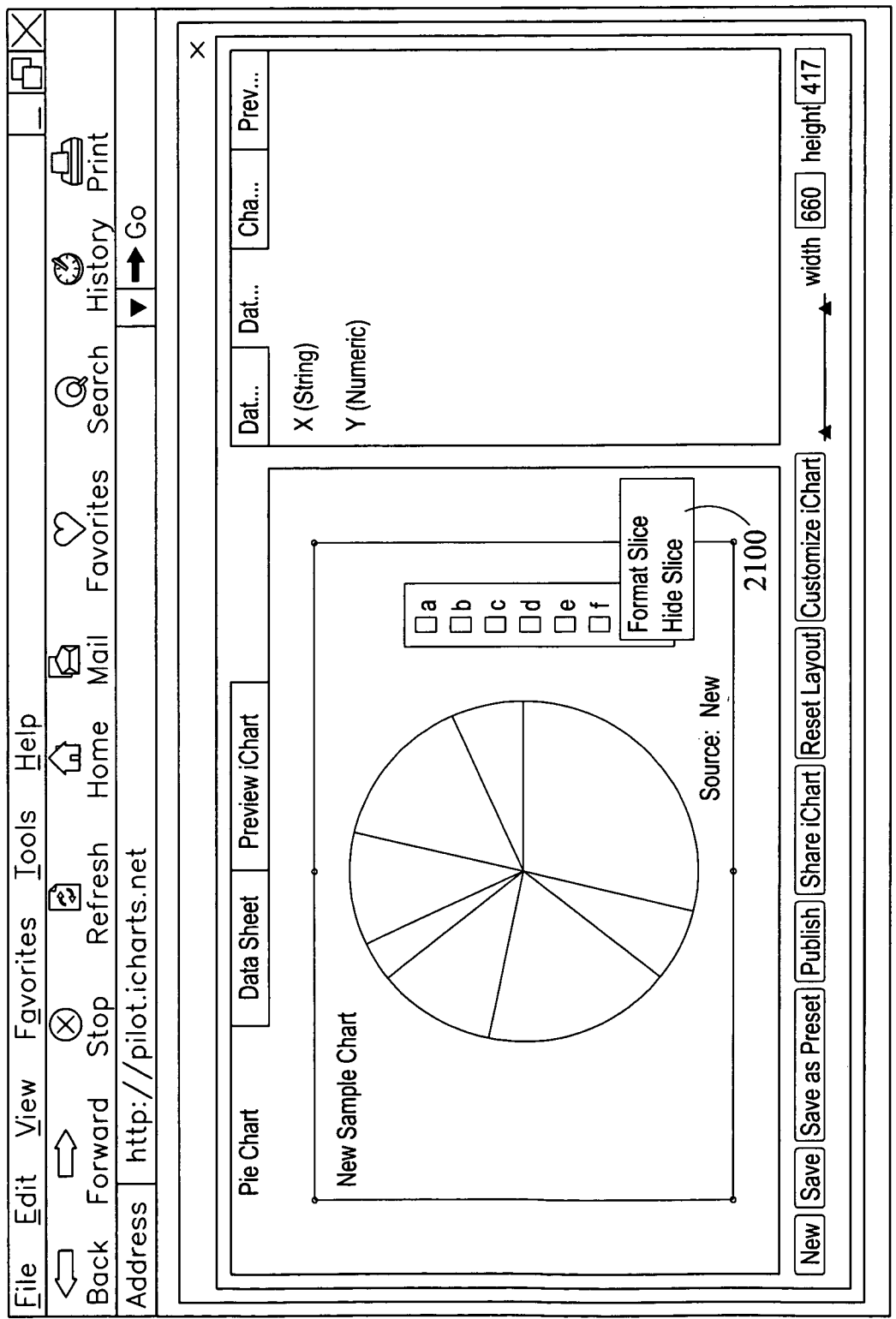
FIG. 21 is a schematic view of a user interface for creating, sharing and embedding an interactive chart in accordance with one embodiment of the invention.

The user can then manipulate the chart 1700 to have the look and feel and interactive features that the user desires as shown in FIGS. 18-21. In FIG. 18, the legend 1800 is moved from on top of the chart 1700 to a different region and the size of the legend 1800 is modified. As shown in FIG. 19, when a user right clicks on the chart 1700, a popup window 1900 is formed on the charting pane 1400. The illustrated popup window 1900 includes the following options: format slice, label position, hide slice, remove pie series, detach slice, format data tips, and shadow off. If a user selects the select label position as shown in FIG. 20, a select label position popup window 2000 appears. The illustrated popup window 2000 includes the following options: none, callout, inside, inside with callout, and outside. As shown in FIG. 21, if a user right clicks on the legend 1800, a popup window 2100 appears. The popup window 2100 includes the following options: format slice and hide slice. It will be appreciated that the options that appear in the popup windows will vary depending on the chart type (i.e., line graphs have different options than bar graphs which have different options than the pie chart).

Figure 22:
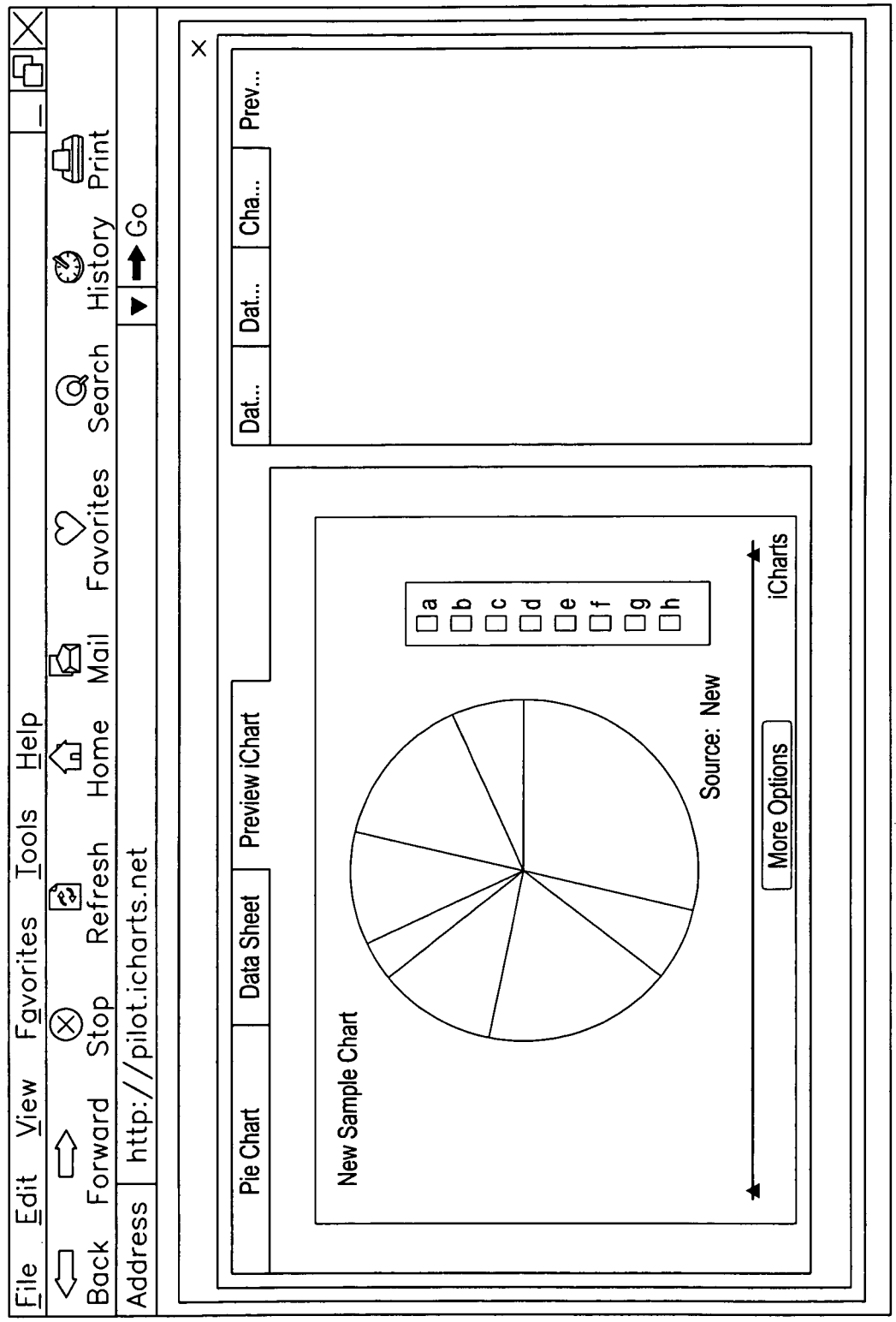
FIG. 22 is a schematic view of a user interface for creating, sharing and embedding an interactive chart in accordance with one embodiment of the invention.

When a user has completed customization of the chart 1700, the user can preview the chart 1700 by selecting the preview ichart tab 1440 or the preview ichart tab 1428 as shown in FIG. 22. The chart 1700 is an interactive chart as described above with reference to FIGS. 3-7.

In one embodiment, users can store the chart 1700 as a chart template by selecting the save as preset button 1612. Chart templates allow the users to create interactive charts in the future that have the same look and feel as the generated chart 1700.

Figure 23:
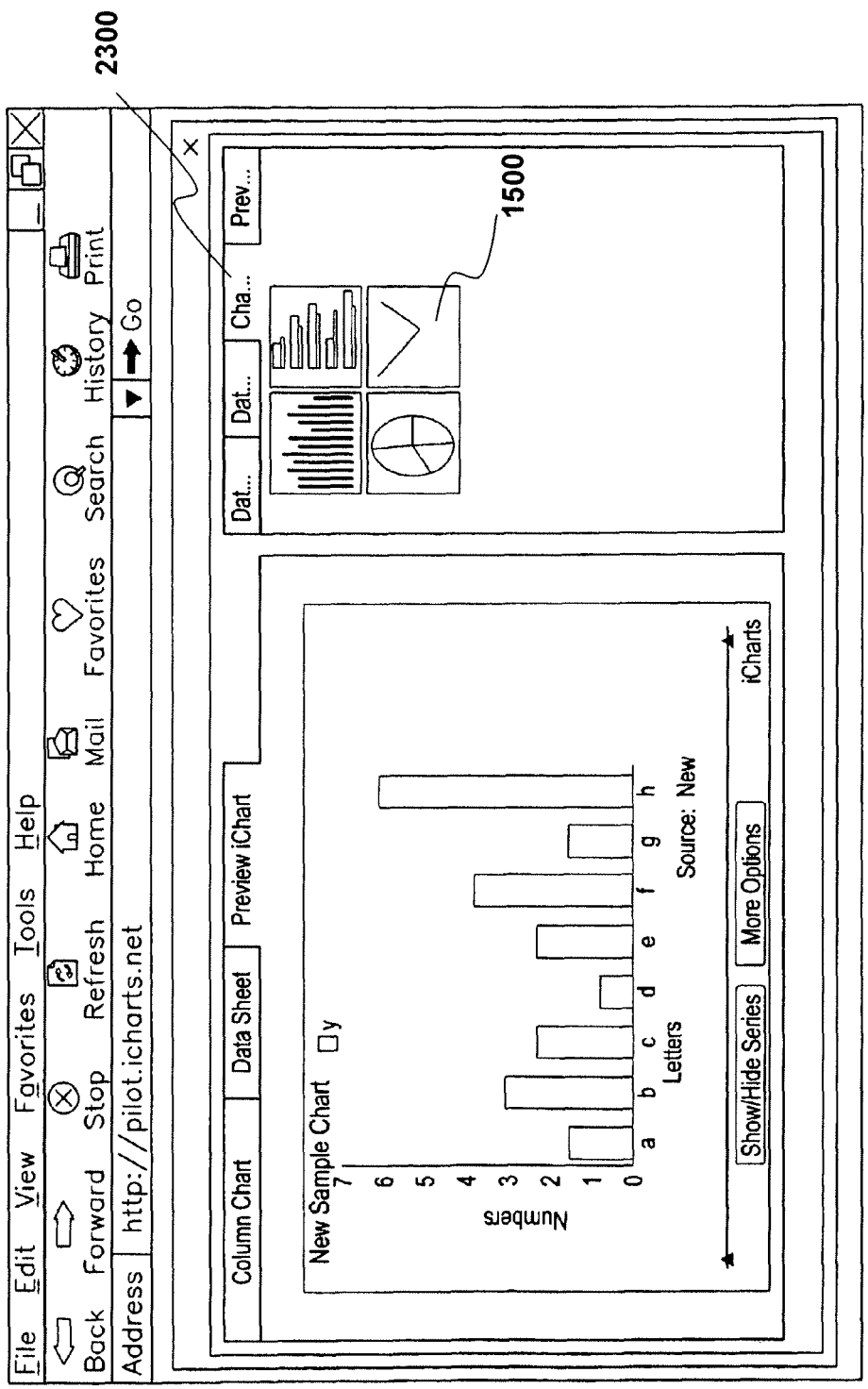
FIG. 23 is a schematic view of a user interface for creating, sharing and embedding an interactive chart in accordance with one embodiment of the invention.

As shown in FIG. 23, the user can modify the chart type, by selecting the chart tab 2300 and then selecting a different chart type 1500. The chart is automatically updated. For example, in FIG. 23 by selecting the bar chart type 1500 from the chart type tab 1424 in the data pane 1404, the chart type is automatically changed from a pie chart to a bar chart.

Figure 24:
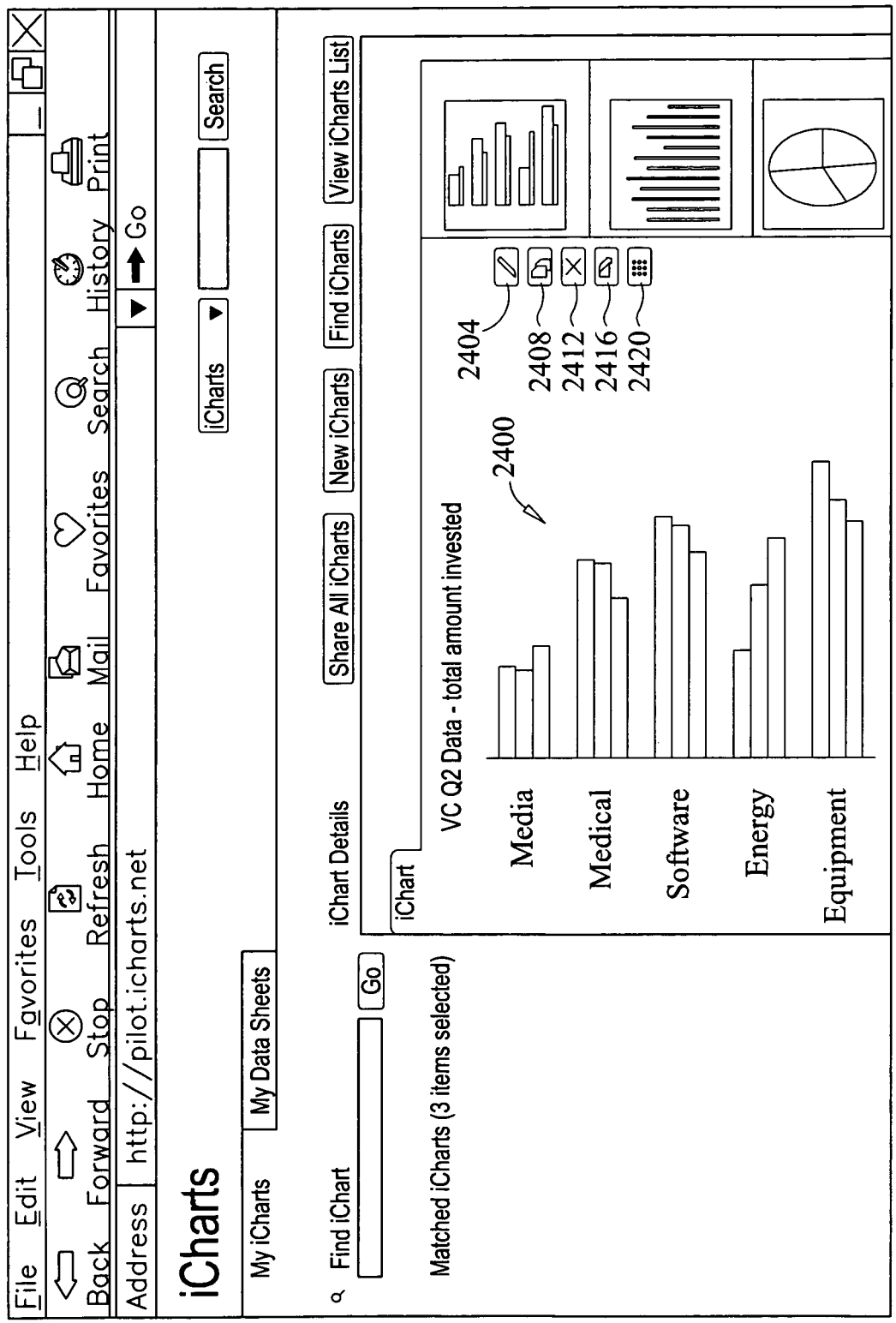
FIG. 24 is a schematic view of a user interface for creating, sharing and embedding an interactive chart in accordance with one embodiment of the invention.
Figure 25:
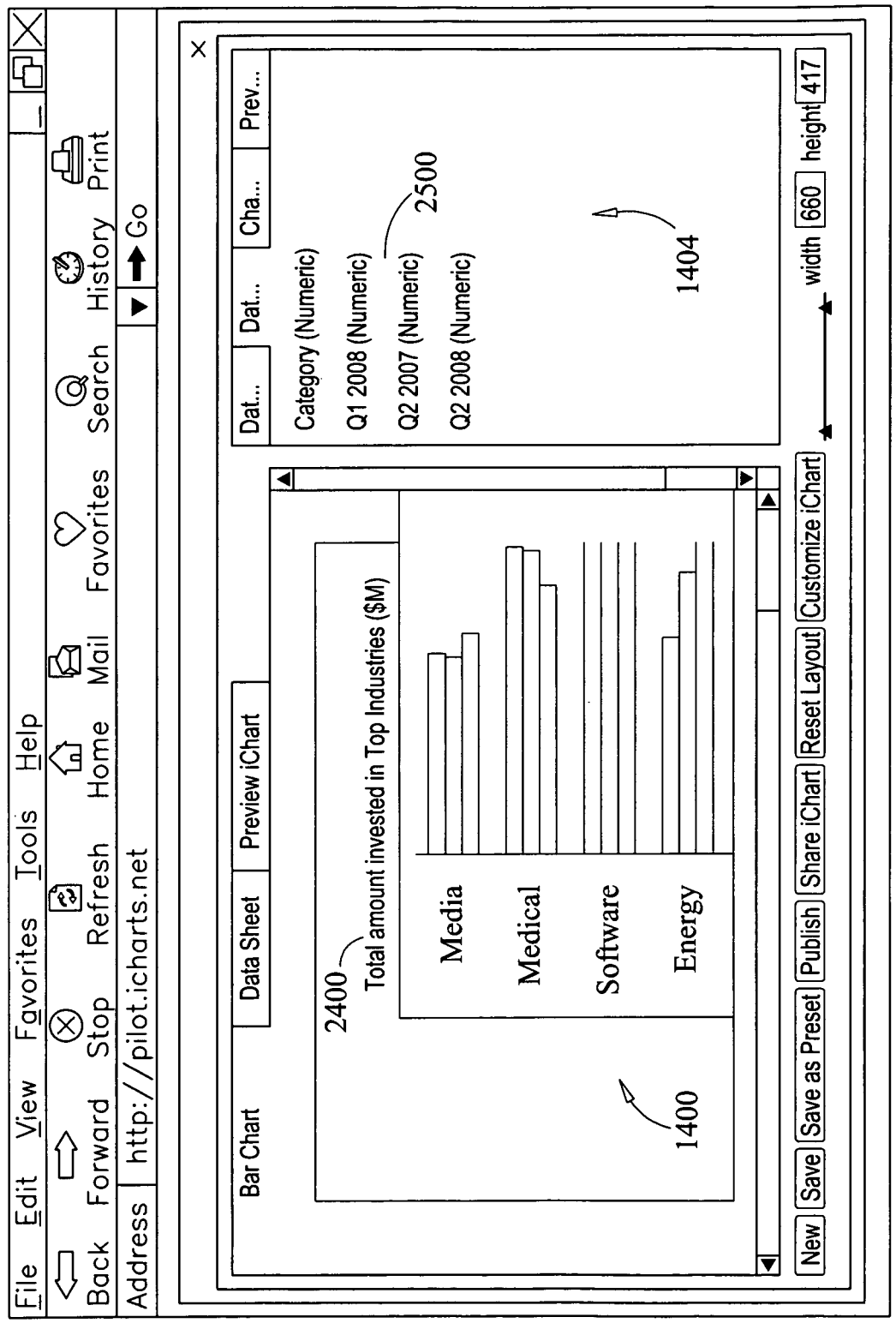
FIG. 25 is a schematic view of a user interface for creating, sharing and embedding an interactive chart in accordance with one embodiment of the invention.
Figure 26:
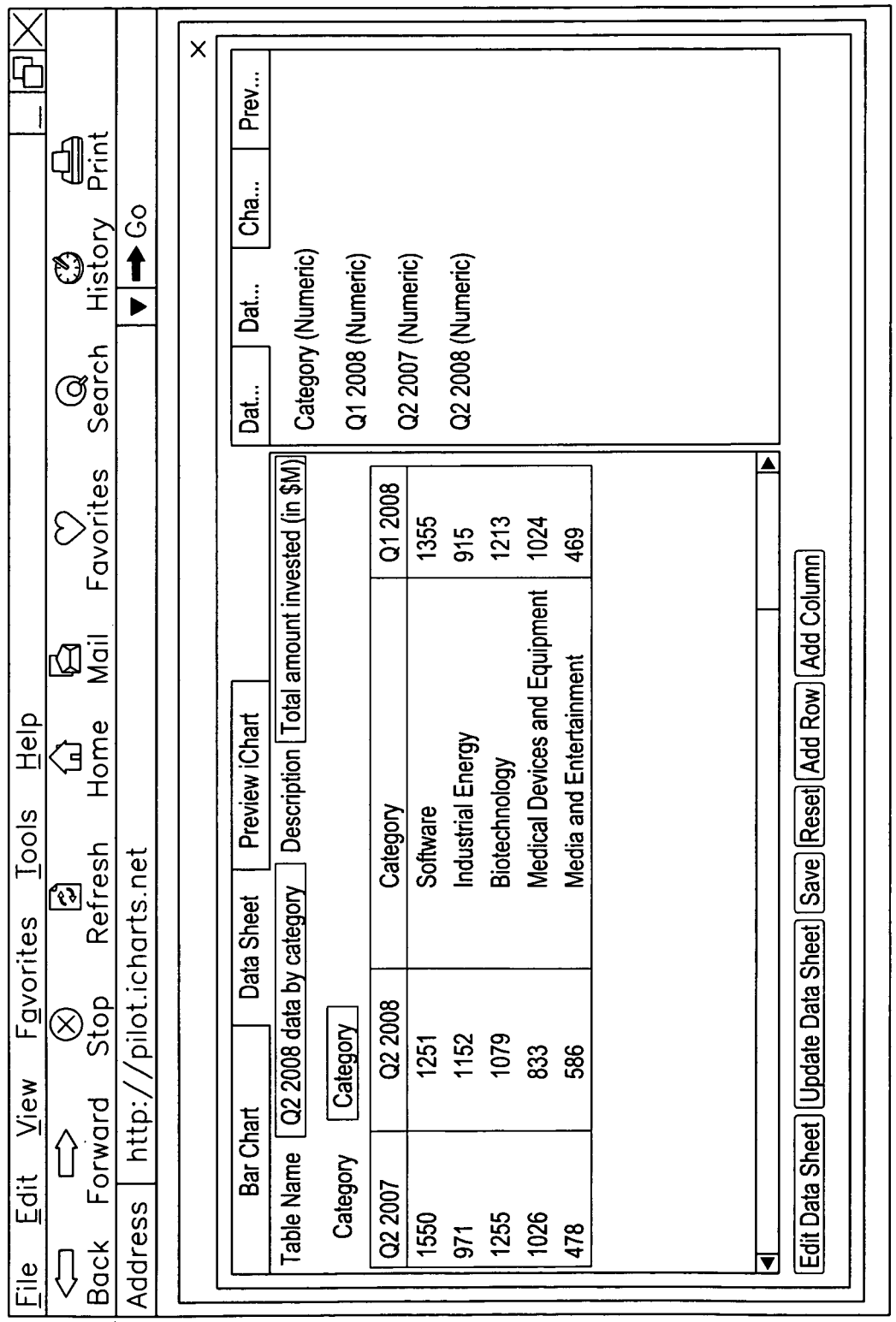
FIG. 26 is a schematic view of a user interface for creating, sharing and embedding an interactive chart in accordance with one embodiment of the invention.
Figure 27:
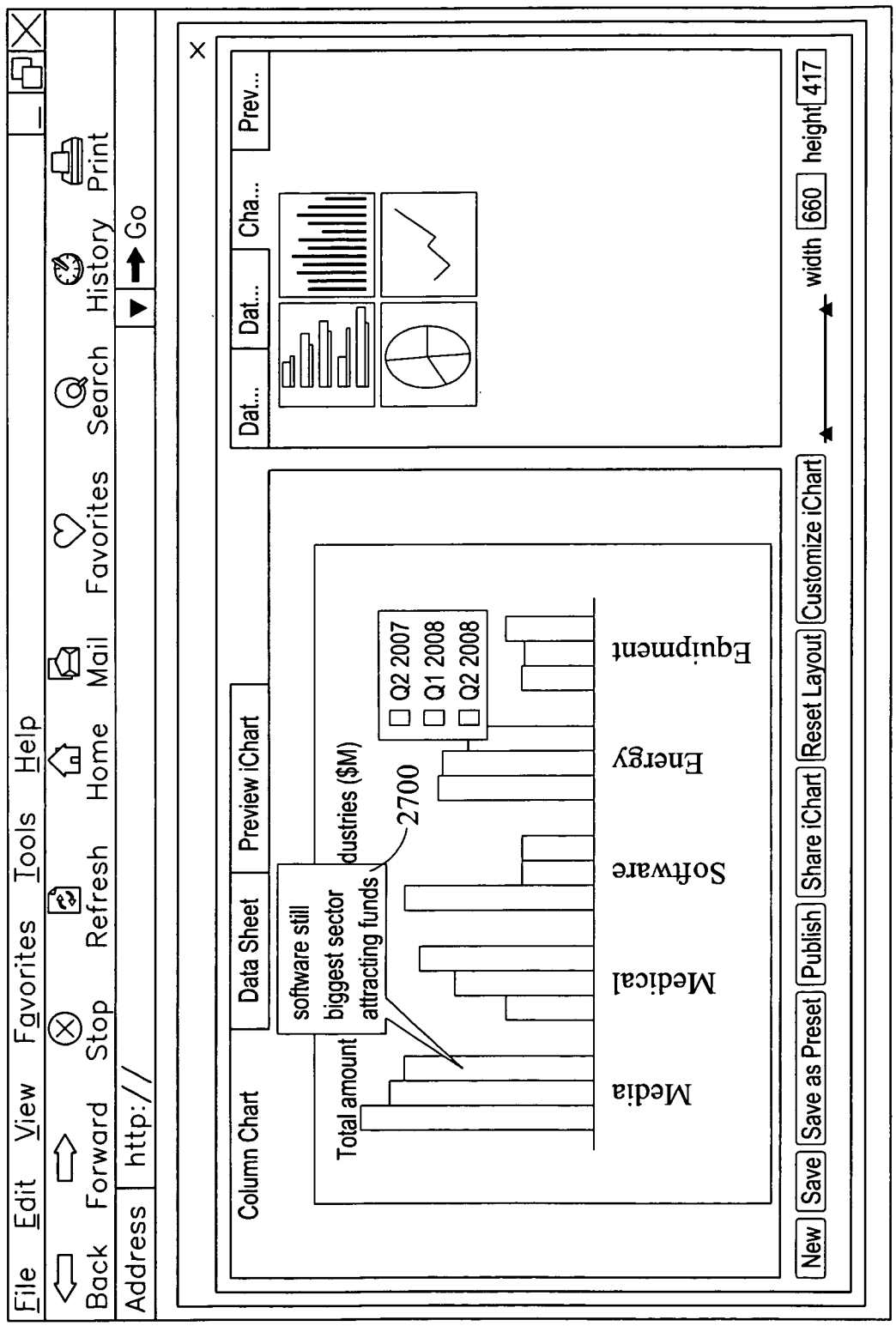
FIG. 27 is a schematic view of a user interface for creating, sharing and embedding an interactive chart in accordance with one embodiment of the invention.

Users can also modify existing charts, as shown in FIGS. 24-27. Users can access charts to modify by selecting the my icharts tab 1004 to return to the main page 1000 of the online portal (shown in FIG. 10) and selecting one of the charts 1016*a-c* to modify. For example, as shown in FIG. 24, the chart 2400 can be modified by selecting the edit button 2404, duplicate button 2408, delete button 2412, share button 2416 or embed button 2420. If the user selects the copy button 2408 or the edit button 2404, the selected chart is then displayed as shown in FIG. 25. The user can then select the data 2500 in the data pane 1404 or the chart in the charting pane 1400 to modify the chart. Users can also edit or update the data sheet in the charting pane, as shown in FIG. 26. In addition, users can modify the chart 1700 by adding a comment 2700 as shown in FIG. 27. Users can also modify the look and feel of the chart. The user can change the colors, fonts, locations of certain features, etc., based on the user's preferences. For example, corporations that have certain colors associated with their business (e.g., Best Buy's colors are blue and yellow, CocaCola's colors are red and white, Pepsi's colors are red and blue) can modify the colors of the interactive chart to reflect the corporation's colors.

Figure 28:
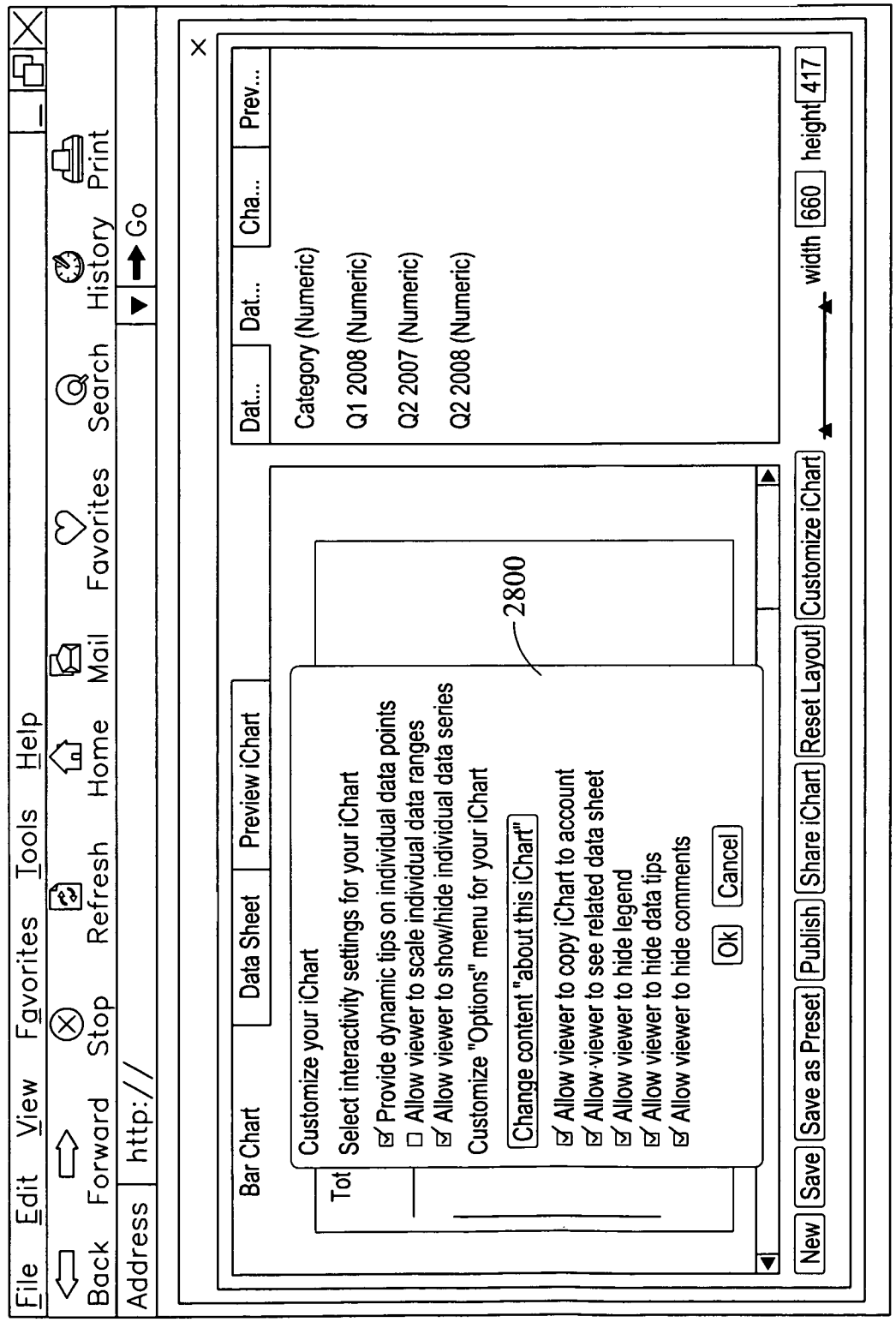
FIG. 28 is a schematic view of a user interface for creating, sharing and embedding an interactive chart in accordance with one embodiment of the invention.

As shown in FIG. 28, the user can also customize the chart by selecting the customize chart button 1628. When the customize chart button is selected, a popup window 2800 is displayed. The popup window 2800 includes the following selectable options: provide dynamic tips on individual data points, allow viewer to scale to individual data ranges, allow viewer to show/hide individual data series, change content of "about this ichart", allow viewer to copy ichart to his account, allow viewer to see the related data sheet, allow viewer to hide legend, allow viewer to hide data tips, and allow viewer to hide comments.

Figure 29:
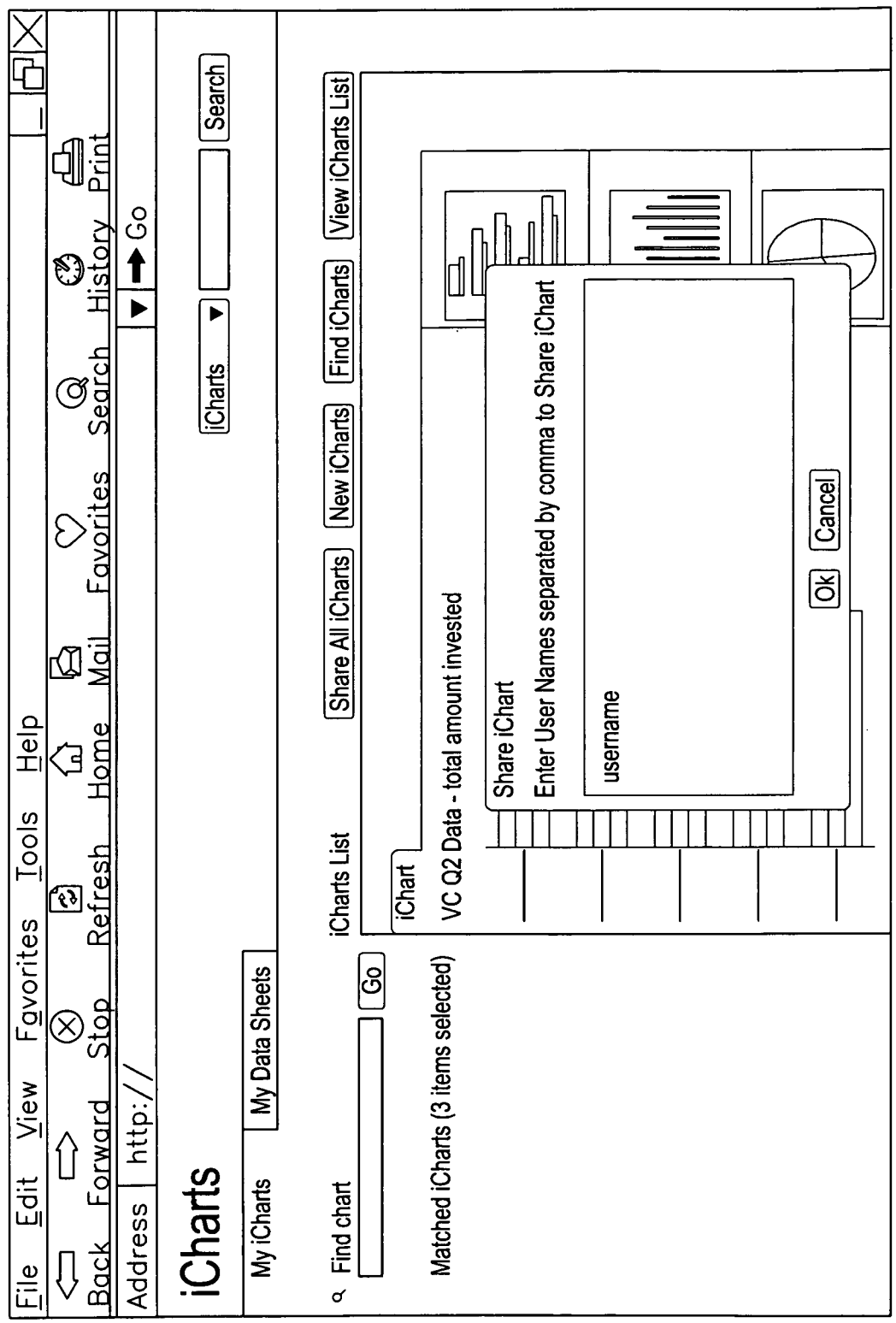
FIG. 29 is a schematic view of a user interface for creating, sharing and embedding an interactive chart in accordance with one embodiment of the invention.
Figure 30:
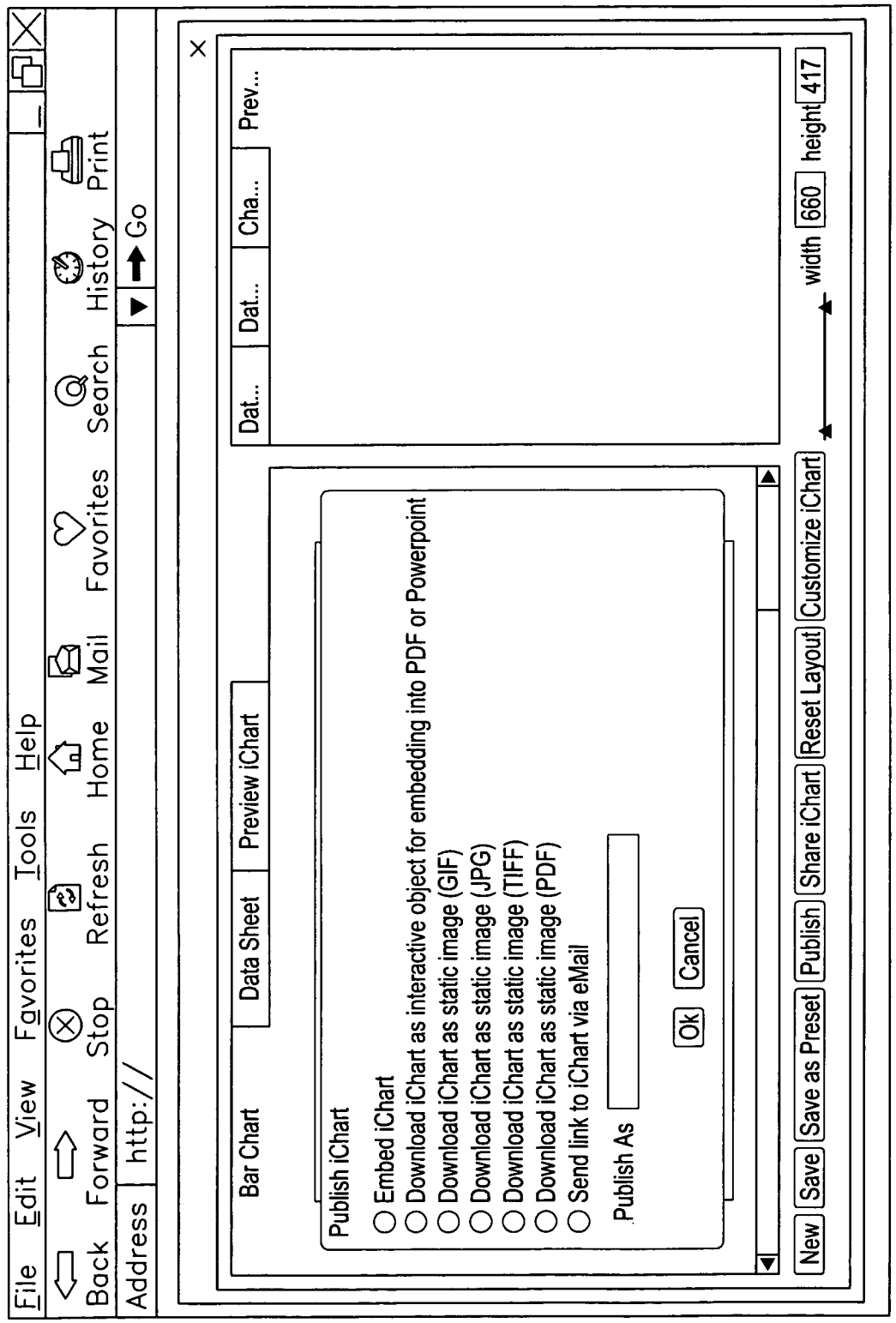
FIG. 30 is a schematic view of a user interface for creating, sharing and embedding an interactive chart in accordance with one embodiment of the invention.

The interactive charts can also be shared using the online portal. For example, users can select to share the chart with other registered users of the online portal by selecting the share ichart button 1620. When the share ichart button 1620 is selected, the popup window 2900 is accessed, as shown in FIG. 29. The user can enter the user names with whom they want to share the ichart. The user can also share the chart 1700 by publishing the chart, as shown in FIG. 30, by selecting the publish button 1616. As shown in FIG. 30, a popup window 3000 is accessed when the publish button 1616 is selected. The popup window 3000 includes the following options: embed ichart, download ichart as interactive object for embedding into pdf or PowerPoint, download ichart as static image (GIF), download ichart as static image (JPG), download ichart as static image (TIFF), download ichart as static image (PDF), send link to ichart via email.

Figure 31:
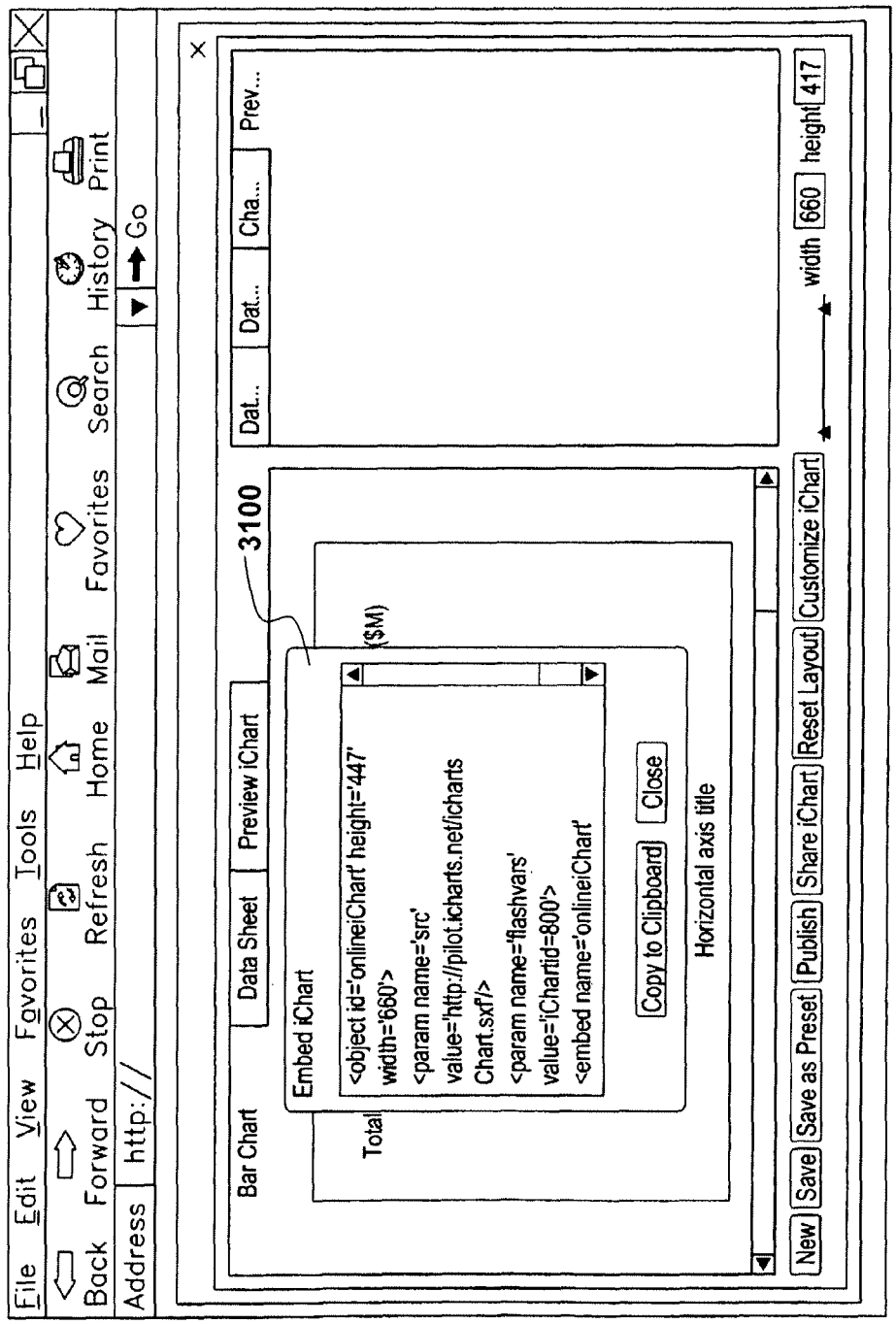
FIG. 31 is a schematic view of a user interface for creating, sharing and embedding an interactive chart in accordance with one embodiment of the invention.
Figure 32:
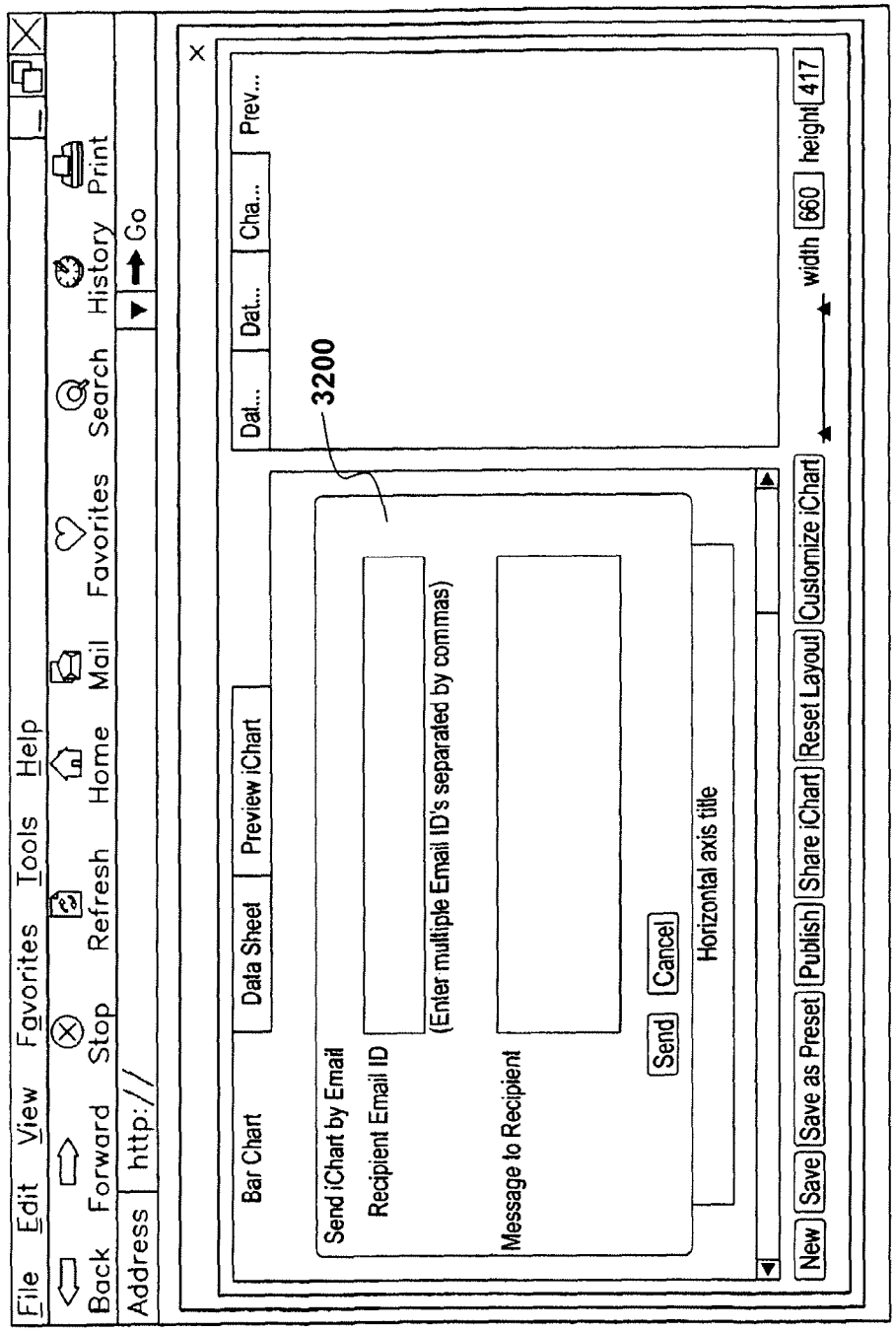
FIG. 32 is a schematic view of a user interface for creating, sharing and embedding an interactive chart in accordance with one embodiment of the invention.

If the user chooses to embed the ichart, the popup window 3100 is displayed as shown in FIG. 31, which includes code for embedding the chart. If the user chooses to email the ichart, the popup window 3200 is displayed as shown in FIG. 32. The popup window includes a recipient email region 3204 for entering recipient emails and a message region 3208 for providing a message to the recipient. The users can select to embed the object as a code snippet or download or embed as an interactive object. The chart may be part of a portal or script. The user can then publish the chart online or download and embed the chart into for example a PDF, .ppt, etc. file. The chart that is embedded or published can be interactive, and can, optionally, be updated automatically. For example, if the chart is embedded in an online portal, the user can upload additional data to update the chart in the online portal. Users can also copy, share or embed charts using the buttons 2408, 2416 and 2420 shown in FIG. 24.

Figure 33:
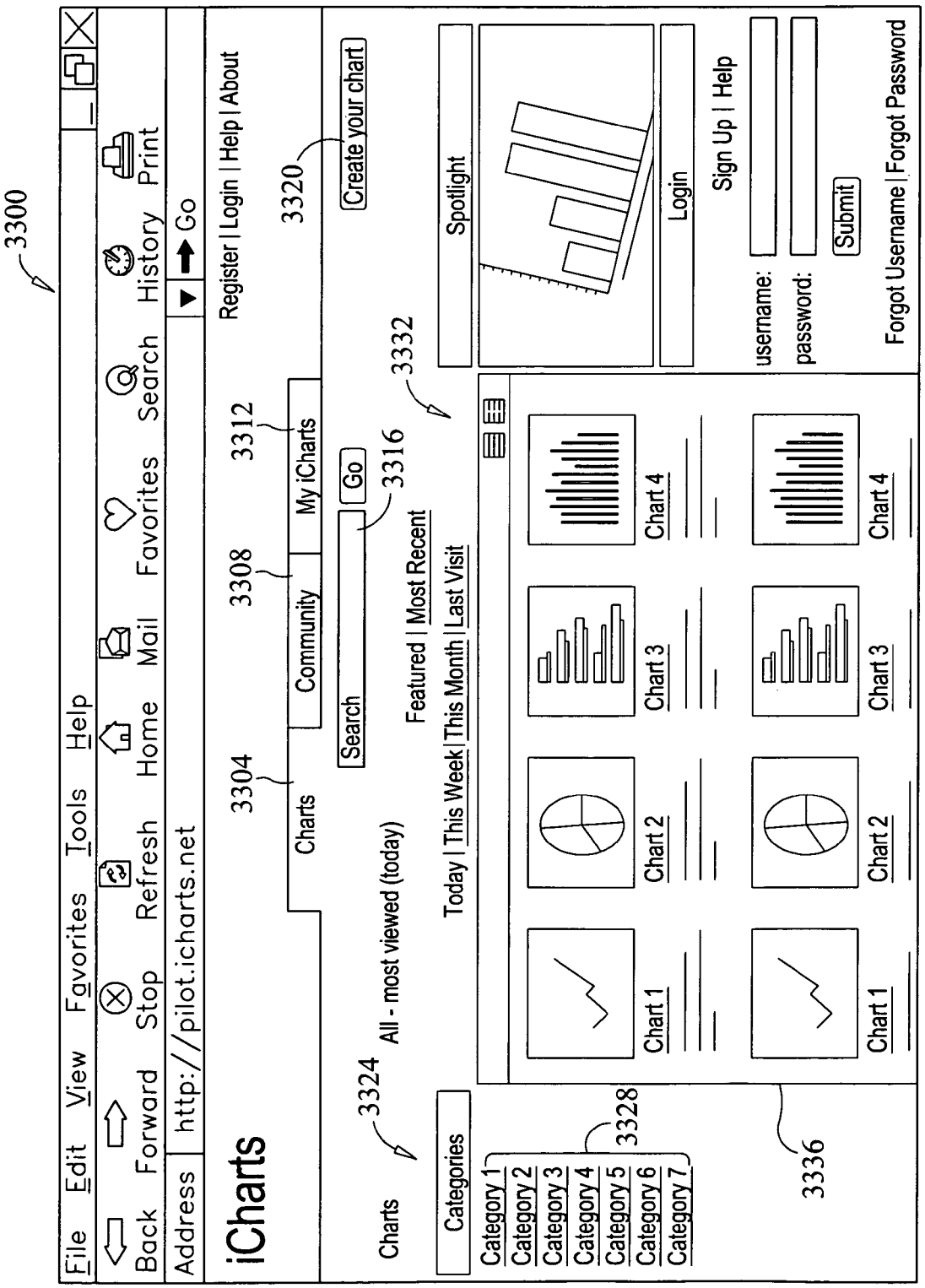
FIG. 33 is a schematic view of a user interface for creating, sharing and embedding an interactive chart in accordance with one embodiment of the invention.

FIG. 33 illustrates an online store environment 3300 of the online portal 200. The online store environment 3300 includes a charts tab 3304, a community tab 3308 and a myicharts tab 3312. The online store environment 3300 also includes a search box 3316 and a create your ichart button 3320. The charts tab 3304 includes a categories region 3324 that includes a list of categories 3328 and a charts region 3332 and a list of charts 3336.

Users can search the charts in the online store environment 3300 using the search box 3316 because the interactive charts are searchable. As described above, the charts are flash objects. When the flash objects are generated searchable tags are also generated. The chart may also include a detail page that contains rich tagging, which is also searchable (see FIG. 36 below).

Figure 34A:
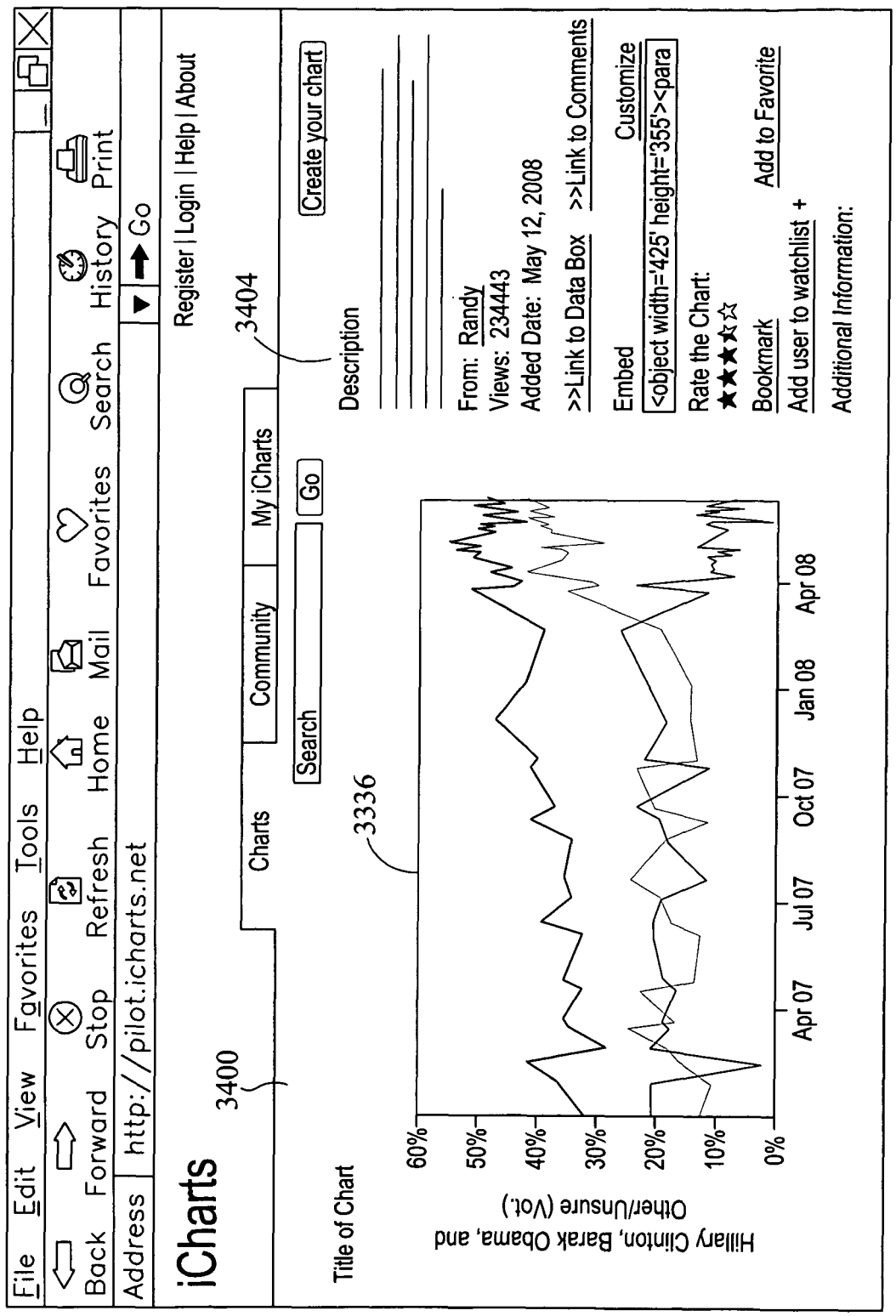
FIGS. 34A-B are schematic views of a user interface for creating, sharing and embedding an interactive chart in accordance with one embodiment of the invention.
Figure 34B:
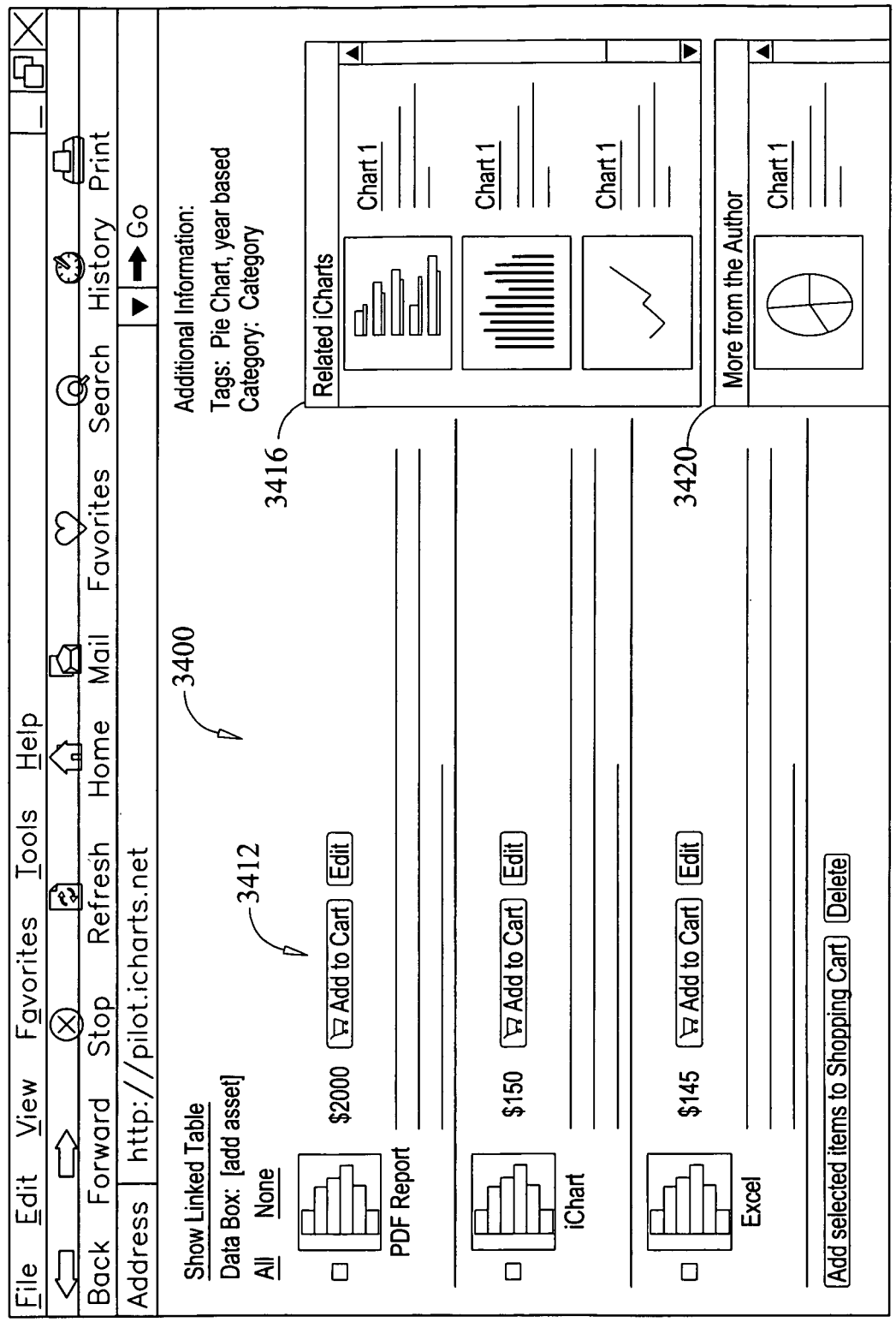

When a user selects one of the charts 3336 from the charts region 3332, the user is presented with a detailed view 3400 of the selected chart 3336 as shown in FIGS. 34A-34B. The detailed view 3400 includes the chart 3336 and a description of the chart 3404, as shown in FIG. 34A, and a purchase area 3408 that includes a list of purchase options 3412, a related charts section 3416 and a more from the author region 3420, as shown in FIG. 34B. The purchase options 3412 include a pdf report that includes the interactive chart, the chart, or the data.

Figure 35:
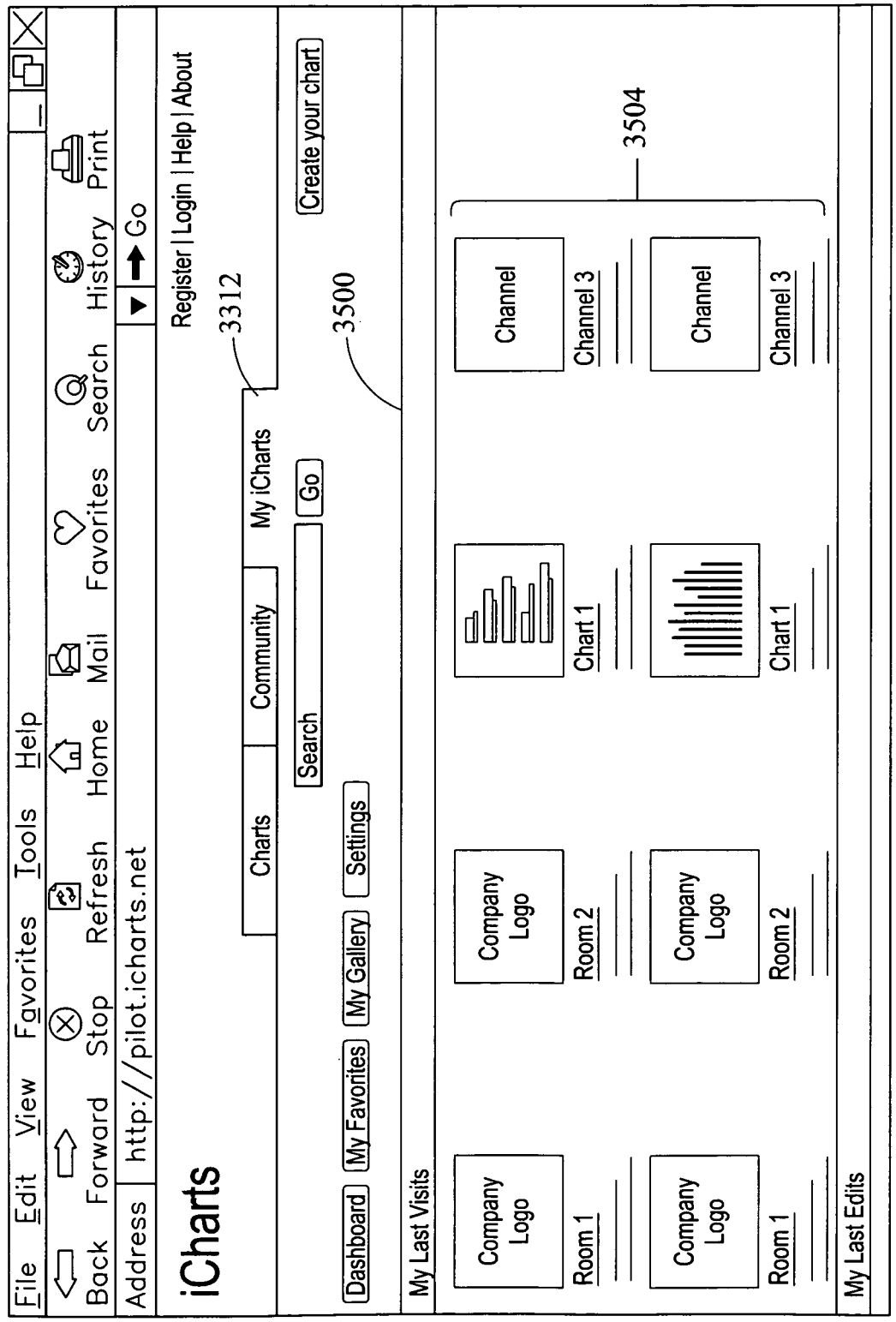
FIG. 35 is a schematic view of a user interface for creating, sharing and embedding an interactive chart in accordance with one embodiment of the invention.

When a user selects to purchase the chart, report and/or data through one or more of the purchase options 3412, the chart is added to the myicharts page 3500 (associated with the myicharts tab 3312), as shown in FIG. 35. The myicharts page 3500 includes a list of charts 3504 that includes charts created by the user, purchased by the user or otherwise received by or shared with the user. The purchased chart, report and/or data can then be modified, shared, published, embedded, etc. by the purchaser.

Figure 36:
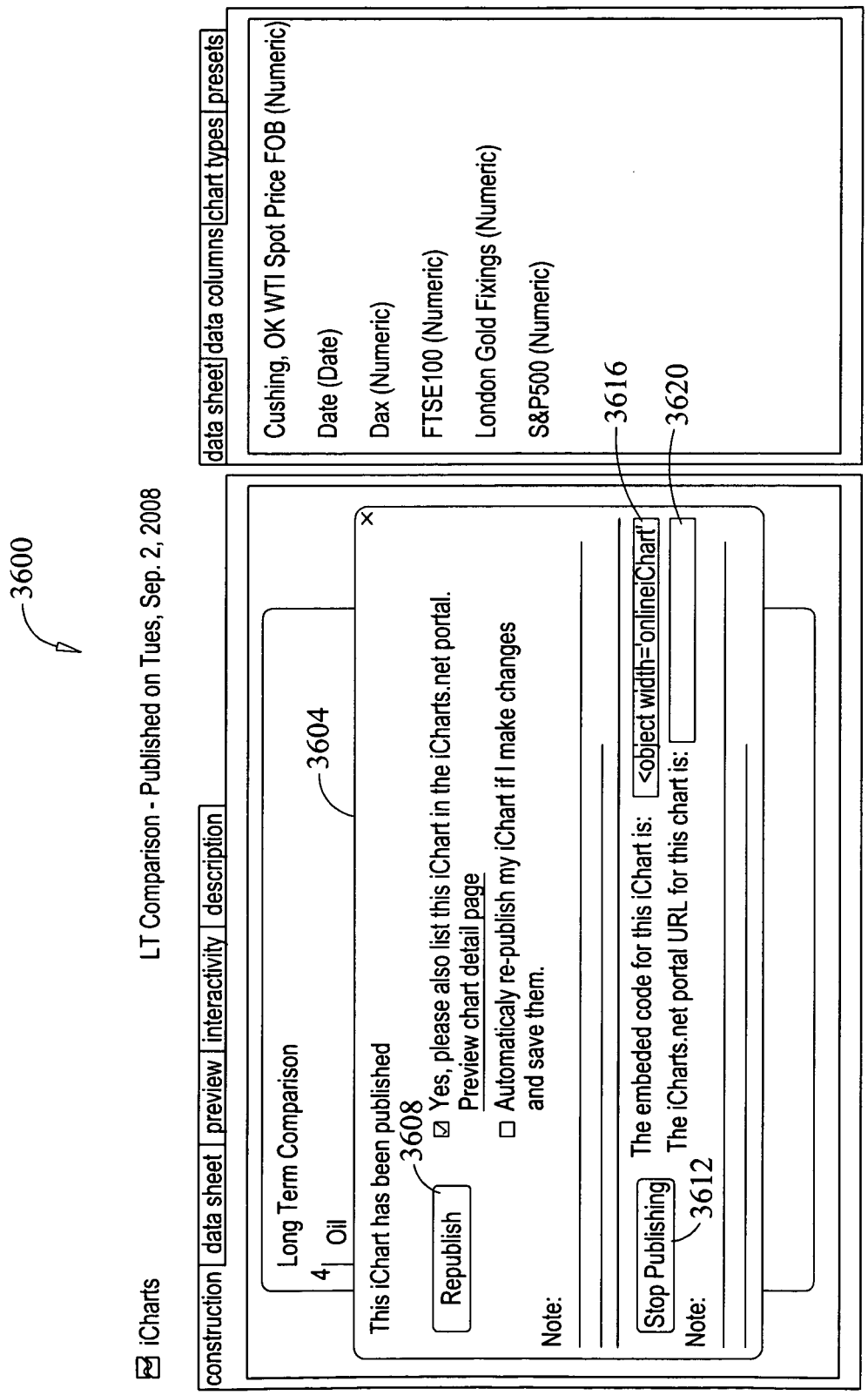
FIG. 36 is a schematic view of a user interface for creating, sharing and embedding an interactive chart in accordance with one embodiment of the invention.

FIG. 36 illustrates a screen shot of publish function 3600 for an interactive chart that has been modified. As shown in FIG. 36, when a user selects to publish the chart, the popup window 3604 is displayed. The popup window 3604 includes the option to republish the chart 3608 or stop publishing the chart 3612. If the user selects the option to republish the chart 3608, the user can select to list the chart in the online portal and/or automatically republish the chart if changes are made. The republish option 3608 therefore allows users to update the interactive charts that are embedded online. If the user selects the option to stop publishing the chart 3612, websites where the chart has been embedded show a message that the chart has been removed. The popup window 3504 may also include the embed code for the chart 3616 and/or the URL (uniform resource locator) for the net portal where the chart is located 3620.

Figure 37:
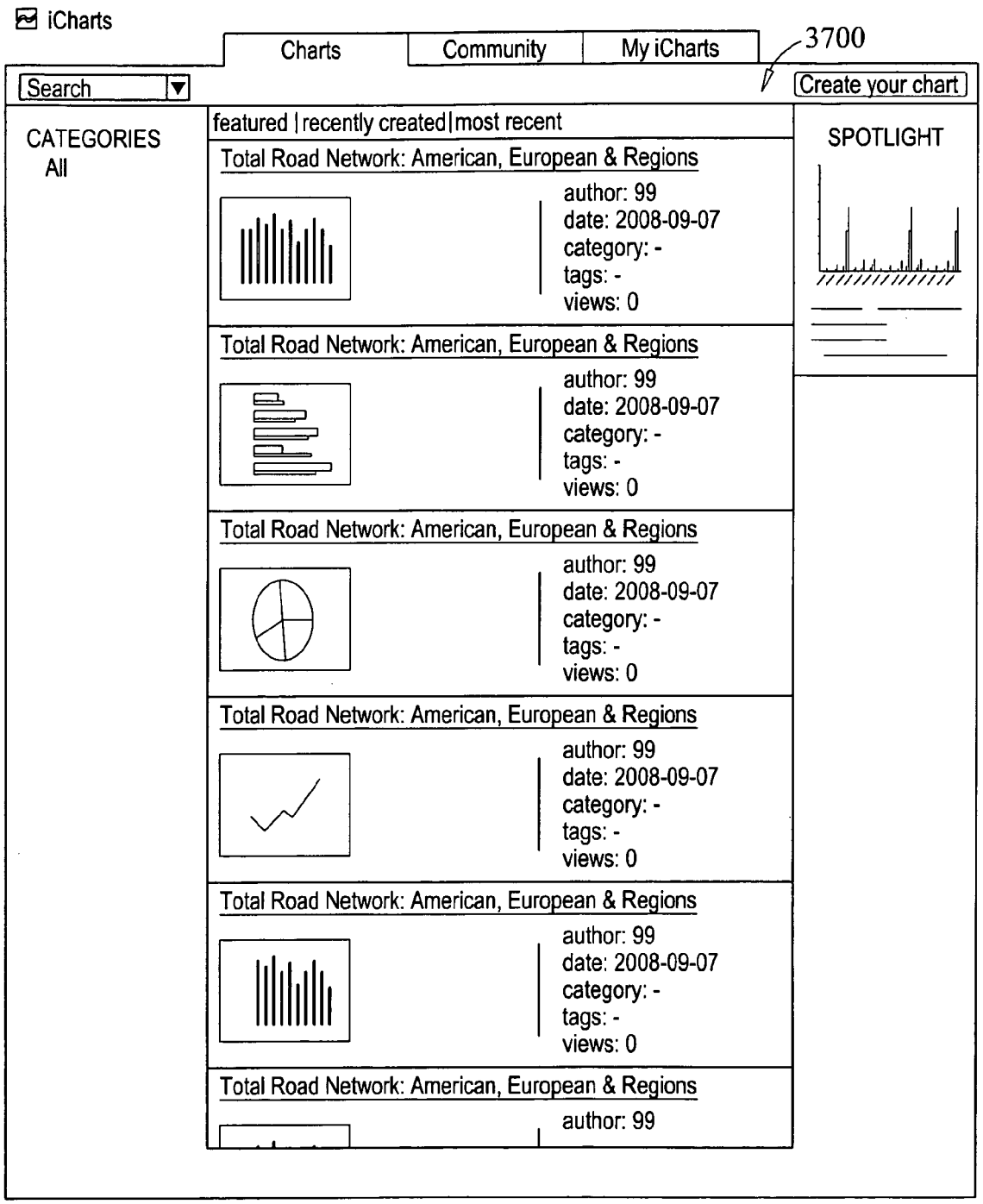
FIG. 37 is a schematic view of a user interface for creating, sharing and embedding an interactive chart in accordance with one embodiment of the invention.
Figure 38:
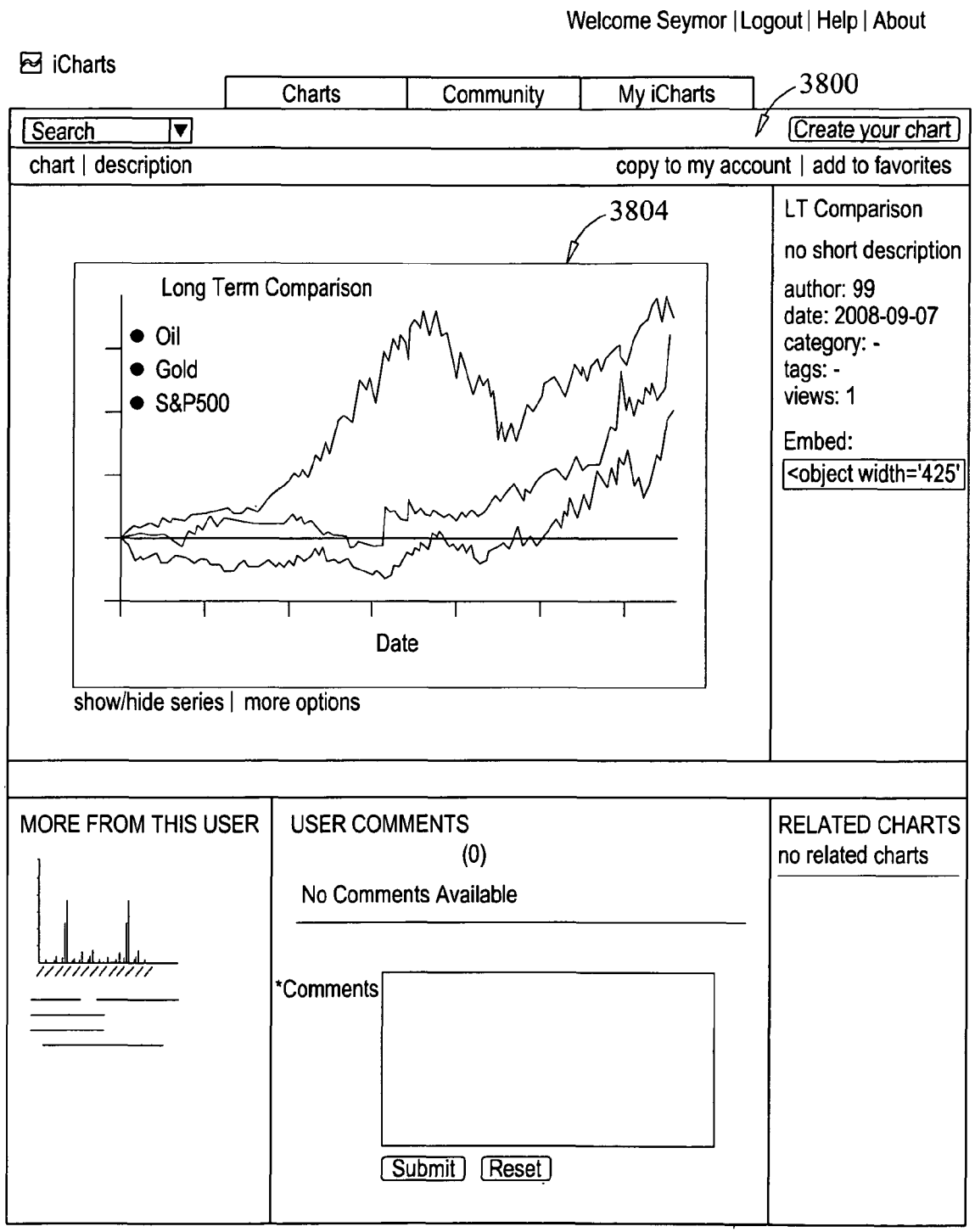
FIG. 38 is a schematic view of a user interface for creating, sharing and embedding an interactive chart in accordance with one embodiment of the invention.

FIG. 37 illustrates a screen shot of a list of charts 3700. Users can select each chart in the list 3700 to access a detailed page about that chart. The interactive charts that are published by the user from the online portal using the Publish function (see FIG. 36) have a detail page assigned on the web portal. FIG. 38 illustrates a detail page 3800 for an exemplary interactive chart 3804. As shown in FIG. 38, users can leave comments on the detail page 3800. Other charts from same user are shown on the detail page 3800, as well as related charts (e.g., based on charts tags and content).

The detail page is automatically search engine optimized by pulling chart content (title, comment, labels) into invisible tags that are embedded onto the page (not visible for the user). Once this page gets is indexed by a search engine, such as Google et al, the tags are picked up and the chart becomes searchable. As described above, the chart flash object itself also contains tags. Search engines that are configured to search and index flash content can index the charts making the charts themselves searchable on pages where the chart has been embedded.

Figure 39:
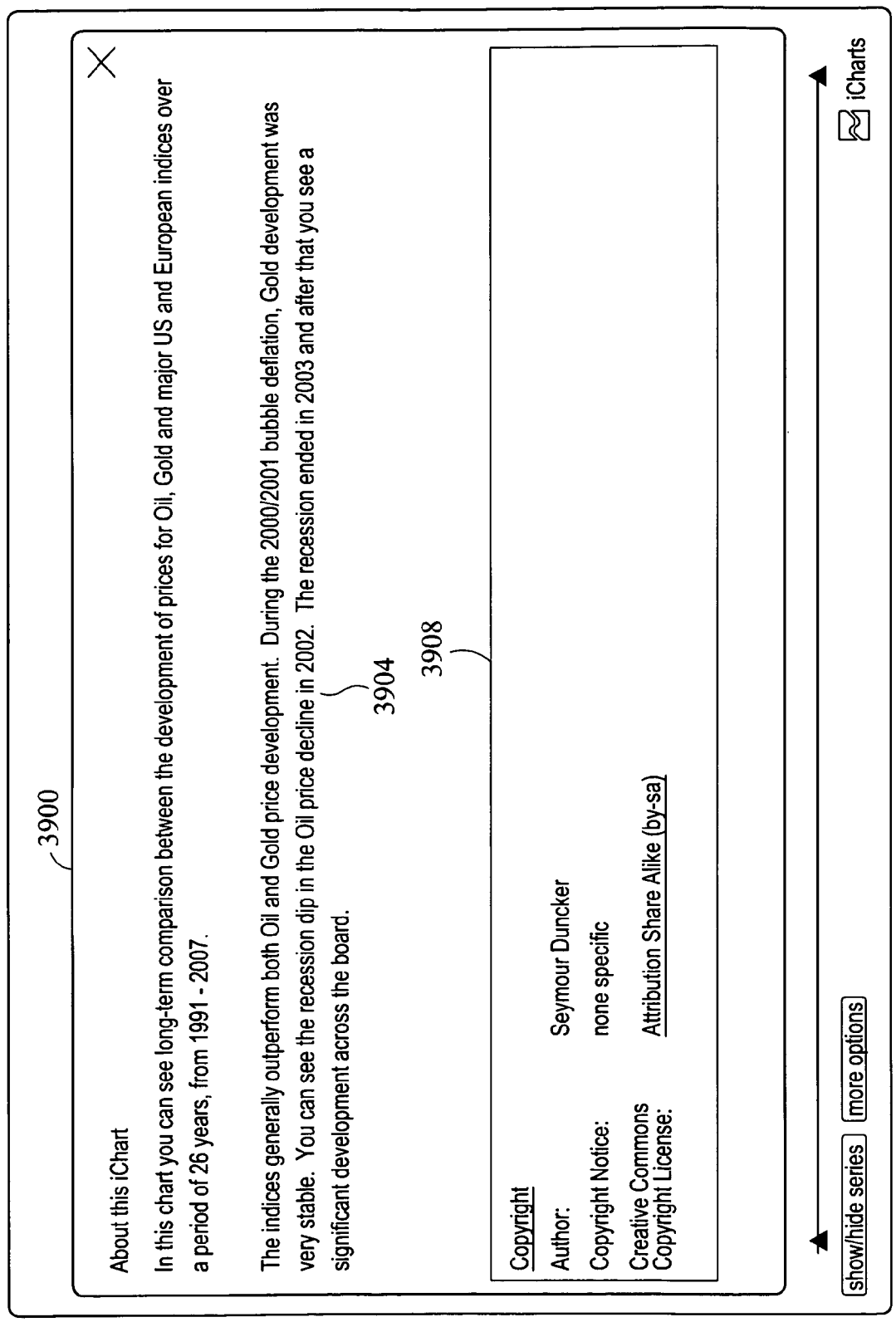
FIG. 39 is a schematic view of a user interface for creating, sharing and embedding an interactive chart in accordance with one embodiment of the invention.

FIG. 39 illustrates a screen shot of an about the chart function 3900. When a user selects an "About" button on an interactive chart, the popup window 3900 is displayed. The popup window 3900 includes an about section 3904 which provides detailed information about the chart which can be added by the user during or after chart generation. The popup window 3900 also includes a copyright section 3908 which includes copyright information about the interactive chart.

The interactive chart also includes a "Copy-To-My-Account" function that is enabled by the owner of the chart. If a visitor uses this function, a copy of the chart is created in the user's account. The user can then edit and republish the chart (using, for example, different formats and colors). This feature can be useful when a user wants to reuse a chart but use the user's own look & feel.

Figure 40A:
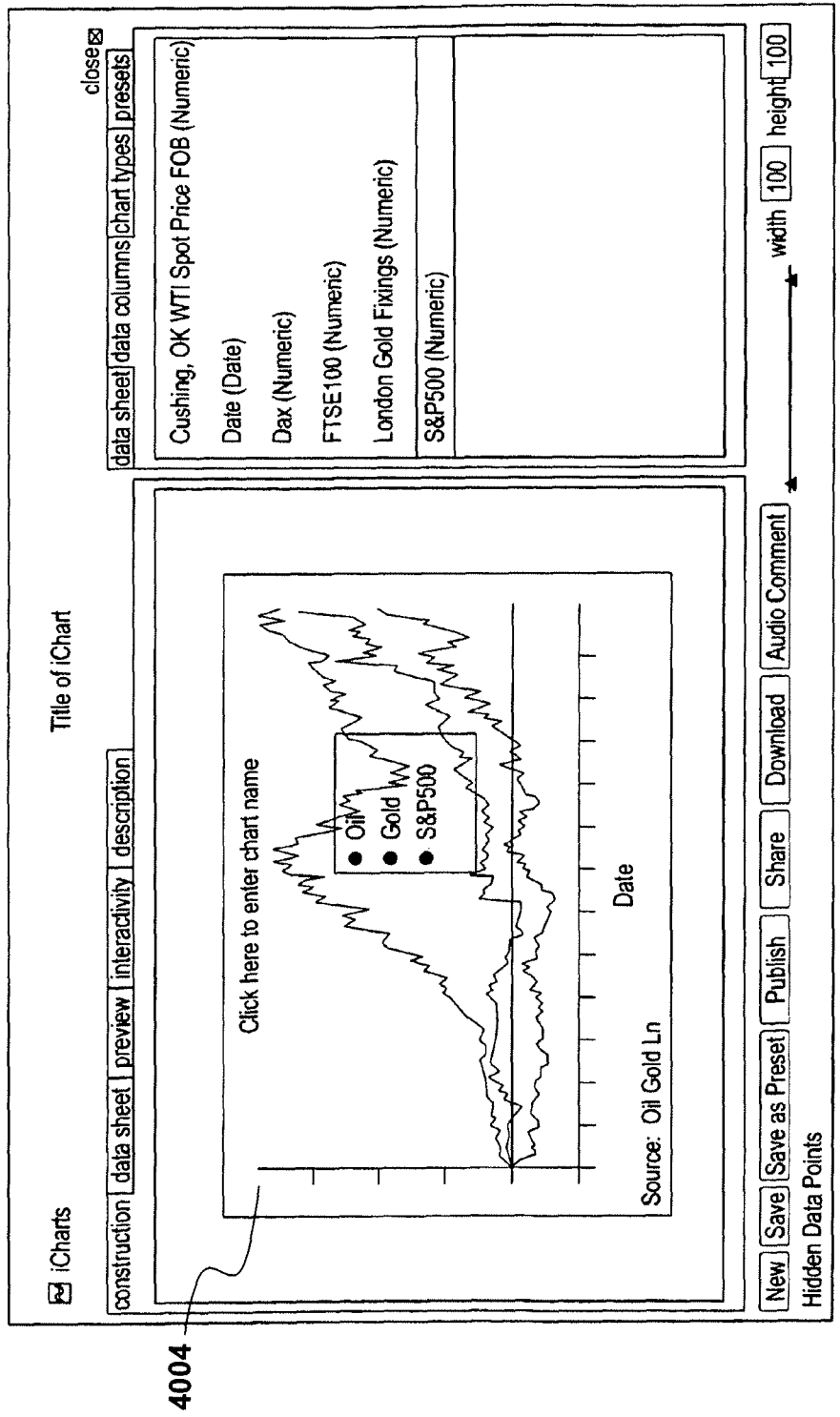
FIGS. 40A-C are schematic views of a user interface for creating, sharing and embedding an interactive chart in accordance with one embodiment of the invention.
Figure 40B:
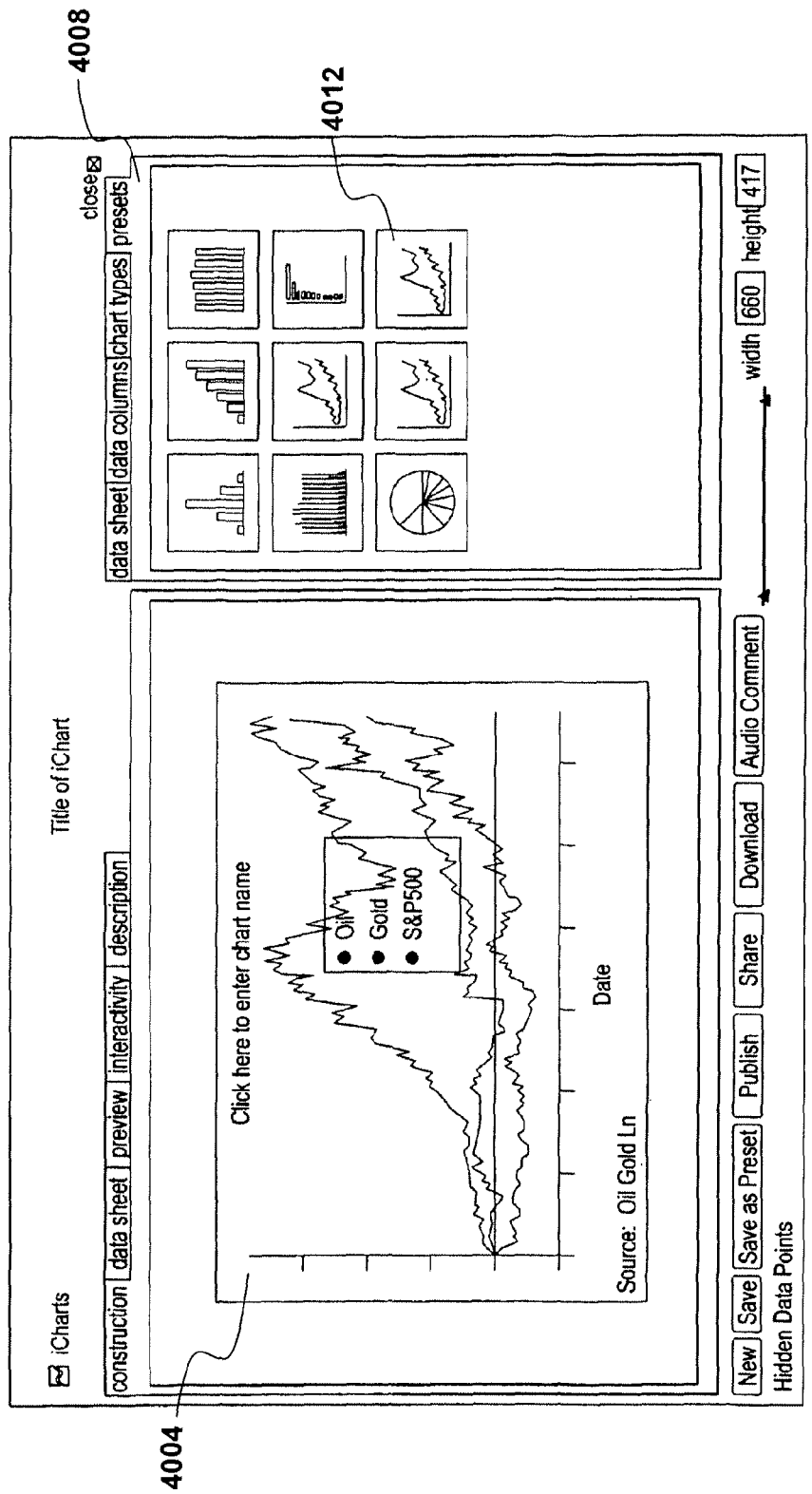
Figure 40C:
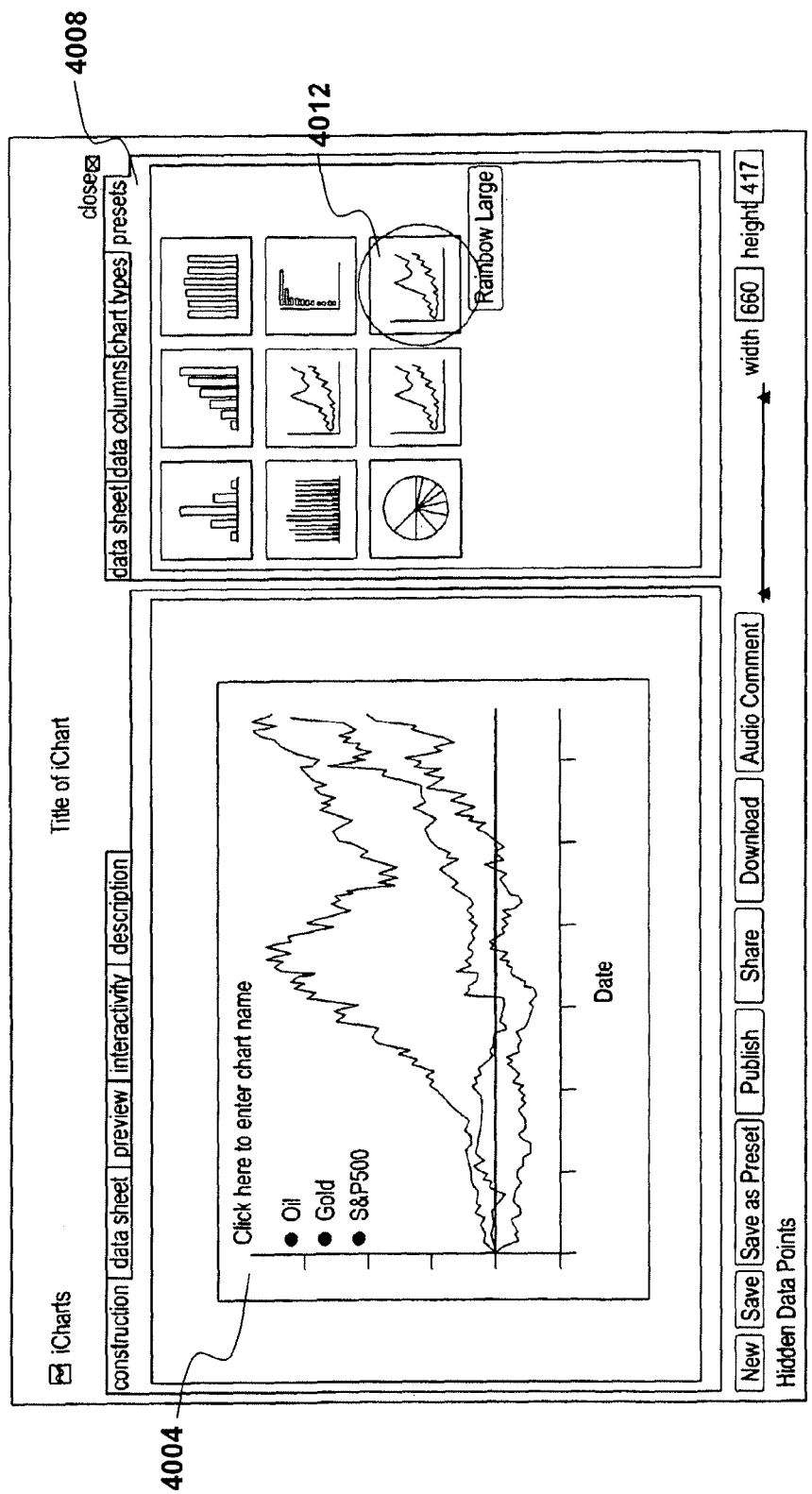

FIGS. 40A-C illustrate a chart template feature for automatically modifying a chart by selecting a preset chart template. For example, FIG. 40A illustrates a chart 4004 that has a first look and feel. As shown in FIG. 40B, a user can select the preset tab 4008 which includes several selectable preset chart templates 4012. If a user selects one of the preset chart templates 4012, the chart 4004 is automatically updated to have the look and feel as the selected preset template chart 4012, as shown in FIG. 40C. The preset chart templates 4012 store formatting settings, such as colors, chart size, fonts, line thickness, etc., as a set. A preset can be created by saving any chart as a preset.

Figure 41A:
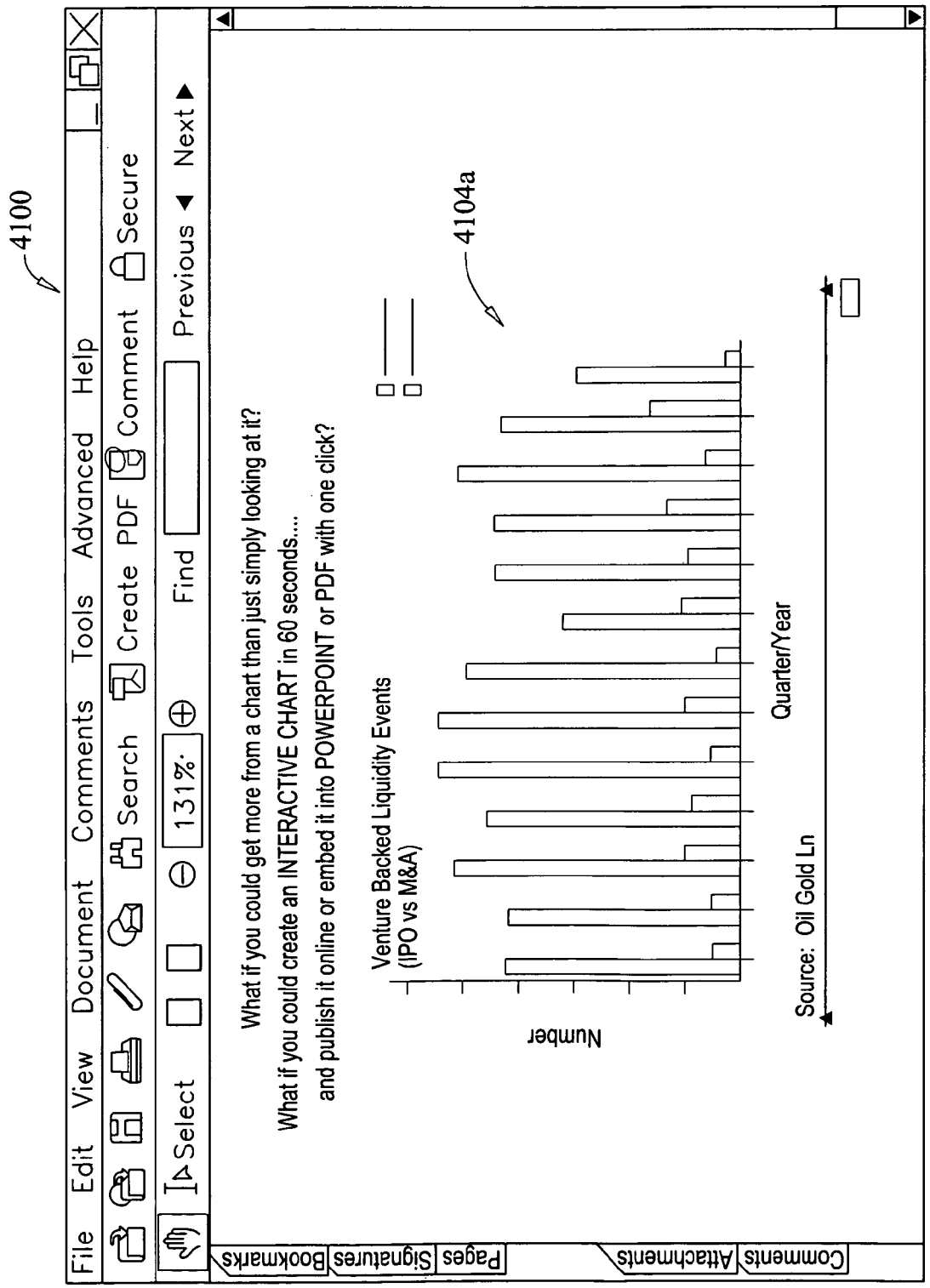
FIGS. 41A-F are schematic views of a PDF document that includes an interactive chart in accordance with one embodiment of the invention.
Figure 41B:
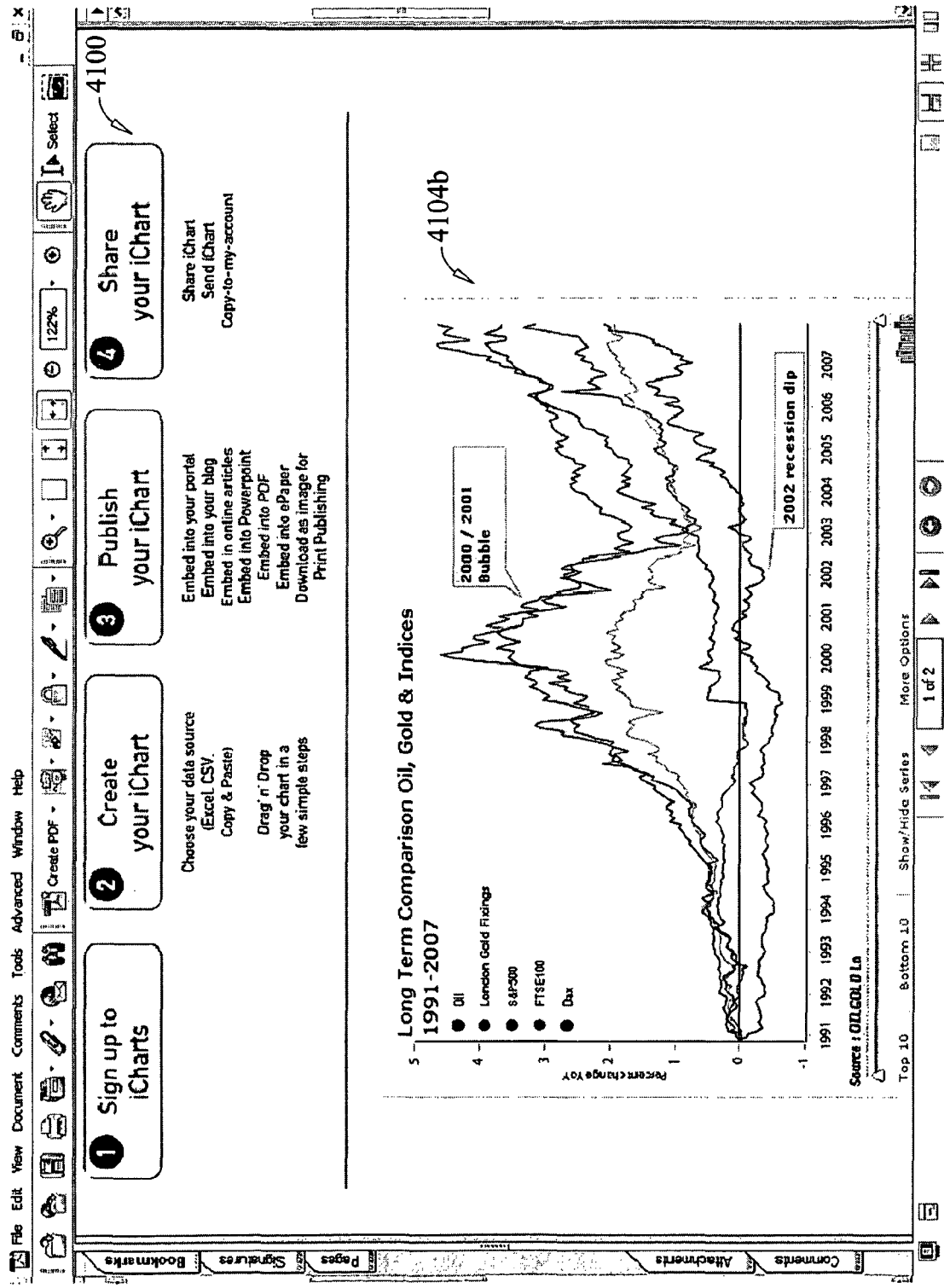
Figure 41C:
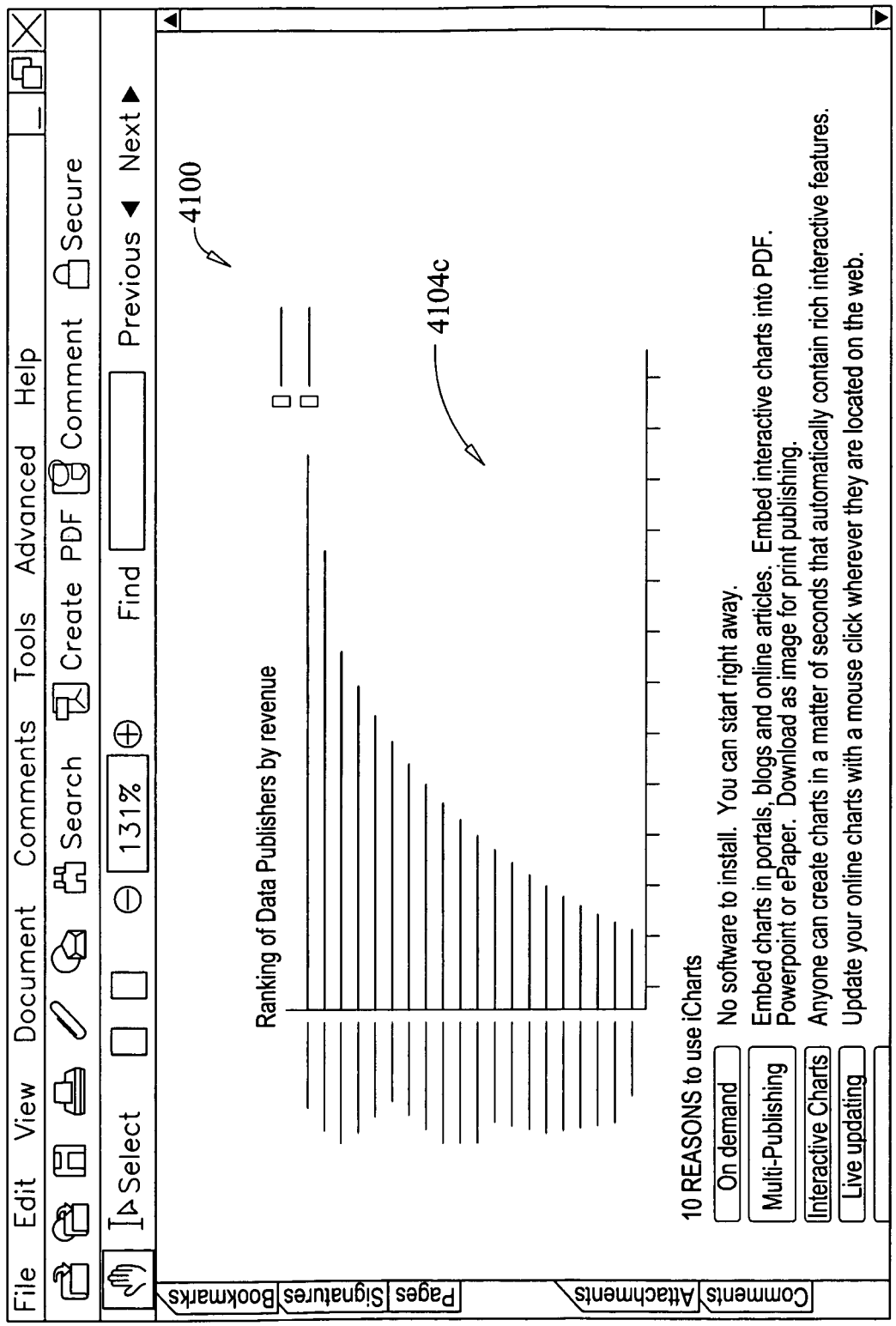
Figure 41D:
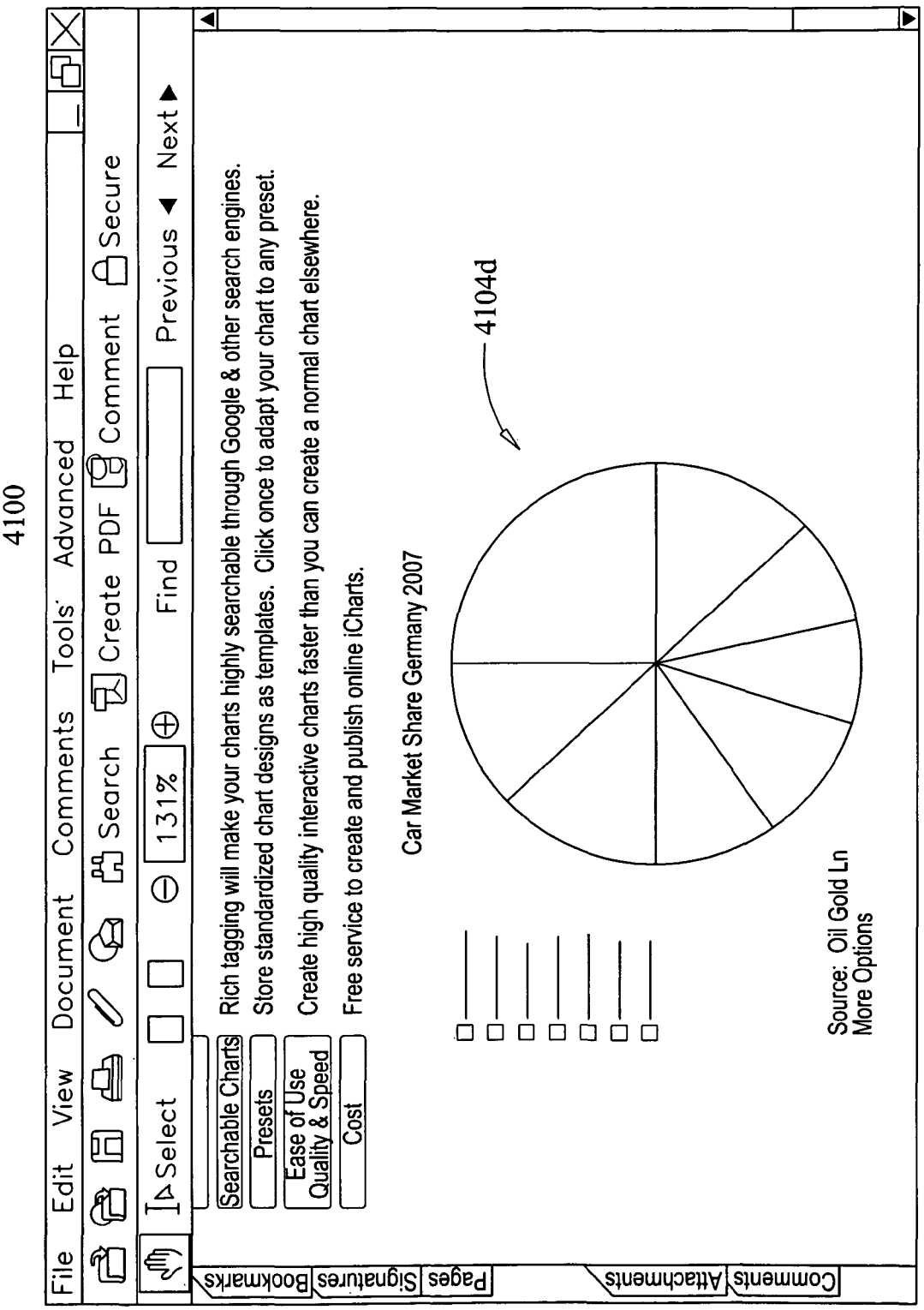
Figure 41E:
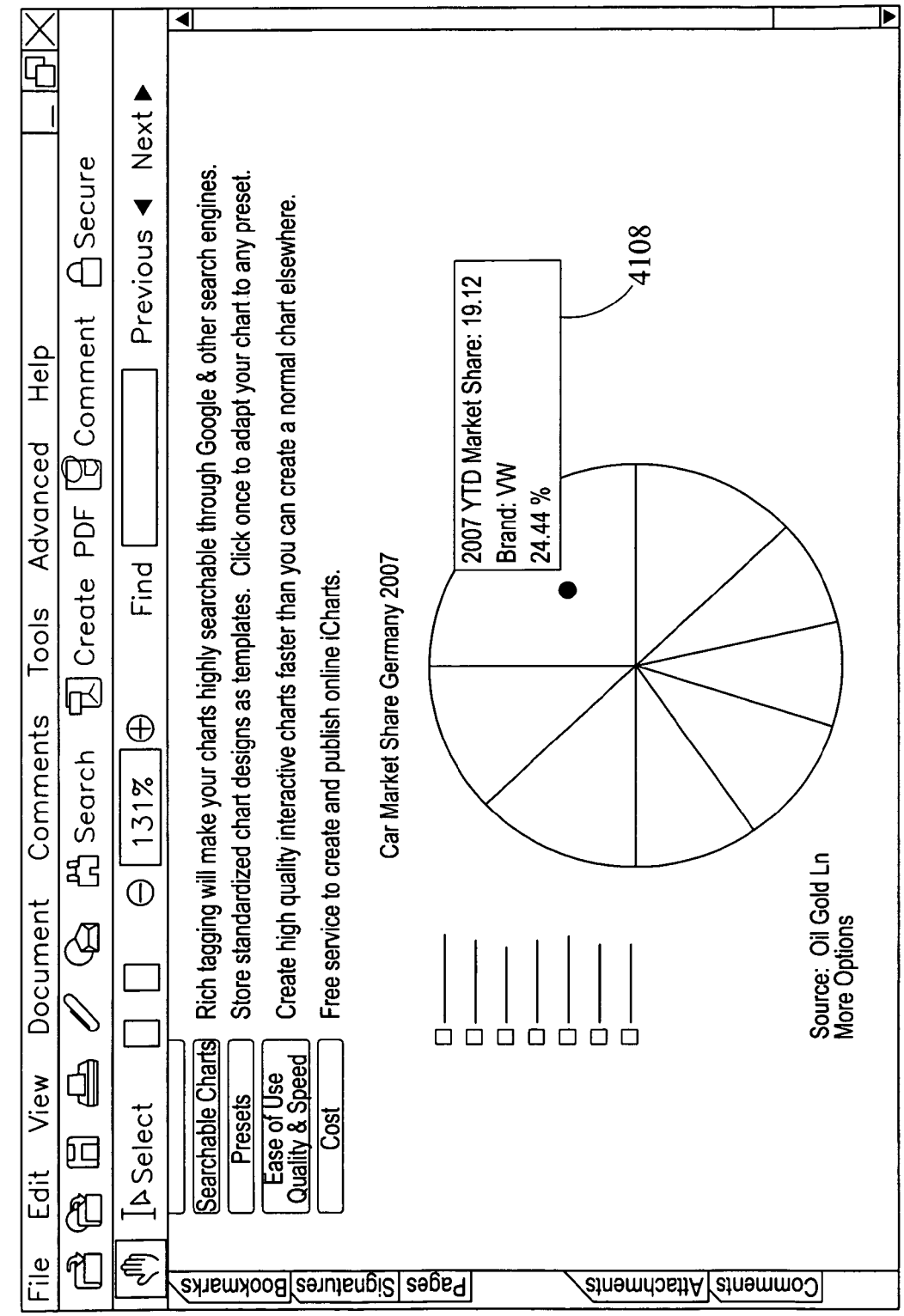
Figure 41F:
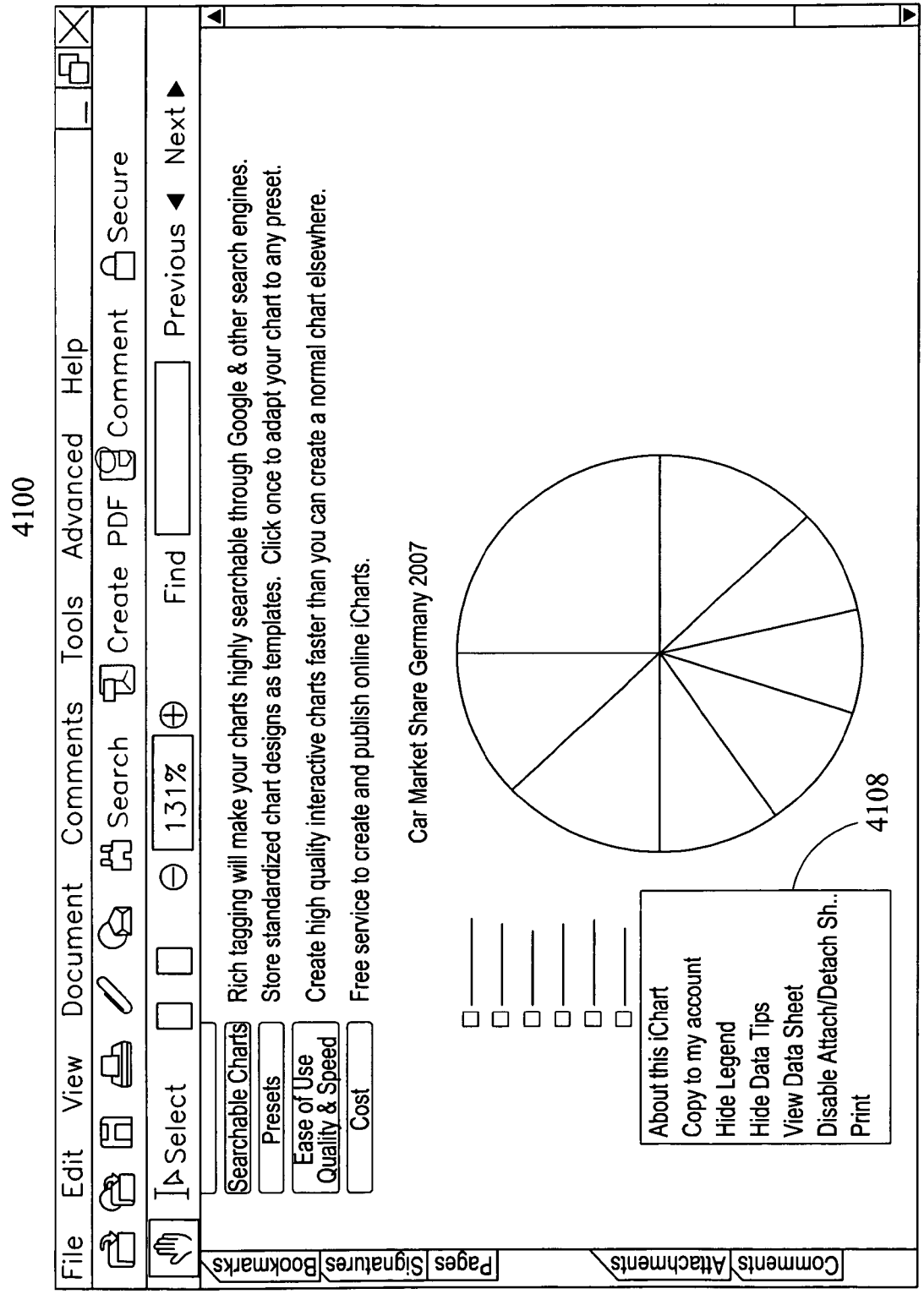

One use for the interactive charts described herein is PDF reports. FIGS. 41A-41F illustrate an exemplary PDF report 4100 that includes interactive charts 4104a-d. FIGS. 41E-F illustrate exemplary interactive features 4008 of the interactive chart 4104d. For example, in FIG. 41E, the interactive features include the data mouse over pop up window feature. In FIG. 41F, users can copy the chart or modify the chart in other ways by selecting the more options button 4112.

In one embodiment, the PDF report 4100 is generated by the user. The user downloads the chart as a flash file and then embeds the flash file into the PDF document using standard functions and features.

In one embodiment, a PPT document that includes an interactive chart is generated using a live cycle data services (i.e., flex data services) of a flex engine. The live cycle data service includes an API for generating PPT documents by merging client data or graphics with templates stored on the server. Alternatively, the PPT file can be created by the user by downloading the chart as a flash file and then embedding the flash file into the PPT document using standard functions and features.

Figure 42:
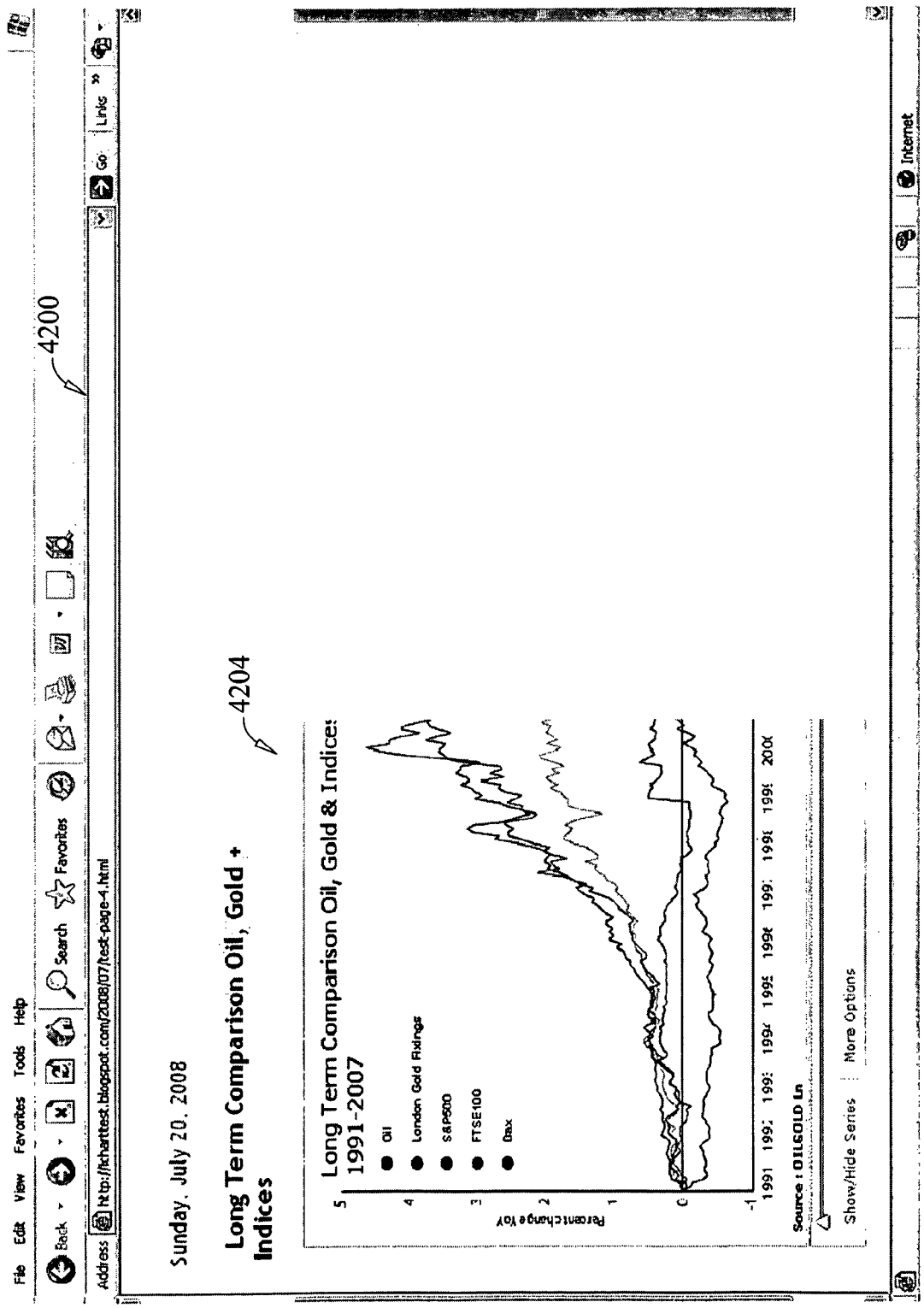
FIG. 42 is a schematic view of a webpage that includes an interactive chart in accordance with one embodiment of the invention.

FIG. 42 illustrates a webpage 4200 having an interactive chart 4204 embedded therein. A web developer can copy the code for the chart to embed the chart as described above.

When the data for the interactive chart is updated in the online portal, the chart on the web page is automatically updated. For example, the data on the webpage can be updated using a new flash file. If embed code has been implemented in a web page, the web page fetches the new flash file from the server and displays it. When the user refreshes the web page, the new flash chart is displayed. In another example, the data on the webpage can be updated using a data feed (e.g., RSS feed, Atom Feed, etc.). In another example, if the online portal is a flex engine that includes live cycle data services (i.e., flex data services), the online portal has data management and messaging services that can automatically track changes and publishes the changes in the document or on the web page.

Because the interactive chart includes tags, the chart can be indexed by a search engine. Thus, the charts are searchable by search engines. The search engine crawls the website having the interactive chart, indexes the website and tags associated with the chart and stores the tags in a searchable database as known in the art.

Figure 43:
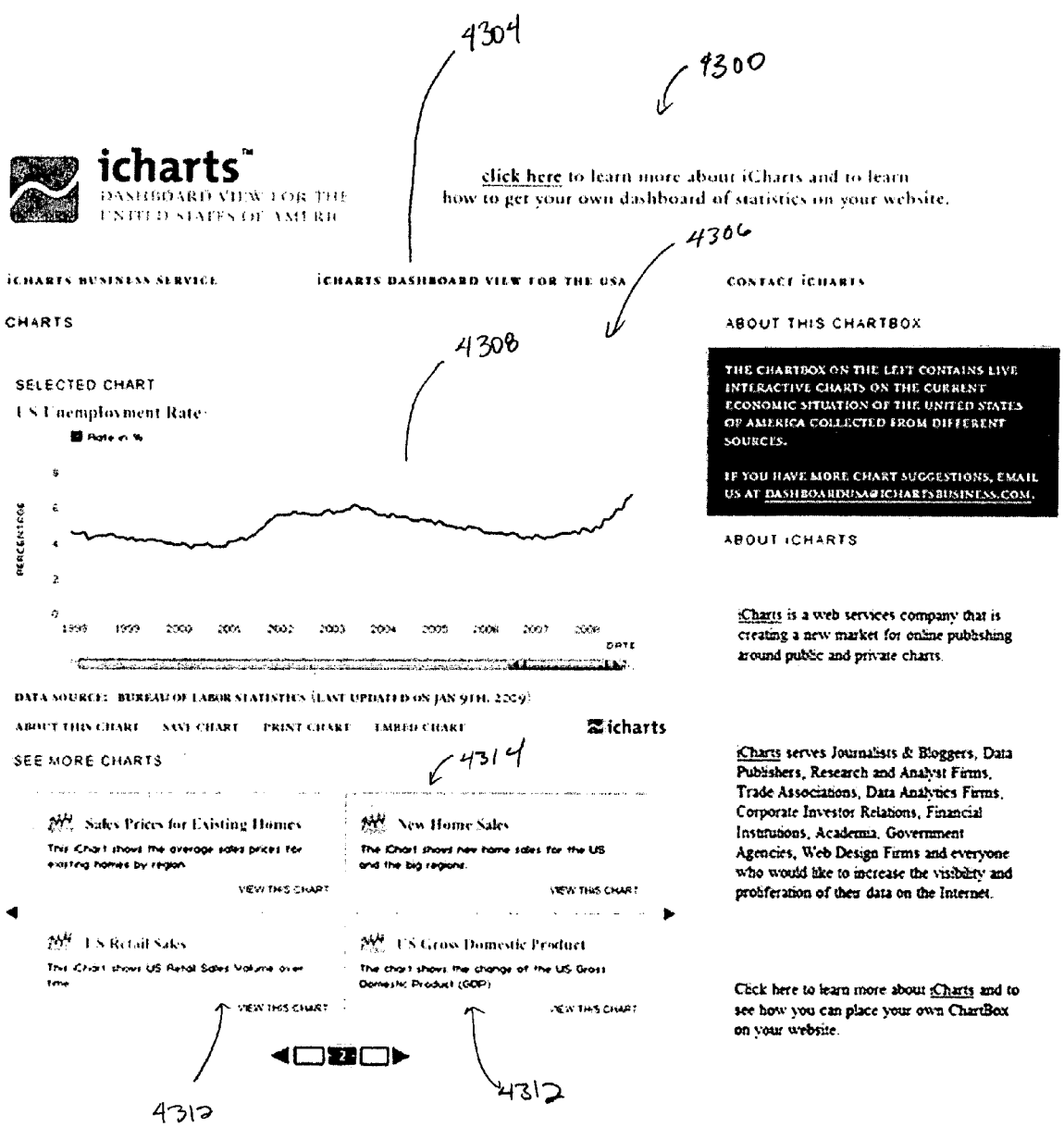
FIG. 43 is a schematic view of a webpage that includes a chart box in accordance with one embodiment of the invention.
Figure 44:
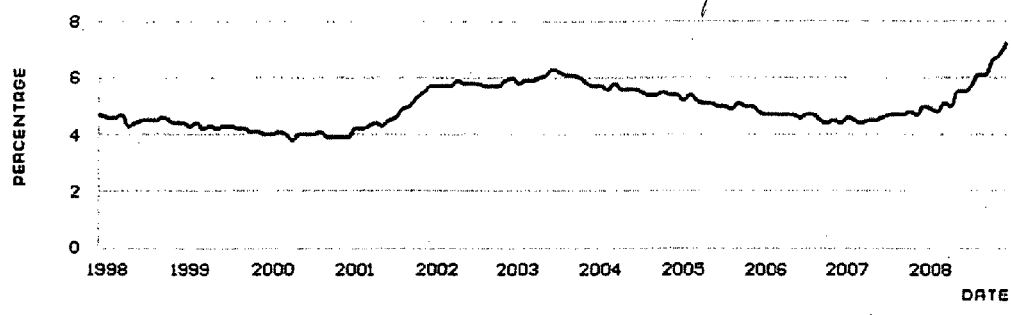
FIG. 44 is a detailed schematic view of the chart box of FIG. 43 in accordance with one embodiment of the invention.

FIG. 43 illustrates an exemplary screen shot of a business services application website 4300 according to one embodiment of the invention. The illustrated website 4300 includes a chart box 4304, shown in further detail in FIG. 44. Referring to FIGS. 43 and 44, the chart box 4304 is configured to be embedded on a website to display one or more interactive charts on that website. The chart(s) are added to the chart box using a chart box tool provided by another website that allows users to generate, purchase or otherwise manipulate and select the interactive chart(s). For example, a blogger can embed the chart box on their blog website and automatically update the charts displayed in the chart box without reprogramming the website for their blog using another website. In another example, a financial institution can include multiple chart boxes into multiple pages of their website, each chart box including different types of interactive chart(s). The chart box 4304, therefore, allows users or businesses with large amounts of data to easily and flexibly display varying charts on their website without the need for programming.

In one embodiment, the chart box 4304 is a flash widget. The chart box 4304 may be embedded once using an embed code onto a customer site. The embed code for the chart box 4304 may include retrieve code to fetch the interactive chart(s) selected for the chart box 4304 embedded in the customer site. Alternatively, the embed code may include a data feed, such as an ATOM feed, RSS feed, XML feed, etc., that is used to automatically update the interactive chart(s) displayed in the chart box 4304. The chart box 4304 may be customizable (e.g., fonts, style, size, color and the like).

The illustrated chart box 4304 includes a viewing pane 4306 configured to display an interactive chart 4308. The chart box 4304 also includes multiple interactive charts 4312 in a chart selection pane 4314. Each of the interactive charts 4312 may be selected for display in the viewing pane 4306. As shown in FIGS. 43 and 44, the chart box 4304 may allow for a user to scroll through multiple interactive charts 4313 for display in the viewing pane 4306 using a page selection tool 4316 or scrolling arrows 4318. It will be appreciated that the chart box 4304 may have a different configuration than illustrated and described above. For example, the chart box 4304 may only have a viewing pane 4306 that is configured to display one interactive chart 4308 or multiple interactive charts 4312.

Figure 45:
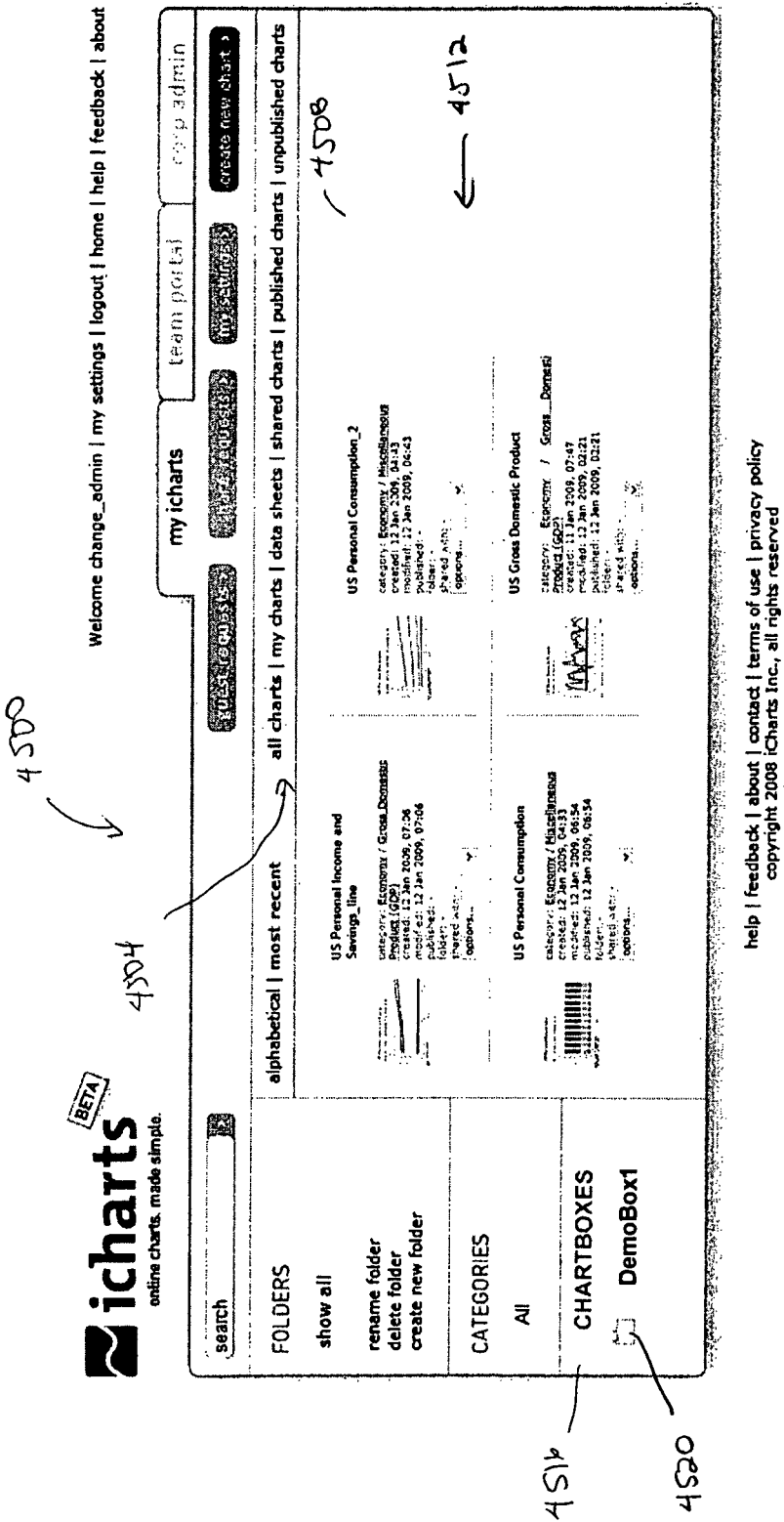
FIG. 45 is a schematic vie of a portal for creating a chart box in accordance with one embodiment of the invention.

As shown in FIG. 45, a user interface 4500 may be provided on the same website that allows for generation or purchase of interactive charts or on another website coupled to a server that includes several interactive charts that can be selected for display in the chart box 4304. A user may select possible interactive charts for inclusion in the chart box 4304 using the toolbar 4504. The user may use a charting pane 4508 to view and/or browse the interactive charts 4512 that can be selected for display in the chart box 4304. The user interface also includes a chart box region 4516 that includes a chart box folder 4520. The chart box folder 4520 is connected to the chart box 4304 such that the retrieve code for data feed displays the interactive chart(s) selected by the user in the chart box folder 4520. The user can select the interactive chart(s) for display in the chart box 4304 by, for example, dragging and dropping one or more of the charts 4512 onto the chart box folder 4520. When the user drops the selected chart(s) 4512 onto the chart box folder 4520, the chart is automatically displayed in the chart box 4304 embedded on the user's website.

It will be appreciated that in order to develop and incorporate the interactive charts conventionally, a programmer must be hired to develop the chart, link it to a data source and embed it onto the web-site. The cost to pay a programmer to build and embed a new interactive chart on a website can be $5,000 to $25,000, depending on the complexity of chart. In contrast, by embedding the charts with the chart box 4304 in the website and using the chart box tool 4500, no programming is required to embed charts in the website. In addition, the number of charts that can be displayed using the chart box 4304 is unlimited. In order to change the charts displayable in the chart box, no programming is required because a user only needs to drag and drop the chart(s) using the tool 4500. The costs are therefore a fraction of the present cost, effectively removing a barrier to more visual data content on the web.

Figure 46:
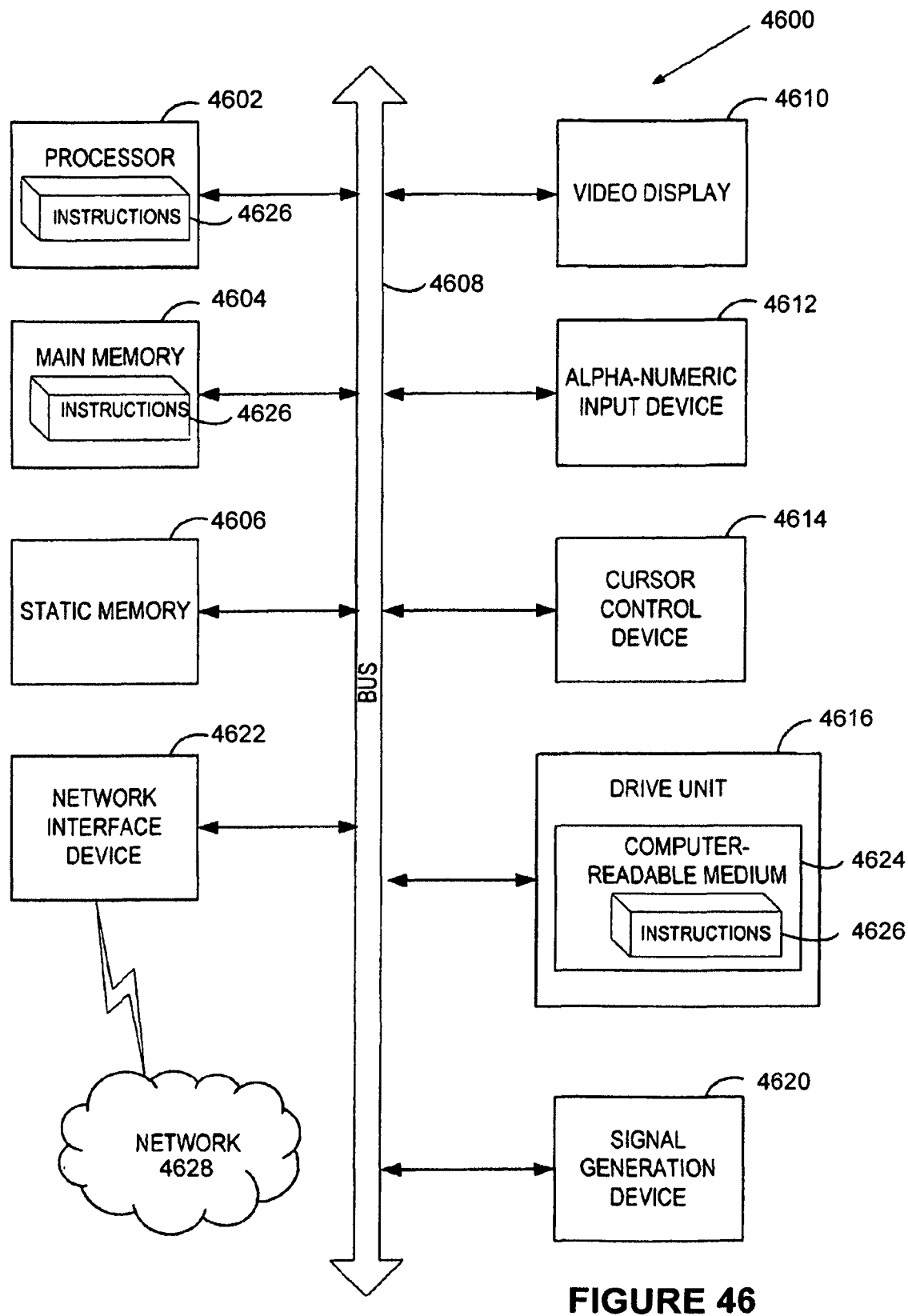
FIG. 46 is a schematic view of an exemplary computer system in accordance with one embodiment of the invention.

FIG. 46 shows a diagrammatic representation of machine in the exemplary form of a computer system 4600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 4600 includes a processor 4602 (e.g., a central processing unit (CPU), a graphics processing unit (GPU) or both), a main memory 4604 (e.g., read only memory (ROM), flash memory, dynamic random access memory (DRAM) such as synchronous DRAM (SDRAM) or Rambus DRAM (RDRAM), etc.) and a static memory 4606 (e.g., flash memory, static random access memory (SRAM), etc.), which communicate with each other via a bus 4608.

The computer system 4600 may further include a video display unit 4610 (e.g., a liquid crystal display (LCD) or a cathode ray tube (CRT)). The computer system 4600 also includes an alphanumeric input device 4612 (e.g., a keyboard), a cursor control device 4614 (e.g., a mouse), a disk drive unit 4616, a signal generation device 4620 (e.g., a speaker) and a network interface device 4622.

The disk drive unit 4616 includes a machine-readable medium 4624 on which is stored one or more sets of instructions (e.g., software 4626) embodying any one or more of the methodologies or functions described herein. The software 4626 may also reside, completely or at least partially, within the main memory 4604 and/or within the processor 4602 during execution thereof by the computer system 4600, the main memory 4604 and the processor 4602 also constituting machine-readable media.

The software 4626 may further be transmitted or received over a network 4628 via the network interface device 4622.

While the machine-readable medium 4624 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A computer-implemented method comprising:
   receiving a selection, on a first website, of at least one interactive chart from a plurality of interactive charts; and
   displaying, in response to the selection the at least one interactive chart embedded in a chart box on a second website, wherein the chart box is a web widget,
   wherein the at least one interactive chart is generated on a generation interface configured to allow a user to generate the interactive chart with a chart template from a chart template store,
   wherein the at least one interactive chart, when displayed on the second website in the absence of the generation interface, enables a user to a) render the chart, b) obtain input from a user and c) rerender the chart using the input thereby enabling the interactive chart to retain interactivity,
   wherein the selection is made by dragging and dropping the at least one interactive chart from the plurality of charts into a chart box folder connected to the chart box such that retrieve code for data feed displays the at least one interactive chart on the first website, and
   wherein the at least one interactive chart is automatically displayed on the second website using a data feed from the first website to the second website upon the dragging and dropping selection.

2. The method of claim 1, wherein the web widget is a flash widget.

3. The method of claim 1, further comprising displaying one or more of the plurality of interactive charts in the chart box on the second website.

4. The method of claim 1, comprising displaying a plurality of interactive charts embedded in a plurality of chart boxes on the second website.

* * * * *